United States Patent
Miklatzky et al.

(10) Patent No.: US 12,429,325 B2
(45) Date of Patent: Sep. 30, 2025

(54) IMAGING SYSTEM AND METHOD

(71) Applicant: SCENERA TECHNOLOGIES LTD, Jerusalem (IL)

(72) Inventors: Efraim Miklatzky, Jerusalem (IL); Gilad Luria, Givataim (IL)

(73) Assignee: SCENERA TECHNOLOGIES LTD, Jerusalem (IL)

( * ) Notice: Subject to any disclaimer, the term of this patent is extended or adjusted under 35 U.S.C. 154(b) by 0 days.

(21) Appl. No.: 19/081,428

(22) Filed: Mar. 17, 2025

(65) Prior Publication Data
US 2025/0207905 A1    Jun. 26, 2025

Related U.S. Application Data

(63) Continuation-in-part of application No. PCT/IL2023/051175, filed on Nov. 14, 2023.
(Continued)

(30) Foreign Application Priority Data

Nov. 15, 2022 (IL) ........................................ 298239

(51) Int. Cl.
*G01B 9/02001* (2022.01)
*G01B 9/02056* (2022.01)

(52) U.S. Cl.
CPC ...... *G01B 9/02011* (2013.01); *G01B 9/02057* (2013.01); *G01B 2290/70* (2013.01)

(58) Field of Classification Search
CPC ............ G01B 9/02011; G01B 9/02057; G01B 2290/70; G01B 11/026; G01B 11/14; G01B 11/2441
See application file for complete search history.

(56) References Cited

U.S. PATENT DOCUMENTS 4,606,638 A * 8/1986 Sommargren ....... G11B 5/6005
356/507
6,639,683 B1   10/2003 Remy et al.
(Continued)

FOREIGN PATENT DOCUMENTS

CN       108387172 A  *  8/2018
JP      2008292939 A      5/2007
(Continued)

OTHER PUBLICATIONS

Feb. 22, 2024, International Search Report and Written Opinion.
Mar. 11, 2025, PCT Notification of the Recording of a Change.

*Primary Examiner* — Michael A Lyons
(74) *Attorney, Agent, or Firm* — Whitestone Law, PLLC

(57) ABSTRACT

An imaging device comprising a detector assembly having sensor elements configured to measure intensity of light/radiation thereby received and generate measurement data/signals indicative thereof, an aperture assembly having at least two partial apertures configured to divide light/radiation received from an object into at least two components having different polarization orientations, a polarizer arrangement located between the detector assembly and the aperture assembly, wherein the polarizer arrangement is configured to affect at least two different polarization orientations to light passing therethrough onto at least two sensor elements of the detector assembly, and a processor unit configured to process the measurement data/signals from the at least two sensor elements, and determine based thereon a distance of the object from the imaging device.

29 Claims, 15 Drawing Sheets

Related U.S. Application Data

(60) Provisional application No. 63/453,162, filed on Mar. 20, 2023, provisional application No. 63/446,096, filed on Feb. 16, 2023.

(56) References Cited

U.S. PATENT DOCUMENTS

| | | |
|---|---|---|
| 7,057,738 B2 | 6/2006 | Millerd et al. |
| 10,900,840 B1 * | 1/2021 | Pau .................... G01J 4/04 |
| 2005/0007603 A1 | 1/2005 | Arieli et al. |
| 2007/0211256 A1 | 9/2007 | Medower et al. |
| 2010/0309476 A1 | 12/2010 | Millerd |
| 2017/0052430 A1 | 2/2017 | Higashitsutsumi et al. |
| 2017/0201727 A1 | 7/2017 | Mendlovic et al. |
| 2018/0164438 A1 | 6/2018 | Van Der Tempel et al. |
| 2020/0116558 A1 | 4/2020 | Pacala et al. |
| 2020/0141715 A1 | 5/2020 | Furman |
| 2020/0278257 A1 | 9/2020 | Berlatzky |

FOREIGN PATENT DOCUMENTS

| | | | |
|---|---|---|---|
| KR | 20210095403 A | * | 8/2021 |
| WO | 2024105664 A1 | | 5/2024 |

* cited by examiner

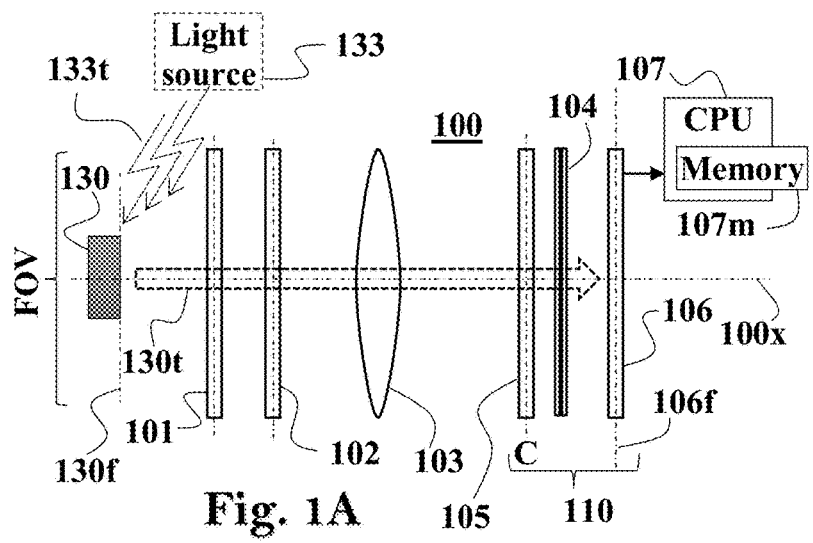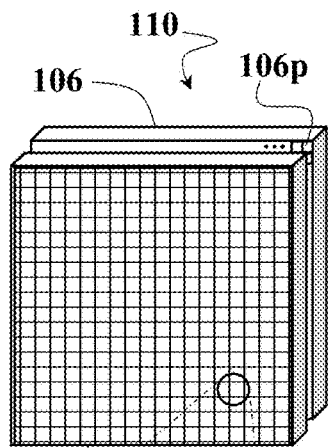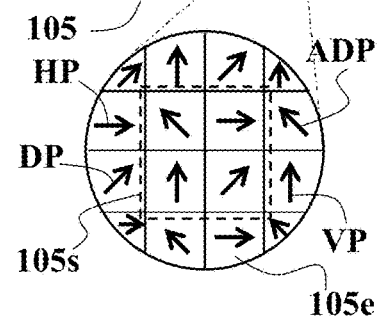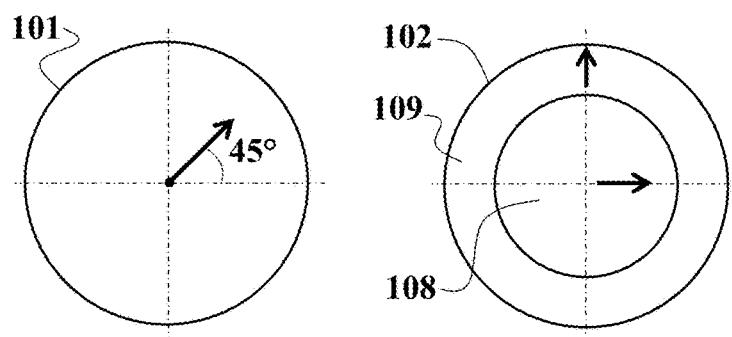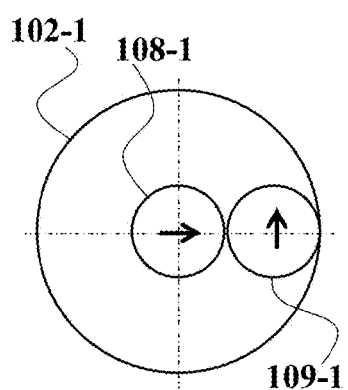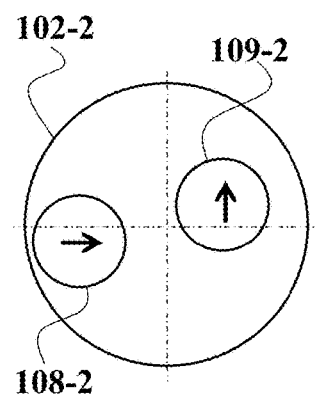

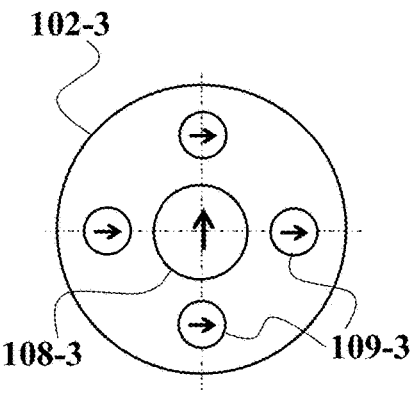
Fig. 2C
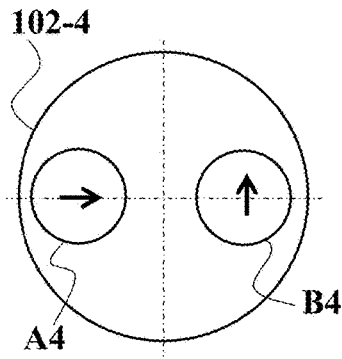
Fig. 2D
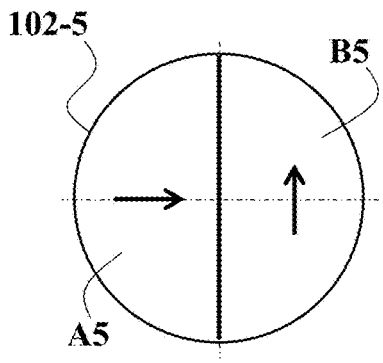
Fig. 2E
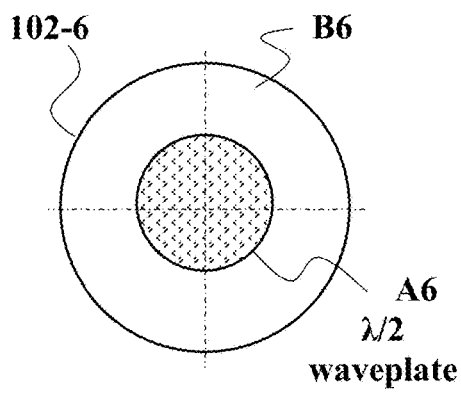
Fig. 2F
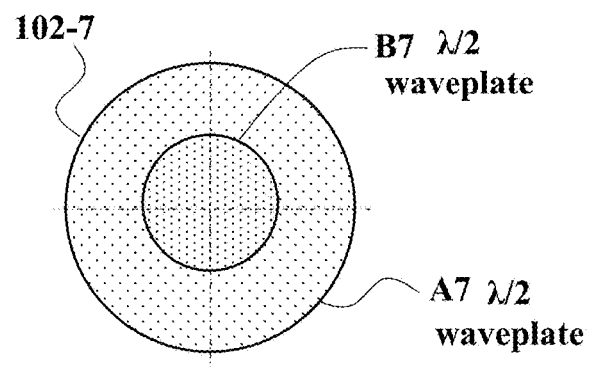
Fig. 2G
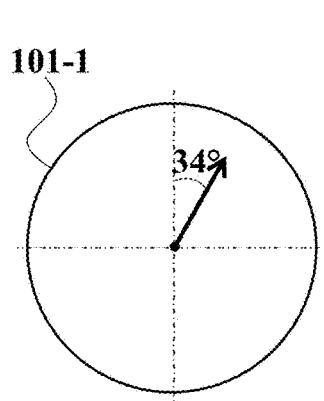
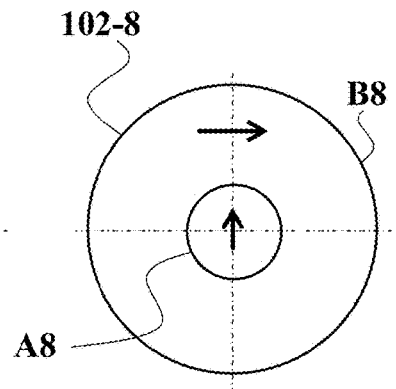
Fig. 2H
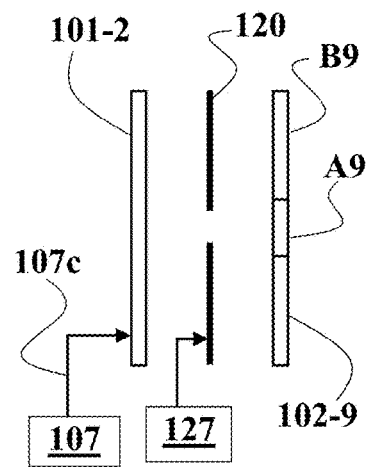
Fig. 2I

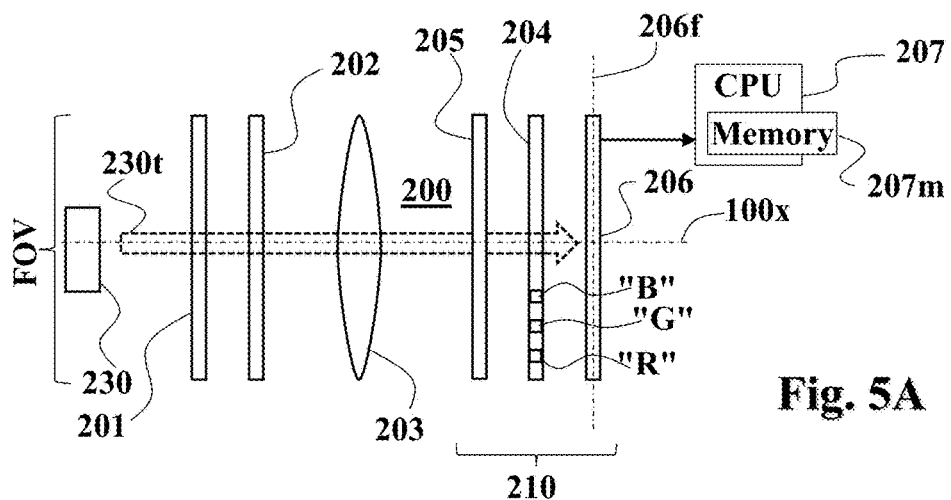
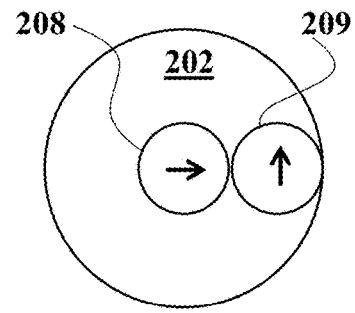
Fig. 5A
Fig. 5B
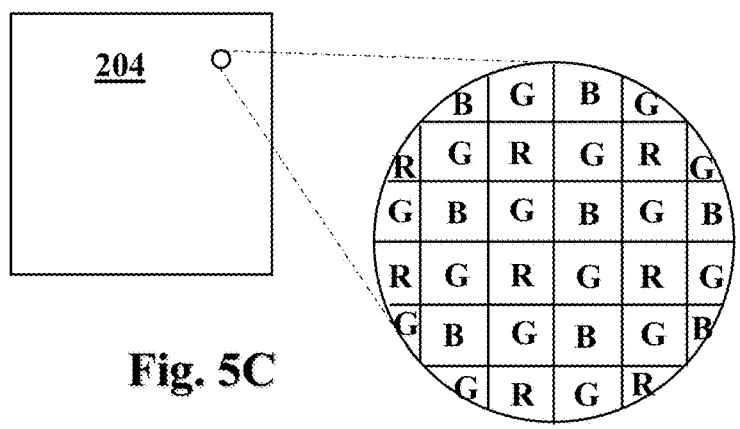
Fig. 5C
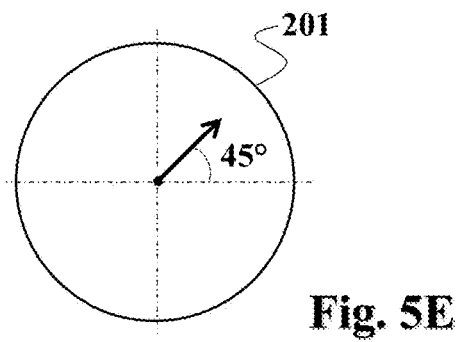
Fig. 5E
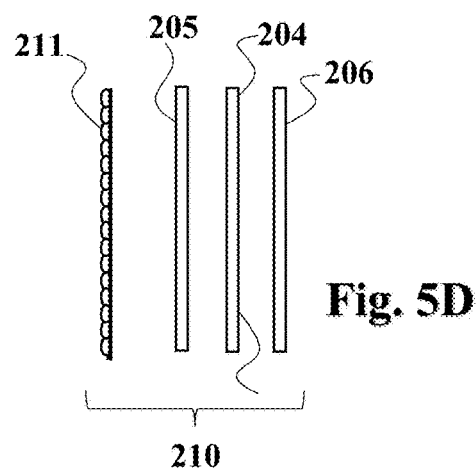
Fig. 5D

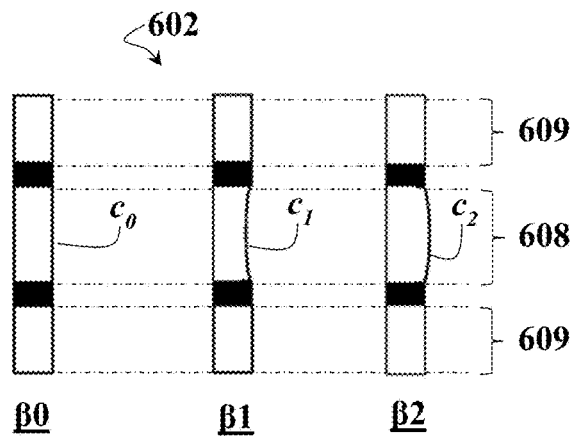
Fig. 7C
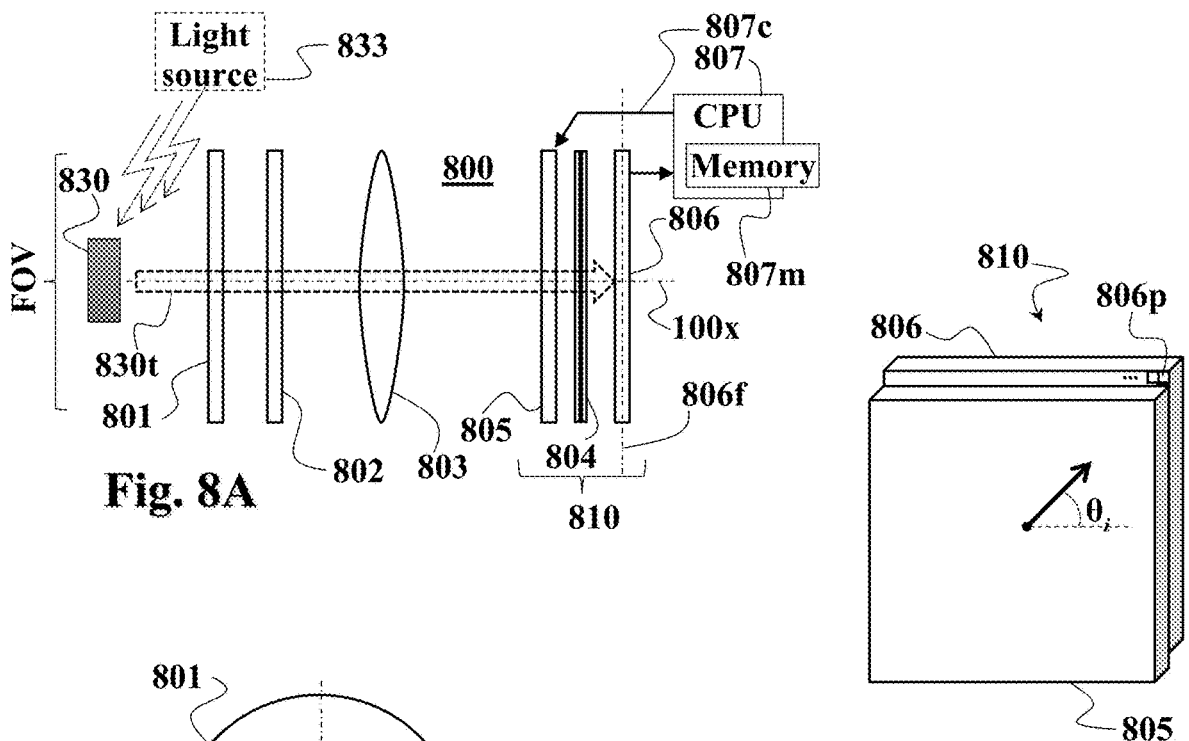
Fig. 8A
Fig. 8B
Fig. 8C
Fig. 8D

IMAGING SYSTEM AND METHOD

CROSS-REFERENCE TO RELATED APPLICATIONS

This application is a continuation-in-part of PCT Patent Application No. PCT/IL2023/051175, filed on Nov. 14, 2023, which claims the priority benefit under 35 U.S.C. § 119 of U.S. Provisional Patent Application No. 63/446,096, filed on Feb. 16, 2023, U.S. Provisional Patent Application No. 63/453,162, filed on Mar. 20, 2023, and Israel Application No. 298239, filed on Nov. 15, 2020, the contents of each are hereby incorporated in its entirety by reference.

TECHNOLOGICAL FIELD

The present invention is generally in the field of object imaging, and particularly relates to three-dimensional (3D) optical imaging of surface contours of objects.

BACKGROUND

This section intends to provide background information concerning the present application, which is not necessarily prior art.

Noncontact optical measurement techniques are used to obtain topographic information by using electromagnetic (EM) wave (e.g., light/radiation) signals to acquire three-dimensional (3D) surface profile (contour) information of an inspected object. Many 3D imaging technologies are being developed recently for provision of full surface profile image data of inspected objects. Typical 3D shape measurement methods are based on stereo vision, light field/plenoptics, structured light, time-of-flight (TOF), digital fringe projection (DFP), and interferometric imaging techniques. 3D imaging techniques have many commercial applications, including inter alia, metrology/3D object modelling, virtual/augmented reality, remote sensing, medical diagnostic, biometrics and suchlike. It is desirable to provide 3D imaging implementations that are fast, portable, compact, efficient and consume low power.

Structured-light imaging techniques can be used to measure precise 3D shapes in resolutions of less than a millimeter. However, structured-light 3D imaging techniques tend to be complicated due to requirements for time varying irradiating in different axial directions and focusing of the patterned light, resulting in relatively long 3D measurement time durations. These techniques are also limited in their spatial resolution due to the grid points for which the image can be calculated. TOF range-imaging (e.g., LIDAR) techniques can be used to measure distances to various points on the surface of an inspected object, by measuring the amount of time required for light to travel between the object and the light source and constructing a "distance map" image of the object based on the measured distances. However, TOF is not ideal for 3D modeling as it requires measuring round-trip times of a plurality of different beams to image surface areas of the inspected objects.

Both structured light and TOF techniques require a unique illumination source and the images obtained by these techniques can mainly provide information for the distance of the object but typically unable to determine visible range grayscale/color level of the imagery data. In order to create a grey scale 3D image, and yet alone a 3D colorful or grayscale image, the information arising from these techniques has to be fused with information from a standard 2D color sensor.

Stereovision requires a plurality of cameras located at different locations to obtain accurate 3D object information. Plenoptics imaging requires complex algorithms and dedicated computer hardware for 3D image reconstruction, thus spatial resolution is often reduced.

Holograms are constructed by recording interference patterns of coherent reference and object reflection beams. The inspected object is typically irradiated with laser light and interference patterns between reference beams and beams reflected from the object are recorded. Holographic interferometry aims to obtain phase information from a single image, which typically requires complex and relatively sophisticated optical imaging equipment.

US Patent Publication No. 2018/0164438 discloses a method for providing distance information of a scene with a time-of-flight camera, comprising the steps of emitting a modulated light pulse towards the scene, receiving reflections of the modulated light pulse from the scene, evaluating a time-of-flight information for the received reflections of the modulated light pulse, and deriving distance information from the time-of-flight information for the received reflections, whereby a spread spectrum signal is applied to a base frequency of the modulation of the light pulse, and the time-of-flight information is evaluated under consideration of the a spread spectrum signal applied to the base frequency of the modulation of the light pulse. Also disclosed a time-of-flight camera for providing distance information from a scene, whereby the time-of-flight camera performs the above method.

The holographic interferometer disclosed in US Patent Publication No. 2020/0141715 comprises at least one imaging device capturing an interference pattern created by at least two light beams, and at least one aperture located in an optical path of at least one light beam of the at least two light beams, wherein the at least one aperture is located away from an axis of the at least one light beam, thus transmitting a subset of the at least one light beam collected at an angle range.

US Patent Publication No. 2017/0201727 discloses a light-field imaging system and a method for generating light-field image data. The system comprising an imaging lens unit, a detector array and a polychromatic patterned filter located in optical path of collected light, being at an intermediate plane between the lens unit and the detector array. The method comprising: acquiring image data of a region of interest by passing input light coming from said region of interest through said imaging lens unit and said polychromatic patterned filter to be detected by said detector array to generate corresponding image data; and processing said image data to determined light components passing through different regions of said polychromatic patterned filter corresponding to different colors and different parts of the region of interest to provide light-field image data of said region of interest.

US Patent Publication No. 2005/0007603 discloses a method of wavefront analysis including applying a transform to the wavefront, applying a plurality of different phase changes to the transformed wavefront, obtaining a plurality of intensity maps, wherein the plurality of different phase changes are applied to region of the transformed wavefront, corresponding to a shape of the light source.

US Patent Publication No. 2020/0278257 discloses an optical detection system for detecting data on the optical mutual coherence function of input field. The system comprising an encoder having similar unit cells, and an array of sensor cells located at a distance downstream of said unit cells with respect to a general direction of propagation of input light. The array defines a plurality of sub-array unit cells, each sub-array corresponding to a unit cell of the encoder, and each sub-array comprising a predetermined number M of sensor elements. The encoder applies predetermined modulation to input light collected by the system, such that each unit cell of said encoder directs a portion of the collected input light incident thereon onto sub-array unit cell corresponding therewith and one or more neighboring sub-array unit cells within a predetermined proximity region. The number M is determined in accordance with a predetermined number of sub-arrays unit cells within the proximity region.

US Patent Publication No. 2007/0211256 discloses a phase-difference sensor which measures the spatially resolved difference in phase between orthogonally polarized reference and test wavefronts. The sensor is constructed as a pixelated phase-mask aligned to and imaged on a pixelated detector array. Each adjacent pixel of the phase-mask measures a predetermined relative phase shift between the orthogonally polarized reference and test beams.

GENERAL DESCRIPTION

The 3D imaging techniques commonly used nowadays typically require dedicated illumination source(s) and oftentimes expensive equipment and/or substantial computational resources, for construction of a 3D model for imaged object(s). Thus, 3D imaging implementations available heretofore are typically not optimal for use with regular off the shelf imaging devices (e.g., digital cameras, smart devices, tablets, etc.) that are so common and readily available nowadays for average households and businesses. There is thus a need for fast, portable, compact, efficient and low power consuming 3D imaging techniques that can be used to implement reliable 3D imaging with regular portable, or non-portable, devices e.g., equipped with optical imagers/camera and processing means.

The present disclosure provides 3D imaging techniques that can be used to construct relatively simple and inexpensive 3D imaging systems. In a broad aspect the present application discloses techniques usable for determining optical path difference (OPD) between different rays of light/radiation (or alternately-wavefronts) emitted from object(s) imaged by an optical system, and/or spatial location differences of intertwined images of the object at the focal imaging plane. The (OPD and/or spatial location) difference is determined by analyzing measured intensity distribution(s) of components of the light/radiation received from the object via at least two partial apertures with different (e.g., linear) polarization orientations, and determining a phase shift between the light/radiation components received from the at least two partial apertures based of the energy/intensity distribution(s) measured and known properties of the at least two partial apertures, and/or an imaging (e.g., pixels) distance between the locations of intertwined images of the imaged object on the imaging device.

This is achieved in some embodiments by passing the light/radiation rays from the object through an aperture assembly having at least two partial apertures having predetermined geometrical and/or optical properties (e.g., distance(s) between the partial apertures, polarization orientation, etc.), and configured for causing passage of the polarized light/radiation through the at least two partial apertures towards a detector assembly with predefined polarization orientations, with or without phase difference therebetween.

An optical assembly e.g., comprising at least one imaging lens, and having pre-determined optical characteristics (e.g., focal length, focal plane location, etc.) is used in some implementations to collect the light/radiation from the aperture assembly and direct it to the detector assembly.

The detector assembly is configured in some embodiments to separate from the light/radiation received from the aperture assembly, two or more components having two or more different polarization orientations, and direct these light/radiation components onto a sensor device (e.g., imager) of the detector assembly for measuring their intensities and generating measurement data/signals indicative thereof. In alternative embodiments the optical system is configured to apply time dependent polarization, or time dependent OPD/phase shifts, to the light/radiation propagating towards a sensor device of the detector assembly, for thereby measuring time dependent intensity/energy by said sensor device.

Processing means are used to process and analyze the measurement data/signals generated by the sensor device and determine the resulting OPD difference between the at least two differently polarized light/radiation components, and/or the imaging distance between the intertwined images of the object, based thereon, and on the known design parameters of the optical system e.g., polarization orientations of the partial apertures, distance between said partial apertures, optical system focal length, etc. The resulting difference, in either the OPD or imaging distance, can then be used to determine the distance between different points on the imaged object and the imaging device.

Unpolarized light/radiation propagating from the imaged object is passed in some embodiments through at least one front linear polarizer element configured to apply a predefined polarization orientation (e.g., 45°) to the light/radiation received from the imaged object, and direct the linearly polarized light passing therethrough towards the aperture assembly. Optionally, but in some applications preferably, the detector assembly, comprises one or more bandpass filters configured to enable passage of only certain wavelength ranges of the light/radiation towards the sensor device of the detector assembly. In some embodiments the bandpass filter is positioned in another location i.e., not in the detector assembly e.g., in the optical assembly.

Alternatively, or additionally, in possible applications the imaged object is illuminated/irradiated by a narrow band light/radiation, and in such applications the one or more bandpass filters are not necessarily required in the detector assembly, or elsewhere in the system. Furthermore, such illumination/radiation may be polarized in a predetermined orientation which may eliminate the need for a linear polarizer.

The detector assembly comprises in possible applications an array of polarizer elements having a defined allocation of two or more different polarization orientations, configured to apply two or more different polarization orientations to the light/radiation propagating towards the sensor device of the detector assembly. Each one of the polarizer elements of the array can be configured to direct the polarized light/radiation emerging therefrom onto respective one or more sensing elements (pixels) of the sensing device. The efficiency of the detector assembly can be improved by using a microlens array anterior to the array of polarizer elements.

The terms anterior and posterior are used herein to refer to locations along the optical axis of the disclosed optical setups/systems with respect to the direction faced by the imaging plane of its detector assembly i.e., the elements between the detector assembly and the imaged object(s) are located anterior to the detector assembly.

The bandpass filter located in the detector assembly (or elsewhere in the system), comprises, in some embodiments, a defined spatial distribution of bandpass filter elements arranged, such that the wavelength range (e.g., "Red", "Green", "Blue", . . . ) of each bandpass filter element is at least partially different from the wavelength ranges of the bandpass filter elements horizontally and vertically adjacently located thereto. This way, the bandpass filter can be configured to direct light/radiation of certain wavelength ranges and certain polarization orientations received from polarizer elements of the array of polarizer elements onto respective sensor elements of the sensor device.

Optionally, the optical system comprises a retarder element (e.g., $\lambda/4$) e.g., configured to apply a constant phase shift between the differently polarized light/radiation from the aperture assembly, before reaching the array of polarizer elements. In possible embodiments a retarder element (e.g., $\lambda/4$) is provided to apply a constant phase shift between differently polarized light/radiation from the inspected object and from a reference surface. Alternatively, the detector assembly comprises an array of retardation elements having a defined arrangement of one, two, or more different retardation elements spatially alternatingly distributed therein with null-retardation elements (i.e., not causing a phase shift) to form a rectangular alternating grid configured for passing (e.g., circularly) polarized light/radiation onto some of the polarizer elements of the array of polarizer elements having certain one or more polarization orientations.

The present application also provides techniques for determining OPD differences between different rays of light/radiation (wavefronts) emitted from object(s) imaged by an optical system utilizing an aperture assembly having two or more partial apertures configured to controllably apply at respective different time instances two or more predefined phase differences between the light/radiation passing through at least two of its partial apertures at each time instance. Alternatively, or additionally, an imaging (e.g., number of pixels) distance between two intertwined images acquired at an imaging focal plane is calculated for determining the distance of the object at least partially based on the determined imaging distance.

A sensor device can be used to measure the intensity of the light/radiation received from the aperture assembly for each of the two or more different predefined phase differences thereby applied at each time instance and generate measurement data indicative thereof. One or more processors are used in some embodiments to process and analyze the measurement data generated by the sensor device for each one of the two or more predefined phase differences applied by the aperture assembly and determine the OPD based thereon. In some embodiments the one or more processors are configured to determine the OPD from measurement data generated by the sensor device for at least two, or three, or more, different phase differences applied to the light/radiation by the aperture assembly at different time instances. The determined OPD can be then used to determine a distance between the sensor device and the object.

An optical assembly (e.g., comprising one or more imaging lenses) is placed in some embodiments between the aperture assembly and the sensor device. Optionally, but in some embodiments preferably, the aperture assembly comprises at least two concentric partial apertures. In possible embodiments the at least two partial apertures are explicitly non-concentric. The one or more processors can be configured to generate control signals for causing the aperture assembly to apply the one or more different predefined phase differences to the light/radiation passing through at least one of its partial apertures at each time instance. The aperture assembly can be configured to apply different predefined phase differences to the light/radiation passing through at least one of its partial apertures by at least one of the following techniques: changing thickness of a medium placed in at least one of the partial apertures, changing refraction index of a medium placed in at least one of the partial apertures, and/or changing curvature of a lens placed in at least one of the partial apertures.

Alternatively, or additionally, a controllable variable polarizer is used in the detector assembly, or in its vicinity, to controllably change at different time instances the polarization of the light/radiation from the at least two partial apertures of the aperture assembly. The intensity/energy of the different polarization orientations of the light/radiation passed through the controllable variable polarizer at the different time instances is measured by the detector assembly, and a phase difference between the light components received from the partial apertures of the aperture assembly is determined based thereon. The determined phase difference is then used to determine the OPD and a distance of the imaged object.

In one aspect there is provided an imaging device comprising a detector assembly having sensor elements configured to measure intensity of light/radiation thereby received and generate measurement data/signals indicative thereof, an aperture assembly having at least two partial apertures configured to divide light/radiation received from an object into at least two components having different polarization orientations, a polarizer arrangement located between the detector assembly and the aperture assembly, said polarizer arrangement configured to affect at least two different polarization orientations to light/radiation passing therethrough onto at least two sensor elements of said detector assembly, and a processor unit configured to process the measurement data/signals from the at least two sensor elements, and determine based thereon a distance of the object from the imaging device.

In some embodiments a polarization interferometer is used for imaging the object by a detector assembly having sensor elements configured to measure intensity of light/radiation thereby received and generate interferometric measurement data/signals indicative thereof. A polarizer arrangement can be used to affect at least two different polarization orientations to light from the polarization interferometer onto at least two sensor elements of the detector assembly. The processor unit can be configured to process the interferometric measurement data/signals, and determine based thereon a local phase difference, and augment resolution and/or dynamic range of the determined distance. The processor unit can be further configured to determine a distance measure of the object based on the determined local phase difference.

The aperture assembly of the device disclosed herein can be optically coupled to the polarization interferometer for passing therefrom light/radiation originating from the imaged object into the device via its aperture assembly.

The polarization interferometer comprises in some embodiments a light source, a reference surface (e.g., mirror), a polarizing beam splitter configured to receive light from said light source, transmit a (reference) portion of the received light with a first polarization orientation in a first direction towards the reference surface, reflect another (target) portion of the received light with a second polarization orientation in a second direction towards the object, and direct combined light reflected from the object and from the reference surface in a third direction, a first phase retarder for shifting phase of the light reflected towards the object and of light reflected back from the object towards the polarizing beam splitter, a second phase retarder for shifting phase of the light transmitted towards the reference surface and of light reflected back from the reference surface towards the polarizing beam splitter, and an optical coupler configured to direct a portion of the combined light towards the detector assembly of the polarization interferometer and another portion of said combined light towards the aperture assembly.

The device can comprise a retarder element configured to affect the polarization orientation of light/radiation from the polarizing beam splitter of the polarization interferometer.

An optical assembly can be used to direct light/radiation from the aperture assembly to the detector assembly. The polarizer arrangement is configured in some embodiments to define a spatial distribution of at least two different polarization orientations. The processor can be accordingly configured to process the measurement data/signals from respective at least two sensor elements of the detector assembly associated with the spatially affected at least two different polarization orientations of the at least two components of light/radiation from the aperture assembly. Optionally, but in some embodiments preferably, the polarizer arrangement is embedded in the detector assembly.

Optionally, the aperture assembly is configured to apply a predefined phase difference between the at least two components of the light/radiation. The processor can be accordingly configured and operable to determine the distance of the object based on the predefined phase difference and the measurement data/signals. Optionally, but in some embodiments preferably, the device comprises at least one of a phase retarder and a polarizing element in at least one of the partial apertures of the aperture assembly for affecting the different polarization orientations to the at least two light/radiation components passed therethrough.

The device comprises in possible embodiments a variable phase retarder in at least one of the partial apertures of the aperture assembly. The processor can be configured to control the variable phase retarder to apply at least two predefined different phase shifts to the light/radiation passed therethrough (i.e., to cause at least two phase differences between the two or more light/radiation portions from the aperture assembly) at respective at least two different time instances, and determine the distance of the object at least partially based on the measurement data/signals acquired by the detector assembly for their respective at least two different time instances.

The device comprises in some embodiments at least one polarizer configured to apply a predefined polarization orientation to the light/radiation received by the aperture assembly.

Optionally, the device comprises a light/radiation source configured to illuminate the object with light/radiation having a defined polarization orientation. Alternatively, or additionally, the device comprises a light/radiation source configured to illuminate the object with light/radiation having a define band of wavelengths.

The device comprises in some embodiments one or more bandpass filters (e.g., embedded in the detector assembly) each configured to limit passage of light radiation therethrough towards the sensor elements of the detector assembly to a different range of wavelengths. The one or more bandpass filters can form a defined spatial distribution of bandpass filter elements. In some embodiments the one or more bandpass filters, which can be embedded in the detector assembly, are arranged such that there is no spatial overlapping portions between them. The one or more bandpass filter elements forms in some embodiments a spatial distribution of at least one bandpass element of a predefined wavelength range and at least one passthrough non-filtering element allowing complete passage of the light/radiation therethrough.

The polarizer arrangement comprises in possible embodiments a plurality of polarizer elements configured to form a defined spatial distribution of polarizer elements arranged such that the polarization orientation of at least some of the polarizer elements is different from polarization orientations of polarizer elements adjacently located thereto. The one or more bandpass filters can be configured to direct light/radiation of certain wavelength ranges onto respective polarizer elements of the polarizer arrangement having certain polarization orientations. Alternatively, the polarizer elements can be configured to direct light/radiation of certain polarization orientations onto respective one or more bandpass filters having certain wavelength ranges.

In some embodiments a microlens array is located anterior to the sensor elements of the detector assembly. The device may comprise a retarder element. The retarder element can be configured to affect a desired polarization to the light/radiation.

The device comprises in some embodiments an array of retardation elements arranged in the detector assembly and having a defined arrangement of different retardation elements spatially alternatingly distributed therein. The array of retardation elements can be configured to form a rectangular alternating grid of the of retardation elements to thereby pass polarized light/radiation onto some of the polarizer elements of the array of polarizer elements having certain one or more polarization orientations.

The device may, in some embodiments, be utilized in conjunction with an additional optical setup (e.g., interferometric setup) configured to provide high resolution distance measurement of the imaged object. In such embodiments the high resolution measurement typically corresponds to a low dynamic range, thus utilization of the device, having the appropriate optical parameters (e.g., aperture diameter, focal length and focal depth) with said high resolution optical setup allows for a high resolution and large dynamic range optical system.

The aperture assembly is configured in some embodiments to controllably apply two or more transitory predefined different phase changes to light/radiation passing through at least one of its partial apertures. The processor can be accordingly configured to process and analyze the measurement data generated by the sensor device for the two or more transitory predefined different phase changes controllably applied by the aperture assembly and determine a distance between the sensor device and the object based thereon. Optionally, the processor is configured to use measurement data generated by the sensor device for at least three differently defined phase changes applied to the light/radiation passing through at least one of the apertures of the aperture assembly. The aperture assembly can be configured to apply phase changes to the light/radiation passing through at least one of its apertures by at least one of the following techniques: changing thickness of a medium placed in at least one of the apertures; changing refraction index of a medium placed in at least one of the apertures; changing curvature of a lens forming at least one of the apertures.

The polarizer arrangement is configured in possible embodiments to controllably change in time polarization orientations of light/radiation components transferred therethrough. The processor can be accordingly configured to process and analyze the measurement data generated by the sensor device for two or more different polarization orientations controllably affected by the polarizer arrangement and determine a distance between the sensor device and the object based thereon.

Optionally, the processor is configured to further determine one or more colors (i.e., respective to a specific bandpass range or ranges) and/or grey-scale levels from the measurement data for each sensor element of the sensor device. A relative rotation of polarizations of some of the polarization elements is used in possible embodiments to calibrate the device. In one application, a combined rotation of some of the polarization elements is used to manipulate the energy distribution measured by the detector assembly, to thereby improve sensitivity.

The configurations disclosed herein may comprise one or more retarder elements configured to affect a desired polarization to the light/radiation directed towards the detector assembly. The retarder elements can be used to manipulate light/radiation from the inspected object, and/or from a reference surface, and/or from aperture assembly.

In another aspect there is provided an imaging device comprising a polarization interferometer configured to affect respective different (e.g., orthogonal) polarization orientations to light/radiation from an inspected object and from a reference surface, and combine the light/radiation having the respective different polarization orientations, a detector assembly having sensor elements configured to measure intensity of light/radiation thereby received and generate measurement data/signals indicative thereof, a polarizer arrangement located between the detector assembly and the polarization interferometer, the polarizer arrangement configured to affect at least two different polarization orientations to light passing therethrough onto at least two sensor elements of said detector assembly. Optionally, but in some embodiments preferably, the polarization interferometer comprises a retarder element configured to affect the polarization of the combined light/radiation of the respective different polarization orientations.

In yet another aspect there is provided an imaging method comprising dividing light/radiation from an object into at least two components having different polarization orientations, spatially affecting at least two different polarization orientations to the at least two light/radiation components, measuring intensity of the spatially polarized light/radiation and generating measurement data/signals indicative thereof, and processing the measurement data/signals and determining based thereon a distance of the object. The method may comprise affecting a predefined polarization orientation to light/radiation from the object.

The method comprises in some embodiments affecting a spatial distribution of at least two different polarization orientations to the at least two light/radiation components and processing the measurement data/signals associated with the at least two different polarization orientations. The dividing of the light/radiation into at least two components can be applied to light/radiation components having a predefined polarization orientation.

The method can comprise radiating the object with light/radiation having a defined polarization orientation. Alternatively, or additionally, the method comprising illuminating the object with light/radiation having a define band of wavelengths.

The method comprising in possible embodiments filtering the light/radiation of the at least two different polarization orientations by one or more bandpass filters having different wavelength ranges. For example, the method can include forming a defined spatial distribution of the filtering of the light/radiation by the one or more bandpass filters and associating one or more of said bandpass filters with polarization orientations of the defined distribution of polarization orientations.

The method comprises in possible embodiments forming a defined distribution of polarization orientations by the spatially affecting of the at least two different polarization orientations to the at least two light/radiation components. Bandpass filters of the one or more bandpass filters can be associated with polarization orientations of the defined distribution of polarization orientations. Alternatively, polarization orientations of the defined distribution of polarization orientations can be associated with bandpass filters of the one or more bandpass filters.

The method can further comprise affecting a phase shift to light/radiation so as to affect a desired polarization orientation thereto. The method can comprise forming a defined spatial distribution of different phase shifts to the at least two light/radiation components.

The method may further comprise using an additional (e.g., interferometric) optical setup for providing a high resolution distance measure. This combination with the high resolution optical setup can be used to increase resolution of distance measurements carried out by embodiments hereof, and to provide large dynamic range depth measurement of surface of the object thereby imaged.

In some embodiments the method comprises controllably applying two or more transitory predefined different phase changes to the at least two light/radiation portions, processing and analyzing the measurement data generated for the two or more transitory predefined different phase changes controllably applied by the aperture assembly and determining the distance of the object based thereon. The applying of the phase changes to the light/radiation components can comprise at least one of the following: changing thickness of a medium through which at least one of the light/radiation components is passed; changing refraction index of a medium through which at least one of the light/radiation components is passed; changing curvature of a lens through which at least one of the light/radiation components is passed.

The method can comprise controllably changing in time polarization orientations of light/radiation components of the at least two light/radiation portions, and processing and analyzing the measurement data generated for the controllably affected two or more different polarization orientations and determining the distance of the object based thereon. The method may further comprise determining one or more colors and/or grey-scale levels from the measurement data. A calibration step can include affecting a relative rotation of polarization orientation to one or more components of the light/radiation from the object. Optionally, a combined rotation of polarization orientations to components of the light/radiation from the object is used to cause an energy distribution in the measurement data.

The method comprises in some embodiments imaging the object through a polarization interferometer to affect a phase difference to light from the object according to a distance thereof from the polarization interferometer, affecting at least two different polarization orientations to a light component from the polarization interferometer onto sensor elements and acquiring imagery data therefrom, processing said imagery data to determine the phase difference, and augmenting at least one of resolution and dynamic range of the determined distance based on the determined phase difference.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIGS. 1A to 1D schematically illustrate an imaging system according to some possible embodiments, wherein FIG. 1A shows a possible implementation of the imaging system, FIG. 1B shows a front polarizer device as used in some embodiments, FIG. 1C shows an aperture assembly as used in some embodiments, and FIG. 1D shows a detector assembly as used in some embodiments;

FIGS. 2A to 2J show aperture assembly configurations according to some possible embodiments, wherein FIG. 2A shows an aperture assembly having at least one concentric partial aperture configured with a first polarization orientation and at least one non-concentric partial aperture configured with a second polarization orientation, FIG. 2B shows an aperture assembly having at least one non-concentric partial aperture configured with a first polarization orientation and at least one other non-concentric partial aperture configured with a second polarization orientation, FIG. 2C shows an aperture assembly having at least one concentric partial aperture associated with a first polarization orientation and a plurality of non-concentric partial apertures associated with a second polarization orientation, FIG. 2D shows an aperture assembly having at least two non-concentric partial apertures of associated with different polarization orientations located at opposing sides of the aperture assembly, FIG. 2E shows an aperture assembly having two half-circle-shaped partial apertures associate with different polarization orientations, FIGS. 2F and 2G show aperture assemblies having at least two concentric partial apertures configured to apply a predefined phase difference to light/radiation passed therethrough, FIGS. 2H and 2I show polarizer and aperture assembly arrangements as used in possible embodiments, and FIG. 2J shows a possible setup of the front polarizer and aperture assembly;

FIGS. 3A to 3E show detector assembly arrangements according to some possible embodiments, wherein FIG. 3A shows a detector assembly utilizing a microlens array, FIG. 3B shows a detector assembly arrangement utilizing a microlens array and a phase retarder, FIG. 3C shows a detector assembly arrangement utilizing a microlens array and an array of phase retarders, FIG. 3D shows a detector assembly arrangement utilizing an array of polarizer elements and a bandpass filter, FIG. 3E shows a possible arrangement of phase retardation elements within the detector assembly;

FIGS. 4A to 4E schematically illustrate imaging techniques according to possible embodiments, wherein FIG. 4A shows light/radiation propagation in an imaging setup comprising a polarizer, aperture assembly, optical assembly, and a detector assembly, FIG. 4B shows light/radiation propagation in an imaging setup comprising an aperture assembly and a detector assembly, FIG. 4C illustrates light/radiation propagation through the aperture assembly used in possible embodiments, FIG. 4D shows light/radiation propagation in an imaging setup comprising a polarizer, non-concentric aperture assembly, imaging lens and detector assembly, and FIG. 4E shows light/radiation propagation in an imaging setup comprising a polarizer, a non-concentric aperture assembly, an imaging lens and detector assembly, while the (image) focal plane of the imaging setup is located anterior to the detector assembly plane;

FIGS. 5A to 5H schematically illustrate an imaging system according to other possible embodiments, wherein FIG. 5A shows a possible implementation of the imaging system, FIG. 5B shows a possible configuration of an aperture assembly used in the imaging system, FIG. 5C shows a possible configuration of a bandpass filter of the imaging system, FIG. 5D shows a possible detector assembly of the imaging system, FIG. 5E shows a possible front polarizer configuration of the imaging system, FIG. 5F shows a possible intermediate polarizer of the imaging system, FIG. 5G shows a detector assembly wherein groups of polarizer cells of polarization orientations are associated with a certain bandpass filter within a distribution of bandpass filters, and FIG. 5H shows a detector assembly wherein cells of bandpass filters are associated with a certain polarization orientation;

FIGS. 6A to 6E schematically illustrate an imaging system according to yet other possible embodiments, wherein FIG. 6A illustrates a possible implementation of the imaging system, FIG. 6B shows a front polarizer device as used in some embodiments, FIG. 6C shows an aperture assembly as used in some embodiments, FIG. 6D shows a detector assembly as used in some embodiments, and FIG. 6E demonstrates wavefronts propagations in possible embodiments;

FIGS. 7A to 7C schematically illustrate controllable phase shifting device according to possible embodiments, wherein FIG. 7A demonstrates variable phase shifting by controllable thickness change, FIG. 7B demonstrates variable phase shifting by controllable refraction index change, and FIG. 7C demonstrates variable phase shifting by controllable lens power/curvature change;

FIGS. 8A to 8D schematically illustrate an imaging system arrangement according to possible embodiments, wherein FIG. 8A shows a possible implementation of the imaging system, FIG. 8B shows a front polarizer device as used in some embodiments, FIG. 8C shows an aperture assembly as used in some embodiments, and FIG. 8D shows a detector assembly as used in some embodiments;

FIGS. 9A to 9C schematically illustrate an imaging system according to possible embodiments, wherein FIG. 9A illustrates combining an optical system such as shown in FIGS. 1A-1D and 3A-3E with a polarization-based interferometer, FIG. 9B shows a further embodiment utilizing a retarder to manipulate light from the polarization-based interferometer, and FIG. 9C illustrates an imaging system comprising a polarization-based interferometer portion, such as shown in FIG. 9B, with an embedded retarder element.

Figure 2J:
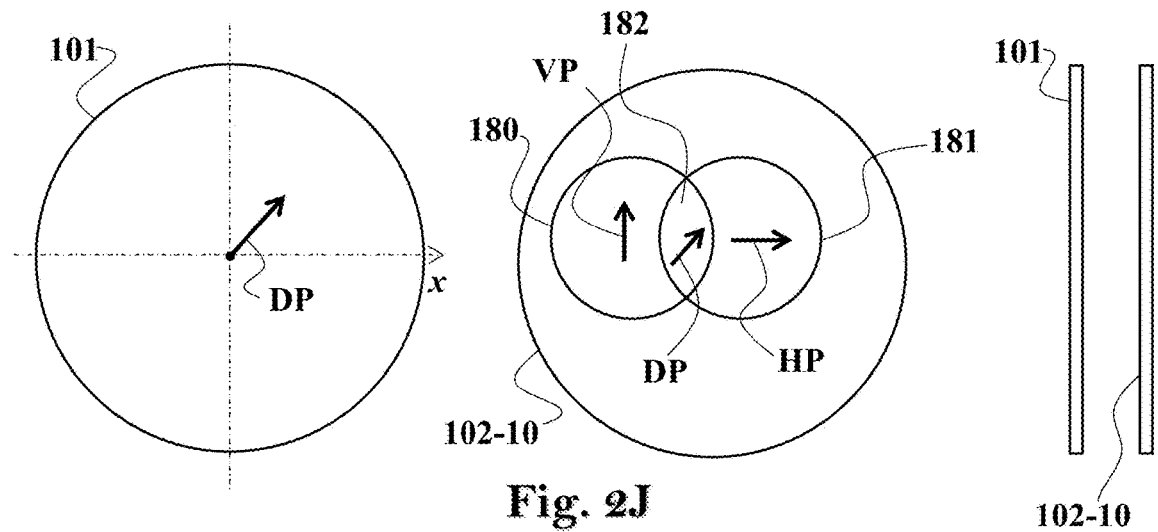

10A, 10B and 10C, utilizing a local phase shift determined by a polarization based interferometric imaging setup.

DETAILED DESCRIPTION OF EMBODIMENTS

One or more specific and/or alternative embodiments of the present disclosure will be described below with reference to the drawings, which are to be considered in all aspects as illustrative only and not restrictive in any manner. It shall be apparent to one skilled in the art that these embodiments may be practiced without such specific details. In an effort to provide a concise description of these embodiments, not all features or details of an actual implementation are described at length in the specification. Elements illustrated in the drawings are not necessarily to scale, or in correct proportional relationships, which are not critical. Emphasis instead being placed upon clearly illustrating the principles of the invention such that persons skilled in the art will be able to make and use imaging setups for determination of three-dimensional coordinates of objects, once they understand the principles of the subject matter disclosed herein. This invention may be provided in other specific forms and embodiments without departing from the essential characteristics described herein.

The following disclosure provides techniques for determining distances of object points (also referred to herein as point-sources) based on polarized light/radiation reflected/emitted from said point(s), or polarized after it is reflected/emitted from the object, and split into two or more components by passing the light/radiation through two or more partial apertures having predetermined geometrical and optical properties (e.g., distances, polarization orientation, surface area, retardation, or suchlike). The two or more partial apertures are configured for passing light/radiation therethrough with predefined polarization orientation differences (e.g., 90°) between the components of the light/radiation passed through the two or more partial apertures, so as to provide a distribution of the intensity/energy of these light/radiation components for measurement by an optical detector assembly. An array (e.g., rectangular grid) of polarizer elements configured with a plurality of predetermined spatially distributed polarization orientations is used in some embodiments to affect a spatial intensity/energy distribution of the light/radiation components measured at the detector assembly.

Processing means can be used to process measurement data/signals generated by the optical detector assembly responsive to the light/radiation components thereby received e.g., from the array of polarizer elements, determine an intensity/energy distribution of the received light/radiation components, compute, based on the determined intensity/energy distribution, phase differences and/or spatial intertwined image location differences, between the light/radiation components passed through the two or more partial apertures, and determine distances of various points on the object surface from the imaging system.

In some embodiments two or more partial apertures are used to controllably apply a plurality predefined phase differences between light/radiation components received from the object and passed through the two or more partial apertures at different time instances, and the phase differences between the light/radiation components passed through the two or more partial apertures are determined by solving an equation system constructed based on measurement data/signals acquired by the detector assembly for the different phase differences applied to the light/radiation components at the different time instances. In some embodiments such equation system is constructed utilizing parameters determined from a corresponding plurality of measurement data/signals acquired by the detector assembly for the different phase differences applied at the different time instances. Optical path difference (OPDs) between the light/radiation components passed through the two or more partial apertures can be then determined from the determined phase differences.

In some embodiments a controllable variable polarizer is used in the imaging system for passage therethrough of different portions of light/radiation of different predetermined polarization orientations emerging/received from points of the object in the field of view of the imaging system, at different time instances. The energies/intensities of the different portions of the light/radiation at the different time instances and different predetermined polarization orientations is measured by the detector assembly, and respective differences, in phase between the light/radiation components passed through the two or more partial apertures, or between locations of intertwined images acquired by the detector assembly (also referred to herein as image localization), can be then determined by solving an equation system constructed utilizing parameters determined from a corresponding plurality of measurement data/signals acquired by the sensor device of the detector assembly for the different polarization orientations applied at the different time instances.

The differences in OPDs or in image localization determined in the various embodiments disclosed herein can be used to determine distances between points on the object in the field of view of the imaging system, and the imaging system itself.

The imaging setups/systems disclosed herein may also be combined in some embodiments with a polarization based interferometric imaging setup for increasing the resolution and/or dynamic range of a distance measure determined from imagery data of the imaged object acquired by any of the imaging setups disclosed herein. The polarization based interferometric imaging setup is configured to (e.g., simultaneously) acquire imagery data of the imaged object via an array of spatially distributed polarizing elements, and determine based on the acquired imagery data local phase shift(s) indicative of deviations/misalignments of source-points of the imaged object from an object focal plane of the setup/system. This way, the dynamic range of a distance measurement determined utilizing any of the imaging setups/systems disclosed herein (i.e., that do not include the polarization based classic interferometric imaging setup), can be improved e.g., down to a fraction of a wavelength based on a local phase difference determined utilizing the polarization based interferometric imaging setup.

For an overview of several example features, process stages, and principles of the invention, the examples of distance determination setups illustrated schematically and diagrammatically in the figures are intended for 3D imaging purposes. These detection setups are shown as one example implementation that demonstrates a number of features, processes, and principles used for construction of 3D model/image of one or more surface areas of an imaged object, but they are also useful for other applications and can be made in different variations. Therefore, this description will proceed with reference to the shown examples, but with the understanding that the invention recited in the claims below can also be implemented in myriad other ways, once the principles are understood from the descriptions, explanations, and drawings herein. All such variations, as well as any other modifications apparent to one of ordinary skill in the art and useful in 3D imaging applications may be suitably employed, and are intended to fall within the scope of this disclosure.

Reference is now made to FIG. 1A which is a simplified pictorial illustration of an optical system 100 in accordance with a possible embodiment useful for determining three-dimensional coordinates of at least some portion of object(s) 130 in the field of view (FOV) of said optical system 100. The optical system 100 comprises a front polarizer 101, an aperture assembly 102 which is optionally, but in some embodiments preferably, located at the aperture plane of the optical system 100, an optical assembly 103, an intermediate (e.g., patterned) polarizer 105, a bandpass filter 104, and a sensor device 106 located at an image plane 106f of the optical assembly 100 with respect to the object 130. The term aperture plane is used herein to refer to the Fourier conjugate plane of the object's focal plane 130f of the optical imaging assembly 103.

The sensor device 106 (e.g., CCD or CMOS imager) is coupled to a processor unit 107 configured and operable to analyze measurement data/signals (also referred to herein as imagery data/signals) acquired by the sensor device 106 and indicative of intensity/energy of the incident light/radiation received therein.

The processor unit 107 comprises one or more processing units (CPU and/or GPU) and memories 107m configured and operable to store program code and other data usable for operating the optical system 100, and for processing and analyzing the measurement data/signals acquired by the sensor device 106. The processor unit 107 may be used to present to user(s) of the optical system 100 information associated with the acquired measurement data/signals, and/or the model/image thereby constructed (whether three-dimensional or not), through a display device/system (not shown). The optical assembly 103 (e.g., one or more imaging lenses) may comprise several optical elements, and it is designed and constructed in some embodiments such that the image thereby formed on the sensor device 106 is substantially diffraction limited throughout the relevant wavelength range for which the optical system 100 is being used.

For example, but without limiting, the wavelength range of the optical system 100 can be defined within a narrow-band wavelength range e.g., of up to few nanometers. Alternatively, in possible embodiments the wavelength range of the optical system 100 can be defined within a broadband range e.g., the visible wavelength range, which is typically defined as the 400 nm to 700 nm wavelength range.

Properties of the bandpass filter 104 can be determined based on the required wavelength range of the optical system 100, and other parameters arising from the physical requirements of the optical system 100 e.g., the coherence length of the light/radiation required for the optical system 100, which is discussed in detail hereinbelow.

Optionally, but in some embodiments preferably, the sensor device 106 is a monochrome sensor. The optical system 100 can be designed in such embodiments for operation with short wavelength range light/radiation (i.e., wavelength range<30% of the mid-wavelength of the light/radiation transmitted/reflected from the object), and in such cases the bandpass filter 104 can be located in various positions along the optical path (130t) of the optical system 100. For example, in possible embodiments the bandpass filter 104 is positioned anywhere proximally to the optical assembly 103 with respect to the direction of propagation of light/radiation 130t in the system 100. Alternatively, the bandpass filter 104 can be implemented as part of the coating(s) of one or more optical surfaces of the optical assembly 103. In some embodiments, wherein the object 130 is illuminated by a narrow band (optional, designated in a dashed-line box) light/radiation 133t from light/radiation source 133, the bandpass filter 104 may be redundant/omitted, as exemplified in FIG. 1D.

As illustrated in FIG. 1A, the light/radiation 130t traversing through the front polarizer 101 reaches the aperture assembly 102, which is located in some embodiments at the aperture plane of the optical assembly (e.g., of imaging lens) 103, with a predefined linear polarization orientation defined by the front polarizer 101 e.g., 45° according to the embodiment exemplified in FIG. 1B, and/or by the optional light/radiation source 133. As exemplified in FIG. 1C, the aperture assembly 102 comprises in some embodiments a central/circular partial aperture 108, and a ring/annular partial aperture 109 concentric with the central circular partial aperture 108. The central circular partial aperture 108 and the ring/annular partial aperture 109 are arranged and configured such that the polarization of the light/radiation 130t emerging from the aperture assembly 102 after traversing/passing through its ring/annular partial aperture 109 is substantially perpendicular to the polarization of the light/radiation emerging from the aperture assembly 102 after traversing/passing through its central/circular partial aperture 108.

Optionally, but in some embodiments preferably, the aperture assembly 102 is configured such that the amount of energy of the light/radiation 130t emerging from the ring/annular partial aperture 109 is similar/substantially equals to the amount of energy of the light/radiation 130t emerging from the central/circular partial aperture 108. The above-described attributes can be achieved, for example, as exemplified in FIG. 1C, by configuring the ring/annular partial aperture 109 and the central circular partial aperture 108 with similar/substantially equal surface areas, and such that their polarization directions (e.g., by utilizing suitable polarizer elements in each partial aperture) are substantially perpendicular one with respect to the other.

For example, and without limiting, the direction of polarization affected at the ring/annular partial aperture 109 can be substantially perpendicular to the polarization direction affected by the central circular partial aperture 108, while the direction of the polarizations affected by each one of the partial apertures 108,109 is about 45° with respect to the polarization direction affected by the front polarizer 101 (the arrowed lines shown in FIGS. 1B and 1C represent the orientation/direction of polarization of light/radiation emerging from the front polarizer 101 and from the partial apertures of the aperture assembly 102, respectively). In possible embodiments, wherein polarized illumination is applied by the (optional) light/radiation source 133, the polarization directions of the polarizers used at the central circular partial aperture 108 and at the ring/annular partial aperture 109 can be configured to be 45° relative to the direction of polarization of the polarized illumination 133t produced by the (optional) light/radiation source 133 i.e., the front polarizer 101 can be redundant/omitted in such configurations.

As illustrated in FIG. 1D, in some embodiments the intermediate polarizer 105 is a type of patterned polarizer comprising an array of small-sized polarizer elements 105e, the size of which is comparable to/about the size of the pixels 106p of the sensor device 106. It is preferable that the size of each polarizer element 105e of said array (105) is substantially equal to the size of a single pixel 106p of the sensor device 106. Optionally, the size of each polarizer element 105e of the intermediate polarizer array (105) equals to/is about the size of several/a group of pixels 106p of the sensor device 106. Optionally, but in some embodiments preferably, all different polarizer elements 105e of said intermediate polarizer array 105 are formed with a similar/same size.

In possible embodiments the intermediate polarizer 105 includes sets/groups 105s of several (e.g., two, four or other, preferably, but not limited to, even number of) local polarizer elements 105e having respective number of different polarization directions (denoted by arrowed lines). In the specific and non-limiting example shown in FIG. 1D the intermediate polarizer 105 comprises rectangular/square-shaped sets/groups 105s of four local polarizer elements 105e having the following four different polarization directions/orientations: 0° horizontal polarization (HP), 90° vertical polarization (VP), 45° diagonal polarization (DP), and 135°, also noted alternately as −45°, (anti-) diagonal polarization (ADP) (both relative to the horizonal plane). As shown in FIGS. 1A and 1D, the intermediate (e.g., patterned) polarizer 105 can be aligned relative to the sensor device 106, such that each polarizer element 105e thereof (the orientation of which is either in the HP, VP, DP or ADP direction) is aligned with (i.e., in front of) a respective single pixel 106p of the sensor device 106.

Accordingly, the four (4) different polarizer elements 105e, of each polarizers' set/group 105s of the intermediate (e.g., patterned) polarizer 105 are adjacent to each other, though their specific order does not affect the performance of the optical system 100. It is noted that the polarizer elements 105e of the polarizers' sets/groups 105s may be arranged differently e.g., in different locations along the width and/or length of the intermediate (e.g., patterned) polarizer 105, and/or with a different number of polarizer elements in each polarizers' set/group 105s, and/or using different polarization orientations (e.g., 20°, 100°, 170°, −50°), or order, and/or including some null polarizing elements (i.e., elements through which all of the polarization orientations of the incoming light/radiation are substantially passed).

While in the specific example of FIG. 1A the sensor device 106 is located at the image plane 106f of the optical system 100, the intermediate (e.g., patterned) polarizer 105 is located at the vicinity of and anterior to the image plane 106f i.e., at, or in the vicinity of the sensor device 106. The vicinity range between the sensor device 106 and the intermediate polarizer 105 can be such the distance between the intermediate (e.g., patterned) polarizer 105 and the sensor device 106 is below the focal depth of the optical assembly (e.g., imaging lens) 103. It is thus appreciated that though the intermediate (e.g., patterned) polarizer 105 and the sensor device 106 are presented as separate components, in some embodiments they are formed as a single assembly, denoted in the figures as detector assembly 110.

Figure 3A:
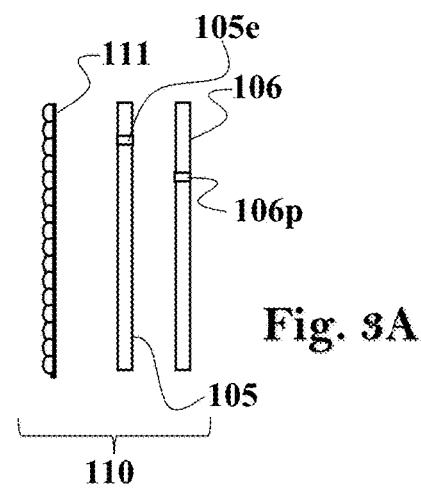

The detector assembly 110 (e.g., a "monochrome assembly", which can be similar to, or implemented by, the "monochrome sensor assembly" IMX250MZR manufactured by Sony Semiconductor Solutions Incorporated) is configured in some embodiments to include a microlens array, as exemplified in FIG. 3A, wherein a microlens array 111 is located anterior to the intermediate (e.g., patterned) polarizer 105 and is configured to improve the efficiency of the detector assembly 100 to collect as much energy as possible in each sensor element/pixel 106p of the sensor device 106. Alternatively, and in some embodiments preferably, the detector assembly 110 may also include a quarter-wavelength ($\lambda/4$ waveplate) retarder waveplate 111a, as exemplified in FIG. 3B, wherein the quarter-wavelength retarder waveplate 111a is positioned anterior to the intermediate polarizer 105 e.g., between the intermediate polarizer 105 and microlens array 111, for applying a constant phase shift to the differently polarized light/radiation components reaching the intermediate polarizer 105.

Figure 3C:
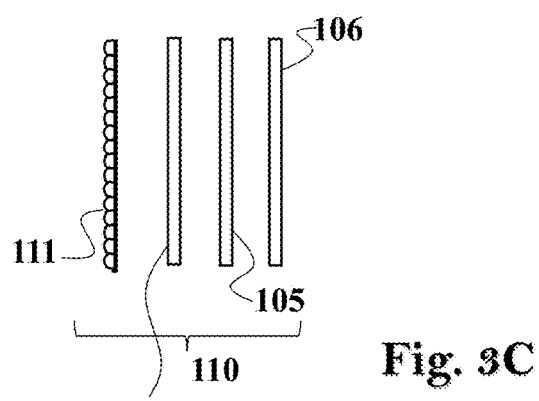

Optionally, but in some embodiments preferably, a local variable/patterned intermediate retarder waveplate 111b, such as illustrated in FIG. 3C, is positioned anterior to the intermediate polarizer 105. For example, in the non-limiting example of FIG. 3C, the intermediate (e.g., patterned) retarder 111b is located in the vicinity of the sensor device 106 e.g., between the microlens array 111 and the intermediate polarizer 105. In some embodiments the intermediate retarder 111b includes an array of retardation elements 111s e.g., comprising two or more different retardation elements alternatingly distributed over adjacent cells/groups 111c thereof.

In the intermediate retarder 111b shown in FIG. 3C, a rectangular alternating grid is formed using $\lambda/4$ retardation elements 111s spatially alternated therein with null (i.e., zero retardation, allowing passage of light/radiation therethrough without causing a phase shift) retardation elements 111n. This way, the $\lambda/4$ retardation elements 111s can be arranged to direct the phase-shifted light/radiation therefrom onto respective polarizer elements 105e of the intermediate polarizer 105 having certain one or more specific polarization orientations, and the null retardation elements 111n can be arranged to direct non-phase-shifted light/radiation onto respective polarizer elements 105e of one or more other polarization orientations of the intermediate polarizer 105.

Figure 3B:
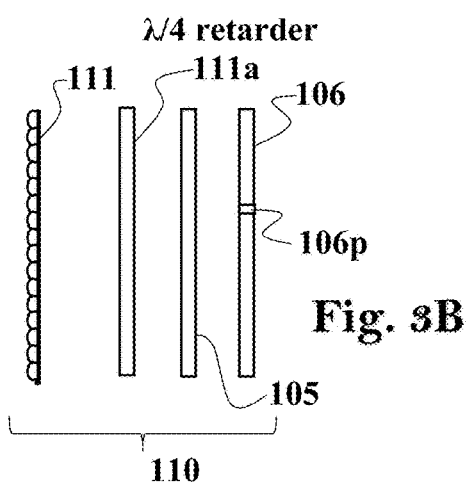
Figure 3D:
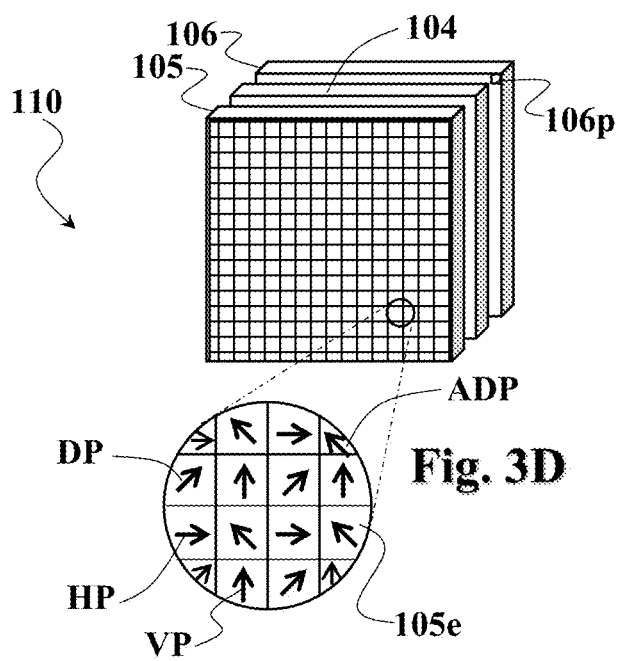
Figure 3E:
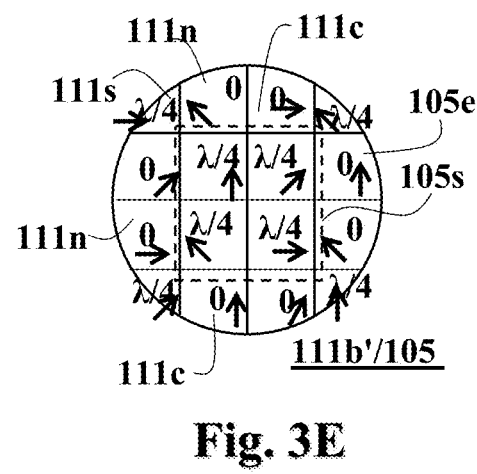

FIG. 3E shows an arrangement of retardation elements 111c of a possible retarder implementation 111b' according to some possible embodiments placed in alignment with polarization elements 105e of the intermediate polarizer 105. As exemplified, the retardation elements 111c of the retarder 111b' can be aligned with/overlap cells/groups 105s of the polarization elements 105e of the intermediate polarizer 105, such that the same retardation/phase shift is applied to the light/radiation reaching all of the polarization elements 105e of each cell/group 105s of intermediate polarizer 105. This can be achieved using a respective retardation element 111c of the same retardation/phase shift for each polarization direction of the polarization elements 105e within the cell/group 105s, or by using a smaller number of (e.g., single and larger) retardation elements 111c of a certain retardation/phase shift aligned with/overlapping the polarization elements 105e of a certain cell/group 105s.

In this non-limiting example the retardation elements 111c of the retarder 111b' comprises retardation elements (e.g., $\lambda/4$) 111s and null (zero) retardation elements 111n of the retarder 111b', arranged to form a rectangular/square alternating grid of retardations/phase shifts. Particularly, each retardation/phase shift of the rectangular/square alternating grid is aligned with/overlap a respective cell/group 105s of all different polarization orientations of the polarizer elements 105e of the intermediate polarizer 105, such that the retardation/phase shift between adjacently located cells/groups 111c of retardation elements 111e differs by a predefined amount e.g., $\lambda/4$. Such spatial distribution of retardation elements 111c can be similarly achieved utilizing pairs of retardation elements 111n and 111s having different retardations/phase shifts e.g., ($\lambda/4$, 0), ($\lambda/4$, $\lambda/2$), ($\lambda/2$, $3\lambda/4$), etc.

In possible embodiments the retarder waveplate 111a, e.g., a $\lambda/4$ waveplate, shown in FIG. 3B, can be placed anterior to the detector assembly 110 along the optical path (130t) of the optical system 100, and not necessarily as part of detector assembly 110. In such possible embodiments, the retarder waveplate 111a affects the polarization of the whole image, which, though does not affect the relative difference between the original horizontal and vertical polarizations of the light/radiation reaching the sensor device 106, may affect the sensitivity of the optical system 100 to changes in the polarization reaching the intermediate polarizer 105, and thus affect the power/intensity measured at the sensor device 106. Similar effect can be achieved by applying phase retardation (e.g., by applying an extra thickness) to some of the partial apertures of the aperture assembly 102 e.g., partial aperture 109, as long as it maintains the general features of the aperture assembly 102 having at least two partial apertures configured such that the light/radiation passing through its partial apertures have substantially similar/equal energy amount, and substantially perpendicular polarization orientations difference therebetween i.e., of the partial wavefronts emerging through the partial apertures.

FIG. 3D shows a detector assembly 110 according to some embodiments utilizing an intermediate polarizer 105 comprising a plurality of polarizer elements 105e and a bandpass filter 104 located between the intermediate polarizer 105 and the sensor device 106. Each polarizer element 105e of the intermediate polarizer 105 is configured for passage of light/radiation therethrough at a predefined polarization orientation, which is different from polarization orientation of the light/radiation that passes through polarizer elements 105e located locally adjacent thereto. In embodiments wherein the intermediate polarizer 105 has three, or less, different polarization orientations, the polarizer elements 105e are distributed such that the polarization orientation of each polarizer element 105e is different from the polarization orientations of the polarizer elements 105e horizontally and vertically adjacently located thereto. This way, a spatial distribution of polarization orientations of the polarizer elements 105e is obtained by the intermediate polarizer 105.

Each polarizer element 105e of the intermediate polarizer 105 can be aligned with/overlap respective one or more sensor elements 106p of the sensor device 106, such that a distribution of light/radiation intensities/energies can be measured by the sensor device 106 responsive to the passage of the light/radiation through the polarizer elements 105e of the intermediate polarizer 105. In this specific and non-limiting example the polarizer elements 105e of the intermediate polarizer 105 are configured to provide a spatial distribution of light/radiation in the HP, VP, DP and ADP, polarization orientations, but other predefined polarization orientations can be similarly used. The bandpass filter 104 is configured for passage of light/radiation therethrough only within a predefined wavelength range (e.g., in the 475 to 625 nanometers range) towards the sensor device 106.

In possible embodiments, each local polarizer element 105e, of the intermediate (e.g., patterned) polarizer 105 is arranged so as to cover a plurality of pixels of the sensor device 106. In such possible embodiments each local polarizer element 105e within a specific polarization set/group 105s of the intermediate polarizer 105 is configured for covering the same number of pixels 106p of the sensor device 106, though in possible embodiments different polarizations sets/groups 105s within the intermediate polarizer 105 may be configured to cover different number of pixels 106p of the sensor device 106.

In possible embodiments the intermediate (e.g., patterned) polarizer 105 is configured to include different number of polarization orientations of its polarizer elements 105e, whether it is as little as two, three, or more than four (4), while the polarization orientation of each polarizer element 105e is aligned with a single pixel 106p, or with a plurality of pixels 106p, of the sensor device 106.

In yet other possible embodiments, the orientations of the different polarization elements 105e of the polarizer element 105e of the intermediate (e.g., patterned) polarizer 105 is not necessarily as demonstrated in FIG. 1A, and different polarization orientations may be similarly applicable.

In possible embodiments the intermediate (e.g., patterned) polarizer 105 is located anteriorly away from the sensor device 106 along the optical path (130t), while the intermediate (e.g., patterned) retarder 111b is located at the image plane 106f. In such possible embodiments a relay lens (not shown) can be used to re-image the image plane 106f onto the sensor device 106, which accordingly will be located further away from the optical assembly (e.g., imaging lens) 103.

Figure 4A:
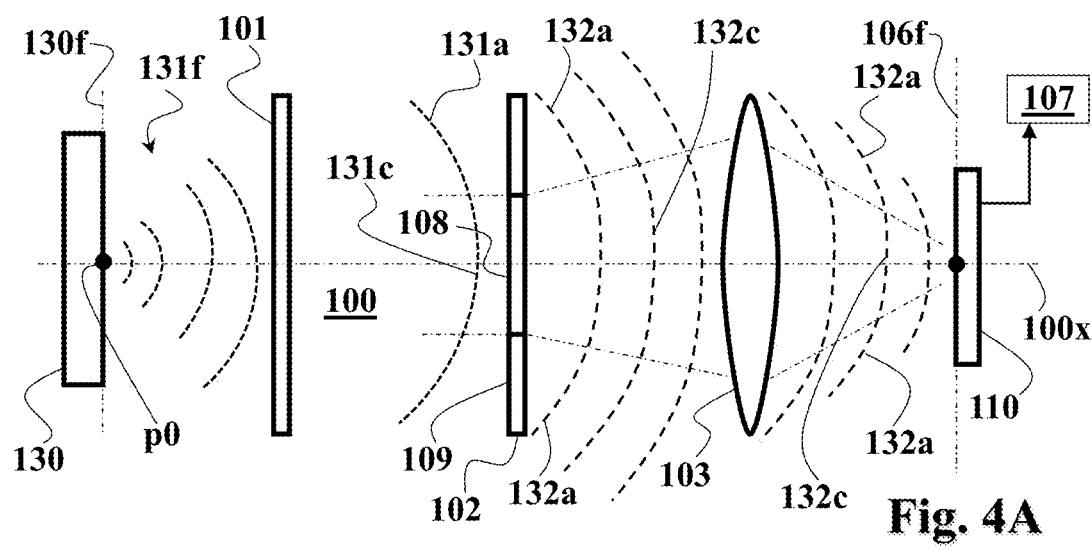

Reference is now made to FIG. 4A, schematically illustrating propagation of light/radiation in the optical system 100 configured to image the object 130 onto its sensor device (106) embedded in the detector assembly 110 of FIG. 3D. In this non-limiting example, the object 130 is located at the focal plane 130f of the optical system 100, such that the light/radiation received from the imaged object 130 by the optical system 100 is focused onto the sensor device (106) of the detector assembly 110.

In the following explanation, for the sake of simplicity: (1) the object 130 is referred to as an object having a linear/flat front surface area located at the focal plane 130f; (2) a bandpass filter (e.g., 104 in FIG. 3D), though not shown in FIG. 4A, may be embedded in the detector assembly 110 or positioned anterior thereto in any suitable location along the optical path (130t) of the optical system 100; and (3) the intermediate (e.g., patterned) polarizer (105) and the sensor device (106), though not explicitly shown in FIG. 4A, are embedded in the detector assembly 110.

The wavefront 131f emitted from a point-source p0 on the object 130 is divided into two (or more) separate wavefront portions 132a, 132c after it passes through the two (or more) partial apertures 108,109 of the aperture assembly 102. Optionally, but in some embodiments preferably, the two (or more) separate wavefront portions 132a, 132c that pass through the aperture assembly 102 are of equal energy, and they are perpendicularly polarized one with respect to the other e.g., the direction of polarization of the central wavefront portion 132c which emerges following traversing through the central circular partial aperture 108 is substantially perpendicular to the direction of polarization of the annular wavefront portion 132a, which emerges following traversing through ring/annular partial aperture 109.

As mentioned hereinabove, since the optical system 100 is designed in some embodiments to be diffraction limited, both the annular and the central wavefront portions, 132a and 132c respectively, reach the sensor device 106 having substantially the same phase. As exemplified in FIG. 1A, in some embodiments the light/radiation passing through the central partial aperture 108 of the aperture assembly 102 is linearly-horizontally polarized, and the light/radiation passing through its ring/annular partial aperture 109 is linearly-vertically polarized. Reviewing the polarization evolution of the wavefront 131f emerging from the point p0, it turns into a 45° oriented linearly polarized light/radiation following passage through the front polarizer 101, and it is then divided into the central wavefront component 132c having a linear horizontal polarization, and into the annular wavefront portion 132a having a linear vertical polarization.

As exemplified herein, in some embodiments, both the central wavefront portion 132c and the annular wavefront portion 132a substantially have the same amount of energy, and their directions of polarizations are perpendicular one with respect to the other. Once both wavefront portions 132c,132a reach the intermediate (e.g., patterned) polarizer 105, which in some embodiment is part of the detector assembly 110 i.e., it is located at, or near, the image plane of the optical system 100, they substantially have the same phase. Thus, once reaching the image plane 106f, the combined polarization of the two wavefront portions 132c,132a results in a 45° linearly polarized light/radiation.

Accordingly, due to the different polarizer elements 105e of the intermediate (e.g., patterned) polarizer 105, as demonstrated in FIG. 1D, the pixels 106p of the sensing device 106 corresponding to the 45° linear (DP) polarizer elements 105e of the polarizer 105 will receive/measure maximal light/radiation energy (normalized to 100%), the pixels 106p corresponding to the horizontal (HP) and vertical (VP) polarizations will typically receive/measure half of the maximal light/radiation energy (normalized to 50%), and the pixels 106p corresponding to the −45° (ADP) polarization will receive/measure minimum, or even zero, light/radiation energy.

For the purpose of the following description, it is assumed that the phase difference applied to the light/radiation by the optical assembly (e.g., imaging lens) 103 after its passage through the aperture assembly 102 i.e., the phase difference between the central wavefront portion 132c and the ring/annular wavefront portion 132a, arising from optical system 100 is considered to be negligibly small. Thus, the central portion of the wavefront 131f (denoted as 131c i.e., which becomes the central wavefront portion 132c) and the annular portion of the wavefront 131f (denoted as 131a i.e., which becomes the ring/annular wavefront portion 132a) respectively reaching the central partial aperture 108 and the ring/annular partial aperture 109 of the aperture assembly 102, having substantially the same phase. This assumption is not required for the purpose of this embodiment but is rather used for simplicity of the discussion and shall be referred to with reference to FIGS. 4B and 4C hereinbelow.

Figure 4B:
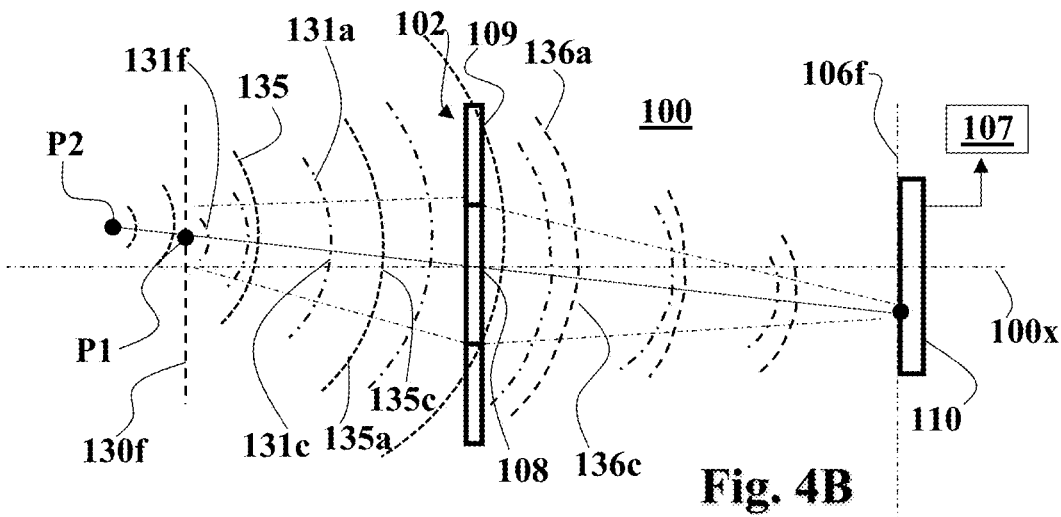

FIG. 4B schematically illustrates the wavefronts 131f and 135 respectively emerging from the off-axis point-source p1 located on the focal plane 130f, and from the off-axis point-source p2 located away from focal plane 130f i.e., further away from aperture assembly 102, which are on the same axis/line connecting the center of the aperture assembly 102 of optical system 100 and point-source p1. For the sake of simplicity, most elements of the optical system 100 are not shown in FIG. 4B, wherein only the aperture assembly 102 and the detector assembly 110 are shown.

As seen, the wavefront 131f emerging from the off-axis point-source p1 has a smaller radius when arriving at the aperture assembly 102 relative to the radius of wavefront 135 emerging from the point-source p2. Under the simplicity assumption provided hereinabove, the central portion 131c of the wavefront 131f, and the ring/annular portion 131a of the wavefront 131f, reach, respectively, the central partial aperture 108 and the ring/annular partial aperture 109 of the aperture assembly 102, with the same phase. Since the wavefront 135 reaches the aperture assembly 102 having a larger radius then that of the wavefront 131f while reaching aperture assembly 102, and since the wavefront 131f reaches the aperture assembly 102 having the same phase for all partial wavefronts (as per the assumption detailed hereinabove), it is evident that the central portion 135c of the wavefront 135 reaching the central partial aperture 108 has a different phase than that of the ring/annular portion 135a of the wavefront 135 reaching ring/annular partial aperture 109.

Reviewing the polarization evolution of the wavefront 135 emerging from the off-axis point p2, it turns into a 45° oriented linearly polarized light/radiation following passage through the front polarizer (101, shown in FIG. 1A), it is then divided by the aperture assembly 102 into the central wavefront portion 136c and the ring/annular wavefront portion 136a. Both the central wavefront portion 136c and ring/annular wavefront portion 136a have preferably the same energy and, typically, polarization orientations that are perpendicular one with respect to the other. Since the central and the ring/annular wavefront portions, 136c and 136a, were formed from the central wavefront 135c and the ring/annular wavefront portion 135a, respectively, of the wavefront 135, there is a phase shift/difference between them.

Once both of the central and the ring/annular wavefront portions, 136c and 136a, reach the detector assembly 110 located at, or near, the image plane 106f of the optical system 100, due to the phase shift/difference between the two partial wavefronts 136c and 136a, the combined polarization orientations of these partial wavefronts at the detector assembly 110 is not necessarily linear. For example, in case the phase difference between the central wavefront portion 136c and the ring/annular wavefront portion 136a is 90° when reaching the intermediate (e.g., patterned) polarizer (105, shown in FIG. 1A), located at, or in the vicinity of, the image plane 106f, the combined polarization orientations of the two wavefront portions obtained is typically circular.

Thus, due to the different local polarizer elements (105e) of the intermediate (e.g., patterned) polarizer 105, as demonstrated in FIG. 1A, the measurement data/signals acquired by all four pixels (106p) corresponding to the horizontal (HP), vertical (VP), 45° (DP) and −45° (ADP) polarizer elements (105e) of each polarizers' set (105s), will each exhibit the same amount of energy. For any other phase difference between the two wavefront portions 136c,136a a different energy distribution between the measurement data/signals acquired by the various pixels (106p) corresponding to the four polarizer elements (105e) of each polarizers' set (105s), will be obtained.

Accordingly, the distribution of the energy of the light/radiation received/measured by two or more pixels 106p of the sensor device 106 from respective two or more polarizer elements 105e of the intermediate polarizer 105 having different polarization orientations, is indicative of the phase difference between the wavefront portions (e.g., 136c,136a) that have passed through the partial apertures (e.g., 108,109) of the aperture assembly 102. The phase difference between the two (or more) wavefront portions that passed through the partial apertures of the aperture assembly 102 can be determined based on the distribution of the energy measured by the two or more pixels 106p of the sensor device 106 from respective two or more polarizer elements 105e of the intermediate polarizer 105. Based on the determined phase difference and the known system parameters, such as polarization orientation, geometrical dimensions, location of and distance(s) between, the partial apertures of the aperture assembly 102, system focal length, etc., the distance between the off-axis point p2 and the optical system 100 can be computed, as will be explained hereinbelow in details.

Figure 4C:
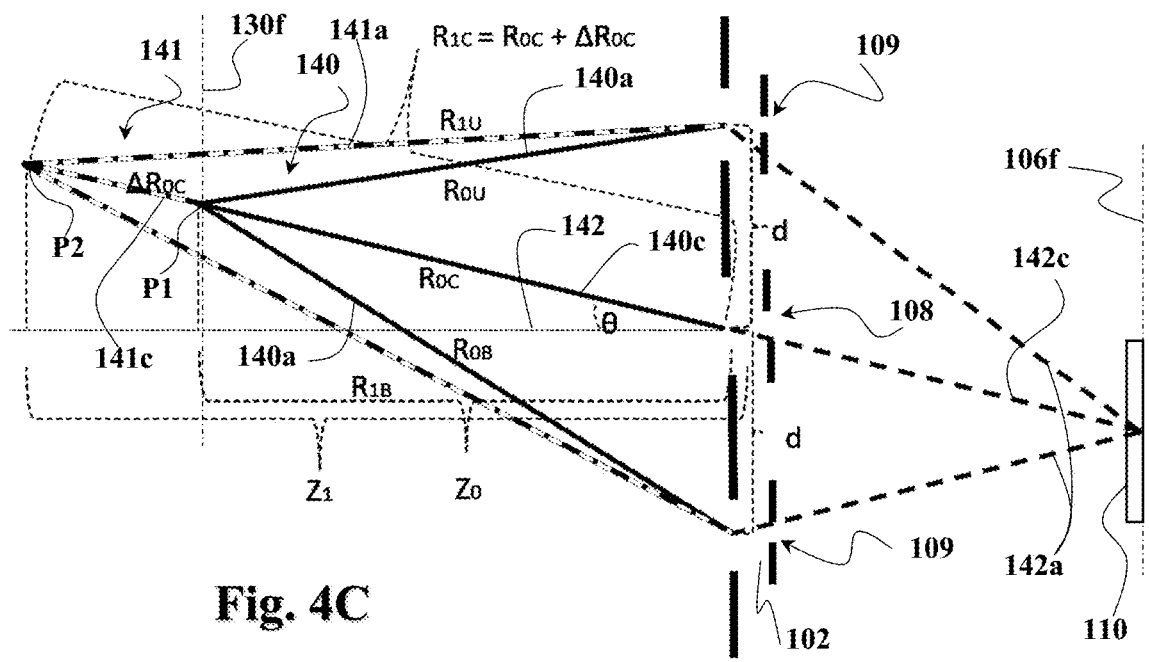

Similar to FIG. 4B, FIG. 4C schematically illustrates light/radiation beams 140 and 141 respectively emerging from the off-axis point-source P1 located on the focal plane 130f, and from the off-axis point-source P2 located anteriorly away from focal plane 130*f* i.e., further away from optical assembly (e.g., imaging lens) 103. For the purpose of simplicity, the following adjustments have been made in FIG. 4C: (1) most optical elements of the optical system 100 are not shown, such that only the aperture assembly 102 and the detector assembly 110 are presented explicitly; (2) the ring/annular partial aperture 109 has been narrowed down to a thin ring at the outer perimeter of the aperture assembly 102; and (3) the central/circular partial aperture 108 has been narrowed down to a small circle around the center of the aperture assembly 102. As an alternative to FIG. 4B, FIG. 4C illustrates the wavefronts as rays/beams rather than arched-shaped wavefronts.

As explained in detail hereinabove, the light/radiation beams 140, which are illustrated as central light/radiation beams 140*c* traversing through central partial aperture 108, and ring/annular light/radiation beams 140*a* traversing through ring/annular partial aperture 109, emerging from the off-axis source-point P1, reach the sensor device (106) embedded in the detector assembly 110, while all portions of the light/radiation breams are in the same phase (due to the diffraction limited properties of optical system 100). As explained in detail hereinabove with reference to FIG. 4B, the light/radiation beams 141 emerging from the off-axis source-point P2, comprised of the central light/radiation beams portion 141*c* and the annular light/radiation beams portion 141*a* passing through the circular/central partial aperture 108 and the ring/annular partial aperture 109, respectively, reach the detector assembly 110 as central light/radiation beams 142*c* and annular/ring light/radiation beams 142*a* respectively, with a phase difference between them. As explained hereinabove with reference to FIG. 4B, it is assumed for the sake of simplicity that a phase difference is arising primarily from the different optical paths of the annular/ring light/radiation beams 141*a* and of the central light/radiation beams 141*c* traveling from the off-axis point-source P2 to the aperture assembly 102.

As will be explained hereinbelow in details, the phase shift between the central and ring/annular light/radiation beams portions 142*c*,142*a* is directly related to the optical path difference (OPD) caused due to the passage of the light/radiation portions through the different partial apertures of the aperture assembly 102, which is directly correlated to the off-axis location of the ring/annular partial aperture 109 and the on-axis location of the central/circular partial aperture 108, which is used in some embodiments to determine the horizonal distance between the off-axis point-source P2 and the aperture assembly 102, denoted as $Z_1$ in FIG. 4C.

The distances $R_{1u}$ and $R_{0u}$ of the remote off-axis point-source P2 and of the off-axis point-source P1 located on the focal plane 130*f*, respectively, from the center of the central partial aperture 108 of the aperture assembly 102, can be determined as follows:

$$R_{1U} = \sqrt{R_{1C}^2 + d^2 - 2dR_{1C}\cos\left(\frac{\pi}{2}-\theta\right)} = \sqrt{R_{1C}^2 + d^2 - 2dR_{1C}\sin(\theta)}; \text{ and}$$

$$R_{0U} = \sqrt{R_{0C}^2 + d^2 - 2dR_{0C}\cos\left(\frac{\pi}{2}-\theta\right)} = \sqrt{R_{0C}^2 + d^2 - 2dR_{0C}\sin(\theta)},$$

where θ is the angle between the central rays $R_{1C}$,$R_{0C}$ and the focal axis 142, d is the distance between the average radius of the ring/annular partial aperture 109 and the average radius of the central partial aperture 108, where in this specific and non-limiting example, as illustrated and exemplified in FIG. 4C, the distance d can be approximated by the radius of the ring/annular partial aperture 109. Accordingly, the optical path difference (OPD) between the two rays $R_{1u}$ and $R_{0u}$ is—

$$OPD(u) = R_{1u} - R_{\theta u}$$

For very small values of θ, and for the sake of simplicity, $\sin(\theta) \approx \theta$, and thus the distances $R_{1u}$ and $R_{0u}$ can be determined with relatively good accuracy as follows:

$$R_{1U} = R_{1C}\sqrt{1+\frac{d^2}{R_{1C}^2}-\frac{2d\theta}{R_{1C}}};$$

$$R_{0U} = R_{0C}\sqrt{1+\frac{d^2}{R_{0C}^2}-\frac{2d\theta}{R_{0C}}}.$$

Based on the following approximation $$1\sqrt{1+x} \approx 1+\frac{x}{2},$$

and for the sake of simplicity, the distances $R_{1u}$ and $R_{0u}$ can be rewritten as follows:

$$R_{IU} = R_{1C}\left(1+\frac{d^2}{2R_{1C}^2}-\frac{d\theta}{R_{1C}}\right);$$

$$R_{0U} = R_{0C}\left(1+\frac{d^2}{2R_{0C}^2}-\frac{d\theta}{R_{0C}}\right),$$

and the full OPD between light/radiation beams 142*c*,142*a* vs the beams 141*c*,141*a* can therefore be approximated as follows:

$$OPD = (R_{1U}-R_{0U})-(R_{1C}-R_{0C}) = \frac{d^2}{2R_{1C}}-\frac{d^2}{2R_{0C}} = \frac{d^2}{2}\left(\frac{1}{R_{1C}}-\frac{1}{R_{0C}}\right);$$

$$OPD = \frac{d^2}{2}\left(\frac{R_{0C}-R_{1C}}{R_{1C}\cdot R_{0C}}\right) \approx \frac{d^2}{R_{0C}^2}\cdot\frac{\Delta R}{2} = \left(\frac{d}{R_{0C}}\right)^2\cdot\frac{\Delta R}{2}.$$

Calculation of the phase shift/difference φ (radians) between the light/radiation beams portions of the light/radiation passed through the partial apertures of the aperture assembly 102, that corresponds to the above OPD expression, can carried out as follows:

$$\varphi = \frac{2\pi \cdot OPD}{\lambda} \quad (1)$$

and thus:

$$\varphi = 2\pi\left(\frac{d}{R_{0C}}\right)^2\cdot\frac{\Delta R}{2\lambda}$$

wherein $\Delta R = R_{0C} - R_{1C}$, and λ is the wavelength for which the OPD is calculated. In embodiments wherein the optical system 100 is designed to operate in some wavelength ranges, the average phase shift can be calculated by defining λ as the central wavelength of the wavelength range used.

As explained hereinabove with reference to FIG. 4B, assuming the optical path following the aperture assembly 102 introduces negligible phase difference between the light/radiation beams portion 142c and the ring/annular light/radiation beams portion 142a, which are the light/radiation beams portions obtained following the passage of the light/radiation beams 141 originating from the point-source P2 located away from the focal plane 130f through aperture assembly 102, the phase difference between these light/radiation beams 142c, 142a is determined by the phase shift φ of equation (1) hereinabove. It is therefore clear that there is a unique correlation (up to the ambiguity resulting from full π phase shift i.e., 180°), between (1) the phase shift/difference between the annular and central light/radiation beams portions, 142a and 142c (denoted as φ), and (2) the energy distribution on/measured by the pixels 106p of the sensor device 106, that correspond to different polarization elements 105e of the intermediate polarizer 105. This correlation can be expressed by the following equation:

$$E(\alpha, \varphi) = \frac{E_0}{2}(1 + \sin 2\alpha \cdot \cos \varphi) \quad (2)$$

where $E_0$ is the combined energies of the light/radiation reaching the partial apertures of the aperture assembly 102, α is (e.g., as exemplified in the polarization setup of FIG. 1A) the orientation of the respective polarization element 105e of the intermediate polarizer 105, and φ is the phase shift between the two beams portions of the light/radiation passing through the partial apertures of the aperture assembly 102. Thus, by measuring the intensity/energy E(α, φ) of the light/radiation on each pixel 106p (e.g., two or more different pixels) of the sensor device 106 corresponding to the different polarization orientations (e.g., HP, VP, DP, ADP), the phase shift φ can be determined from equation (2), leading to the determination of ΔR from equation (1), and thus allowing determining the distance to the point P2.

In possible embodiments the at least two intensity/energy E(α, φ) measurement obtained from the pixels 106p for determining the phase shift φ (and therefrom the distance), includes intensity/energy measurements corresponding to one of DP and ADP polarization orientations of the light/radiation received from the intermediate polarizer 105.

It is noted that in different configurations of the optical system 100, equation (2) may be more complex and include additional parameters. Such configurations are, for instance, where the polarization orientations of the partial apertures (108,109) are not perpendicular, or the energy traversing through said apertures are not the same i.e., not in equality. In such configurations equation (2) may include parameters, such as the specific polarization orientation of each one of the partial apertures (108,109), or their relative surface area.

It is also noted that simultaneous rotation of the front polarizer 101 and aperture assembly 102 may lead to different energy distribution measured by pixels 106p which are respective to the polarization of each of the polarization elements 105e. Such rotation may be used to optimize the sensitivity of the system.

As noted above, the wavelength range of the light/radiation should be limited in some embodiments to approximately 30% of the center wavelength of the light/radiation emerging from the object. In case the light/radiation emerging from the object is of a wider wavelength range, it is probable that the phase shift/difference φ calculation shall become more difficult to interpret since each specific wavelength has its own phase shift/difference φ, which are multiplexed at the sensor device 106 as different polarization orientations.

It is noted that there may be an ambiguity in calculating the phase shift/difference φ, due to the cyclical properties of the wave i.e., the OPD at polarization orientation δ yields similar/same results to the OPD at polarization orientation π+δ. The maximal distance for which there is no ambiguity, noted as ΔR(am), can be calculated for OPD=λ/2 (half the wavelength of light/radiation emerging from the object). By applying the approximation $\Delta R \ll R_{0C}$ the following expression is obtained from equation (1)—

$$\frac{\lambda}{2} \approx \frac{d^2}{2} \cdot \frac{\Delta R}{R_{0C}^2} \rightarrow \Delta R(am) \approx \frac{\lambda}{d^2} \cdot R_{0c}^2 \quad (3)$$

wherein ΔR(am) provides the non-ambiguous range based on the system parameters: λ, d and $R_{0c}$.

As explained in details hereinabove with reference to FIGS. 4A, 4B and 4C, it is demonstrated that there is a correlation between: (1) the distance between a point in the field of view of the optical system 100 and the optical system itself (e.g., aperture assembly 102); (2) the phase of the different portions of the wavefront that reach the detector assembly 110 after passing through the aperture assembly 102; and (3) the energy distribution of adjacent pixels (106p) corresponding to different local polarizer elements (105e) of the intermediate polarizer 105 embedded in the detector assembly 110. Thus, the measured/determined energy distribution of the light/radiation reaching the detector assembly 110 is indicative of the distance between the point-source of the light/radiation and the detector assembly 110 (i.e., sensor device 106). This information, with or without the additional grey level of the pixels (106p), can be used to determine three-dimensional coordinates of the location of the point-source in the field of view of the optical system 100.

Figure 4D:
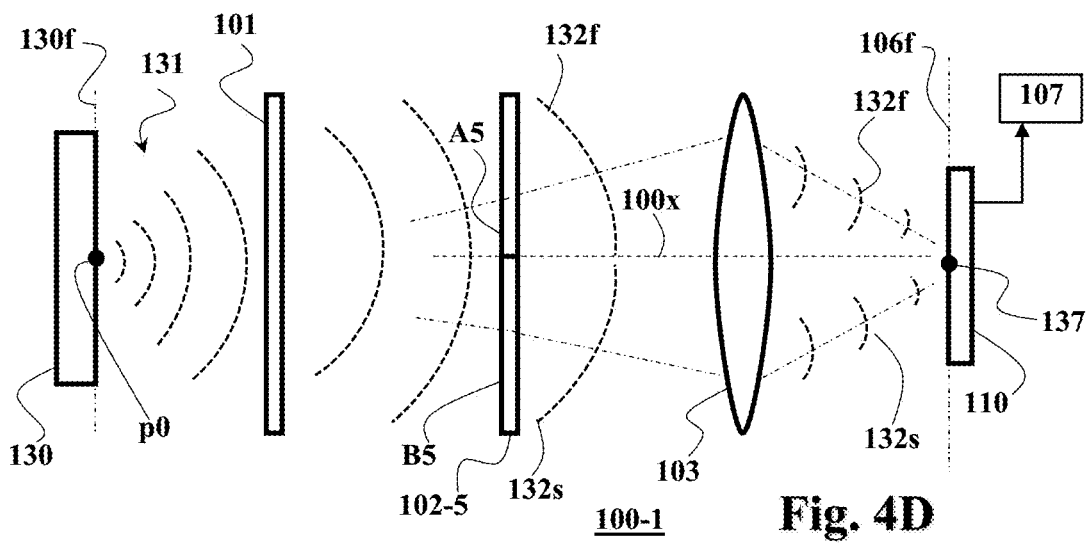

Reference is now made to FIG. 4D, schematically illustrating propagation of light/radiation in the optical system 100-1. Optical system 100-1 is similar to optical system 100 illustrated in FIG. 1A and comprises the same components (including the front polarizer 101, optical assembly 103, detector assembly 110) while substituting aperture assembly 102 with a non-concentric aperture assembly. In this explicit non-limiting example, the aperture assembly is denoted as aperture assembly 102-5, which configuration is also illustrated in FIG. 2E described hereinbelow.

The optical system 100-1 is configured to image object 130 onto sensor device (106) embedded in the detector assembly 110. In this non-limiting example, the object 130 is located at the focal plane 130f of the optical system 100-1, such that the light/radiation received from the imaged object 130 by the optical system 100-1 is focused onto the sensor device (106) of the detector assembly 110. For the sake of simplicity, the object 130 is illustrated as an object having a linear/flat front surface area located at the focal plane 130f, and the intermediate (e.g., patterned) polarizer (105) and the sensor device (106), though not explicitly shown in FIG. 4D, are embedded in the detector assembly 110.

A wavefront of light/radiation 131 emerging from a point-source p0 on the object 130, traverses through aperture assembly 102-5 such that first partial wavefront 132f and second partial wavefront 132s, are transmitted through first partial aperture A5 and second partial aperture B5 of aperture assembly 102-5, respectively. Optionally, but in some embodiments preferably, the two (or more) separate wavefront portions 132f,132s that are transmitted through the aperture assembly 102-5 are of equal energy, and they are perpendicularly polarized one with respect to the other e.g., the direction of polarization of the first partial wavefront 132f which emerges following traversing through the first partial aperture A5 is substantially perpendicular to the direction of polarization of second partial wavefront 132s, which emerges following traversing through second partial aperture B5.

Since sensor plane 106f of sensor device 106f coincides with the image focal plane of the optical assembly 103 with respect to point source p0 of object 130, the two partial wavefronts 132f,132s reach the detector assembly 110, and specifically the sensor device (106) embedded therein, at the same location denoted as image point 137 which is the image of point-source p0.

For the purpose of simplicity, the following discussion relates to pixels (106p) which are associated with polarization elements (105e) having either vertical polarization (VP) or horizontal polarization (HP). It is noted that the pixels (106p) which are associated with polarization elements (105e) having either diagonal polarization orientation (DP) or antidiagonal polarization orientation (ADP) may contribute additional information to the image analysis, but these implications are not discussed as part of the current embodiment.

As detailed hereinabove, both partial wavefronts 132f and 132s reach detector assembly 110 at the same location denoted as image point 137. Polarization element (105e) which is located at image point 137 affects the energy reaching the respective pixel (106p). Since both partial wavefronts 132f and 132s have substantially similar energy, pixel (106p) will measure similar energy whether the associated polarization orientation of the respective polarization element (105e) is VP or HP.

Figure 4E:
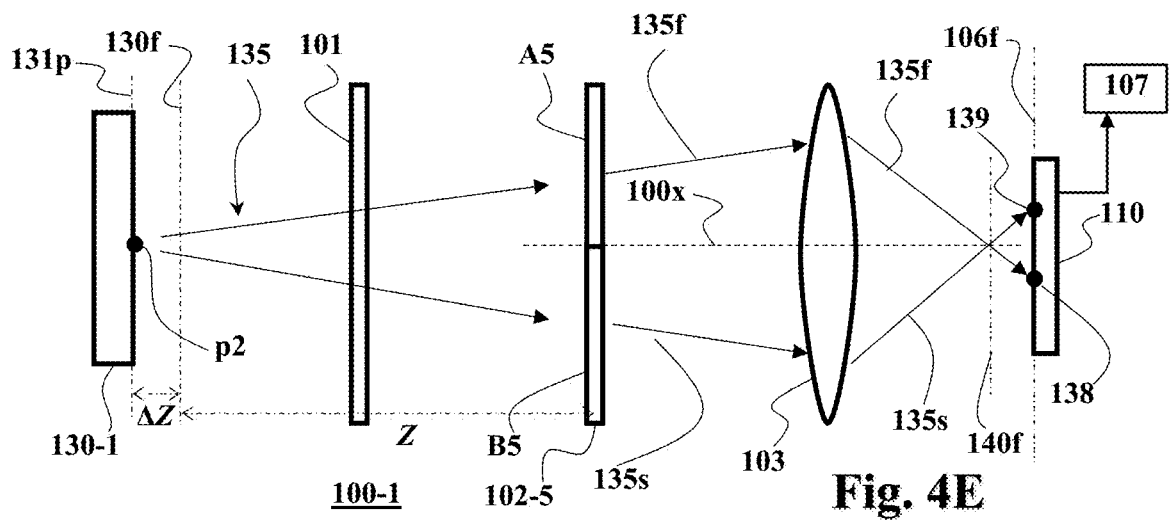

Reference is now made to FIG. 4E, which schematically illustrates the wavefront 135 (depicted as lines/rays) emerging from point-source p2 of planar/flat object 130-1 located at plane 131f away from the focal plane 130f i.e., further anteriorly away from the aperture assembly 102-5. For the sake of simplicity, most elements of the optical system 100-1 are not shown in FIG. 4E, wherein only front polarizer 101, the aperture assembly 102-5, the optical assembly 103, and the detector assembly 110, of the optical system 100-1 are shown.

In this example, the wavefront 135 is manifested as rays passing through aperture assembly 102-5, such that first partial wavefront 135f and second partial wavefront 135s, pass through first partial aperture A5 and second partial aperture B5, of the aperture assembly 102-5, respectively. Since the source-point p2 is located away from (i.e., not in the) object focal plane 130f, its image is formed anterior to the sensor plane 106f, thus the partial wavefronts 135f and 135s converge at respective focal plane 140f, which is located anterior to the sensor plane 106f. In this specific example, first partial wavefront 135f reaches sensor plane 106f of detector assembly 110 at image point 138 while second partial wavefront 135s reaches sensor plane 106f of detector assembly 110 at image point 139. Thus, the source-point p2 is imaged onto the sensor device (106) in different locations, which depends on whether the partial wavefront emerging from source-point p2 traverses through the first partial aperture A5 or the second partial aperture B5.

In the explicit example of optical system 100-1, which is constructed as a specific implementation of the optical system 100 depicted in FIG. 1A configured with the aperture assembly 102-5 depicted in FIG. 2E, after passing through the first partial aperture A5, the first partial wavefront 135f has a linear horizontal polarization, while second partial wavefront 135s, which traverses through second partial aperture B5 has linear vertical polarization. Upon reaching the detector assembly 110 (comprising the intermediate polarizer (105) and the sensor device (106), the first partial wavefront 135f, having the horizonal polarization does not traverse through polarizer elements (105e) having a vertical polarization orientation (VP), while the second partial wavefront 135s, having the vertical polarization does not traverse through polarizer elements (105e) having a horizontal polarization orientation (HP).

Thus, the image acquired by the pixels (106p) of the sensor device (106), which correspond to the VP polarizer elements (105e), are affected only by the second partial wavefront 135s. Said image is differently located (shifted) from the image acquired by pixels (106p) of sensor device (106), which correspond to the HP polarizer elements 105e, which are affected only by first partial wavefront 135f. In other words, the HP and VP polarizations affected by the partial apertures A5 and B5, and the spatial distribution of the polarizer elements (105e) of the intermediate polarizer (105) embedded in the detector assembly 110, intertwines two spatially shifted copies of the imaged object 130-1 onto the image plane 106f i.e., onto the pixels (106p) of the sensor device (106). In this example, the intertwined spatially shifted copies of the imaged object 130-1 are equally shifted with respect to the optical axis 100x of the system 100-1, and the direction of the shift with respect to the optical axis 100x is determined by the orientation of the axis of symmetry of the partial apertures A5 and B5.

It is noted that this embodiment is not limited to the use of HP and VP polarizations in the partial apertures A5 and B5 of the aperture assembly 102-5. Though other polarization orientations can be used in the partial apertures A5 and B5 of the aperture assembly 102-5, it is preferable in embodiments hereof that the polarization orientation affected by the partial apertures A5 and B5 be orthogonal (90°) one with respect to the other. Additionally, the optical system 100-1 can be configured with alternative aperture assemblies e.g., 102-4, (shown in FIG. 2D) or 102-2 (shown in FIG. 2B), etc. It is noted that symmetric and non-concentric aperture assembly 102-5 (or 102-4) can be implemented in possible embodiments in a form of a non-symmetric aperture assembly (e.g., 102-2 of FIG. 2B). In case of non-symmetric (and non-concentric) partial apertures the shift between the respective intertwined spatially images shall not be equal relative to optical axis 100x.

As shown in FIG. 4E, the shift between the two images 138,139 corresponds, among other parameters, to the distance between the location of source-point p2 and the focal plane 130f. Therefore, based on the parameters of the optical system 100-1, such as the focal length, the distance between the "center of mass" of the partial apertures A5,B5 of the aperture assembly 102-5, and the location of the focal plane 106f, and by determining the shift between the images 138,139 acquired by the pixels (106p) corresponding to the VP polarization elements (105e), and the pixels (106p) which correspond to the HP polarization elements, the distance of source point p2 from the optical system 100 can be calculated as follows:

$$\Delta Z = \Delta X \cdot \left(\frac{F}{Z}\right) \cdot \frac{F\#}{K} \qquad (4)$$

where ΔZ is the distance between the plane 131*p* of source-point p2 and the object focal plane 130*f* of the system 100-1, F is the focal length of optical assembly 103, Z is the distance between focal plane 130*f* and aperture assembly 102-5, F # is the F-number of optical assembly 103, and K is a constant number smaller than 1, which represent the normalized distance between the "center of mass" of the two partial apertures A5,B5. The above description can be extended for multiple source points which can be located at different upstream/downstream distances from focal plane 130*f*, and thus the full 3D mapping of the field of view of the optical system 100-1 can be achieved. It is appreciated that such mapping requires image processing and comparison algorithms some of which are common, and some may be explicitly relevant for such task.

It is noted that equation (4) considers VP and HP polarized pixels (106*e*) to be located in the same alignment to each other as that of partial apertures A5,B5. In the explicit example illustrated in FIG. 4E, wherein partial apertures A5,B5 are located horizontally adjacent to each other, equation (1) is based on having VP polarized pixel (106*e*) located horizontally adjacent to HP polarized pixel (106*e*). While the intermediate polarizer (105) comprises a more complex structure of polarization orientations, equation (4) represents an approximation for the calculation of ΔZ. It is also noted that the optical system 100-1 may be constructed without the use of the front polarizer 101, in which case the partial wavefronts 132*f*,132*s* may not of equal energy, which may require adaptation of the algorithm used in the processor 107 to determine the location of the images 138,139 of the source-point p2 created by each said partial wavefront.

Reference is now made to FIGS. 2A to 2J schematically illustrating configurations of the partial apertures of the aperture assembly 102 described hereinabove and hereinbelow according to possible embodiments, which are denoted herein as 102-1, 102-2, . . . . The arrowed lines shown in FIGS. 2A to 2J denote the polarization orientation of each partial aperture. Typically, the aperture assembly 102 comprises at least two (2) partial apertures and, in combination with the front polarizer (101), example of which is illustrated in FIG. 1B, they are constructed such that light/radiation passing through the front polarizer (101), and thereafter emerging following passage through the partial apertures of the aperture assembly 102, is divided into at least two partial wavefronts that are preferably energetically equally divided between two or more polarization orientations that are optionally, but in some embodiments preferably, perpendicular one with respect to the other (e.g., the energy is divided such that the light/radiation having the vertical polarization has substantially the same energy as that of the light/radiation having the horizontal polarization).

As described hereinabove, this can be achieved, as exemplified herein with reference to FIGS. 1A, 1B and 1C, by using polarizers in each of the partial apertures of the aperture assembly (102) which polarization orientations are perpendicular one with respect to the other, as part of two equal-surface partial apertures of the aperture assembly (102) and both said polarizations are oriented at 45° relative to the polarization of the front polarizer (101). FIG. 2A shows an alternative embodiment 102-1 to the aperture assembly 102 configuration described hereinabove with reference to FIG. 1A. The aperture assembly 102-1 shown in FIG. 2A comprises an axial/concentric partial aperture 108-1 of HP orientation, and a non-axial (i.e., non-concentric) partial aperture 109-1 of VP orientation.

As another alternative embodiment of the aperture assembly 102, the aperture assembly 102-2 shown in FIG. 2B comprises two non-symmetrical partial apertures, 108-2 and 109-2, of the VP and HP orientations, respectively. Yet, another alternative to the aperture assembly 102, the aperture assembly 102-3 shown in FIG. 2C comprises an axial/concentric partial aperture 108-3 of the VP orientation, and a plurality of non-axial partial apertures 109-3 (four such non-concentric aperture are exemplified in FIG. 2C) of the HP orientation.

As yet another alternative embodiment of the aperture assembly 102, the aperture assembly 102-4 shown in FIG. 2D comprises symmetrical non-concentric partial apertures, A4 and B4, of the VP and HP orientations, respectively. As yet another alternative embodiment of the aperture assembly 102, the aperture assembly 102-5 shown in FIG. 2E comprises two symmetrical non-concentric (e.g., half-circle-shaped) partial apertures A5 and B5, of the VP and HP orientations, respectively.

Reference is now made to FIG. 2F, schematically illustrating a yet another alternative embodiment of the aperture assembly 102, denoted as aperture assembly 102-6, which comprises a circular concentric partial aperture A6 and a concentric ring/annular partial aperture B6. Other than using polarizers as part of the construction of the aperture assembly 102 (as described with reference to e.g., FIG. 1A), obtaining equal power portions of the light/radiation following passage through the aperture assembly 102-6 with polarization orientations that are perpendicular one with respect to the other, can be obtained using a half-wave waveplate/retarder (i.e., using a λ/2 waveplate instead of a polarization orienting element) located at the circular concentric partial aperture A6 (it can be equally done by placing the λ/2 waveplate/retarder at the concentric ring/annular partial aperture B6). The orientation of the λ/2 waveplate/retarder should be angularly oriented at 45° relative to the incoming polarization affected following passage of the light/radiation through the front polarizer (101), in order to obtain a perpendicular polarization orientation between the two partial apertures A6 and B6.

In yet further alternative embodiments of the aperture assembly 102, denoted as aperture assembly 102-7 in FIG. 2G, a half waveplate/retarder (i.e., a λ/2 waveplate) is used instead of a polarization orienting element in one of the partial apertures, illustrated herein as the circular concentric partial aperture B7, and another half waveplate/retarder (i.e., a λ/2 waveplate) is used in the concentric partial aperture illustrated herein as ring/annular partial aperture A7, in order to obtain equal power portions of the light/radiation following passage through the aperture assembly 102-7 with polarization orientations that are perpendicular one with respect to the other. The half waveplate plates are preferably angularly oriented at 22.5° and −22.5° relative to the polarization orientation of the incoming light/radiation affected following passage of the light/radiation through the front polarizer (101).

The use of such waveplates/retarders as described with reference to FIGS. 2F and 2G or other alternatives, can be similarly extended to implement in the alternative embodiments of the aperture assembly 102 schematically illustrated in FIGS. 2A to 2E. It is noted that additional alternative implementations of waveplates may also be applicable as to apply perpendicular polarization orientations between partial apertures of the aperture assembly 102 and its respective alternatives.

It is noted that the alternative embodiments of the aperture assembly 102 that comprise the retarder waveplates can be configured for producing two wavefront portions which polarization orientations are substantially perpendicularly oriented one with respect to the other. It is also noted that in embodiments wherein the optical system 100 is used for a broadband range, such as the visible light/radiation wavelength range, the half-wave waveplate (or the combination of quarter waveplate and three-quarters waveplate) are preferably designed for mid-range wavelength, i.e., in the vicinity of 550 nanometers for visible wavelength range. In such embodiments it may be useful to use an additional polarizer (not shown) following each of the waveplates, and at the vicinity of the aperture plane, to thereby verify that all of the wavelength range that emerges having a well-defined predetermined polarization. Such embodiments, which includes the waveplate(s) and an additional polarizer, though may seem redundant, may be applied to save light/radiation energy.

Reference is now made to FIG. 2H schematically illustrating a yet another configuration of the combination of the front polarizer (101), denoted in FIG. 2H as polarizer 101-1, and of the aperture assembly (102), denoted in FIG. 2H as aperture assembly 102-8, which comprises a circular concentric partial aperture A8 and a concentric ring/annular partial aperture B8. In this configuration, the surface area of the circular concentric partial aperture A8 and that of the concentric ring/annular partial aperture B8 are not similar/equal. This is compensated by orienting the polarizations of the light/radiation propagating from the aperture assembly 102-8 and from the polarizer 101-1 such that the polarization of light/radiation affected following the passage of the light/radiation through the front polarizer 101-1 is not oriented at 45° between the two perpendicular polarizations generated by the circular aperture A8 and the concentric ring aperture B8, but rather it is inclined more towards the polarization direction of the partial aperture having a smaller surface area, such that the multiplication of the surface area of each partial aperture by the relative polarization orientation provides substantially similar/equal results.

By way of example, in FIG. 2H, if the area ratio between the circular concentric partial aperture A8 and the concentric ring/annular partial aperture B8 is 2:3, then the polarization of the front polarizer 101-1 is determined to be oriented at 34° relative to the polarization orientation of the circular aperture A8, such that the amount of energy of the light/radiation obtained from the partial apertures A8 and B8 will substantially same/equal.

Reference is now made to FIG. 2I schematically illustrating yet another configuration of the combination of the front polarizer (101), denoted in FIG. 2I as front polarizer 101-2, and of the aperture assembly (102), denoted in FIG. 2I as aperture assembly 102-9, which comprises the circular concentric partial aperture A9 and the ring/annular concentric partial aperture B9. In this configuration, the direction of polarization applied by the front polarizer 101-2 can be controlled and varied, for example, by control data/signals 107c generated by the processor unit 107, e.g., by using a liquid crystal device controlled by an external polarization controller (not shown).

In addition, in possible embodiments, the effective area/geometry of at least one partial aperture of the aperture assembly 102-9 can be (e.g., electrically) controlled and varied by an external aperture controller 127 (which may be part of the processor unit 107) e.g., by introducing a controlled mechanical shutter device 120 between the front polarizer 101-2 and the aperture assembly 102-9, which can be controllably opened or closed. By implementing such changes to the area/geometry of the aperture assembly 102-9 exposed to the light/radiation from the imaged object (e.g., by using the controlled shutter device 120), respective changes are applied to the proportional relative surface area of the ring/annular concentric partial aperture B9 and of the circular concentric partial aperture A9 i.e., the ratio of the effective areas of the partial apertures A9,B9 can be controllably adjusted by the controlled shutter device 120.

In order to maintain substantially similar energy distribution between the two partial apertures, it is possible to change the orientation of the front polarizer device 101-2 using control data/signals 107c, similar to the description hereinabove in reference to FIG. 2H. By using such configuration, the optical system 100 can be useful for determining three dimensional coordinates of at least some portion of objects (130) in its field of view, while changing the F-Number of the optical system 100, which changes the resolution of the system in all of the three-dimensional (3D) axes.

Accordingly, in some embodiments the setup of FIG. 2I is calibrated before use to adjust the control data/signals 107c generated by the processor unit 107, and/or the control signals generated by the aperture controller 127, to provide the desired energetic equilibrium between the light/radiation wavefronts obtained from the partial apertures A8 and A9 of the aperture assembly 102-9. It is noted that while electrical control is not used in some of the embodiments, such as in the configuration depicted in FIG. 1A, control of relative polarization orientations of the front polarizer (101) vs. the polarization orientations of the partial apertures of aperture assembly (102) (and the various configurations thereof) e.g., by manually rotating the front polarizer (101), can enable calibration of the optical system 100 performance and compensate for variations in orientation of the polarization of the partial apertures 108,109, or their surface areas.

Reference is now made to FIG. 2J schematically illustrating yet another configuration of the combination of the front polarizer 101, and of the aperture assembly (102) denoted as aperture assembly 102-10 in FIG. 2J. The aperture assembly 102-10 comprises a first partial aperture 180, a second partial aperture 181 and a common partial aperture 182 formed by an intersection of the partial apertures 180 and 181. The first partial aperture 180 and the second partial aperture 181 have similar/equal surface areas, and they are configured such that the orientations of polarizations of light/radiation passed therethrough are perpendicular one with respect to the other, and also such that the orientation of polarization of each one of the first and second partial apertures 180,181 is oriented at 45° with respect of the orientation of the polarization of the front polarizer 101.

As illustrated in FIG. 2J, the orientation of the polarization of the front polarizer 101 is oriented 45° (DP with respect to the 'x'-axis), the orientation of the polarization of the first partial aperture 180 is vertical (VP), the orientation of the polarization of the second partial aperture 181 is horizontal (HP), and the orientation of the polarization of the common partial aperture 182 is 45° (DP) i.e., same/similar to the polarization orientation of the front polarizer 101. Alternatively, but in some embodiments preferably, the common partial aperture 182 has no polarization at all (which guarantees that the same polarization of light/radiation obtained from the front polarizer 101 is maintained after passage through the common partial aperture 122).

This configuration provides that the light/radiation obtained following passage through the front aperture 101 and the aperture assembly 102-10 is typically divided into two wavefront portions having same/similar energy, and perpendicular polarization orientation one with respect to the other. Particularly, the energy of the vertically polarized (VP) light/radiation is comprised of the energy of the light/radiation traversing through the first partial aperture 180 plus half of the energy of the light/radiation traversing through the common partial aperture 182, while the energy of the horizontally polarized (HP) light/radiation is comprised of the energy of the light/radiation traversing through the second partial aperture 181 plus half of the energy of the light/radiation traversing through the common partial aperture 182.

It is noted that more complex structures/configurations of the aperture assembly 102-10 can be utilized e.g., based on the construction/configuration illustrated in FIG. 2H. It is further noted that alternative configurations of the aperture assembly 102 can be applicable such that the polarization of the portion of light/radiation emerging from each of the partial apertures of the aperture assembly 102, is not necessarily linear, as long as said polarizations are differently oriented (e.g., oppositely oriented circular polarizations).

It is also further noted that the concentric configurations of aperture assembly 102 e.g., those illustrated in FIG. 1C, FIG. 2C, FIG. 2F, etc. may be useful for calculation of OPD (as in equations 1-3) and may not be relevant for calculation of location (as equation 4 provides). On the other hand, non-concentric configurations of the aperture assembly 102 e.g., those illustrated in FIG. 2A, FIG. 2D, FIG. 2E, etc. are explicitly useful for determination of distance based on equation (4), but may not be optimal for extraction of three-dimensional information using the OPD determination method (using equations (1)-(3)) for on-axis objects in case said configuration is symmetrical.

In addition, in the non-concentric symmetrical partial apertures implementations of the aperture assembly 102, such as exemplified in FIGS. 2C, 2D, 2E, horizontal and/or vertical axis/axes of symmetry are exemplified. However, in possible embodiments the axis/axes of symmetry may be oriented differently e.g., in any suitable tilt angle about the optical axis (100x) of the system. Furthermore, though FIGS. 2A to 2J exemplify circular aperture assemblies 102 (102-1, 102-2, ...) in possible embodiments these aperture assemblies can be implemented in any other suitable geometrical shape e.g., rectangular, polygon etc.

Reference is now made to FIG. 5A schematically illustrating an optical system 200 in accordance with some possible embodiments, for generation of colored, three-dimensional coordinates of imaged object(s) 230 in the field of view (FOV) of the optical system 200. The optical system 200 comprises a front polarizer 201, an aperture assembly 202 posterior to the front polarizer 201, an optical assembly (e.g., imaging lens) 203 and a detector assembly 210. The detector assembly 210 comprises in some embodiments an intermediate polarizer 205, bandpass filter 204 and a sensor device 206. In this specific and non-limiting example, the bandpass filter 204 is located between the intermediate polarizer 205 and the sensor device 206, but it may be similarly placed in other locations within the detector assembly 210, while being anterior to sensor device 206. In addition, though the optical assembly 203 is shown in FIG. 5A (and also in FIGS. 1A and 4A) between the aperture assembly 202 and the detector assembly 210, in other possible embodiments it may be differently located along the optical path (e.g., 230t or 130t, in FIGS. 5A and 1A) of the light/radiation from the object 230, 130. Components of the detector assembly 210 may be distributed along the optical path (230t,130t) in any suitable form per specific implementation requirements.

The sensor device 206 (e.g., CCD or CMOS imager), located at the image plane 206f (with respect to object 230 and optical assembly 203), is coupled to a processor unit 207 having one or more processing units (CPU/GPU) and memories 207m (e.g., a general purpose computer-GPC) configured and operable to store and execute software code for operating the optical system 200, analyze the measurement data/signals (also referred to herein as imagery data) acquired by the sensor device 206 and/or produce a 3D model/image of at least some portion of the imaged object 230. Optionally, the processor unit 207 is also configured and operable to present to the user information/image(s) associated with the measurement data/signals acquired by the sensor device 206, and/or with a model/image associated with the imaged object thereby constructed, whether three dimensional or not, through a display system/device (not shown).

The optical assembly (e.g., imaging lens) 203 comprises in some embodiments several optical elements. Optionally, but in some embodiments preferably, the optical assembly 203 is configured such that the imagery data generated by the sensor device 206 is diffraction limited throughout the relevant wavelength range for which the optical system 200 is to be used. The optical system 200 can be specifically designed for operation in the visible wavelength range, typically defined within the 400 to 700 nm wavelength range. Optionally, but in some embodiments preferably, the bandpass filter 204 is configured to allow passage therethrough of no more than 30% of the mid-wavelength range for which the optical system 200 is designed.

Thus, in the visible range where mid-wavelength is approximately 550 nm, the wavelength band of the bandpass filter should be less than approximately 150 nm, for the optical system 200 to be operable for determination of three-dimensional coordinates of point-sources in its field of view, exemplified by object 230. Thus, in order to cover the entire visible wavelength range (400-700 nm), at least two different bandpass filter elements are needed in the bandpass filter 204 for the "colored" operation of the optical system 200 e.g., as exemplified in FIGS. 5A-5H wherein the bandpass filter 204 comprises three (3) different bandpass filter elements.

The bandpass filter 204, which is located in some embodiments as close as possible to the image plane 206f of the optical assembly (e.g., imaging lens) 203 i.e., as close as possible anterior to the sensor device 206, can comprise several bandpass filter elements, such as shown in FIG. 5C, used to filter therethrough portions of the visible light/radiation range. In some embodiments the bandpass filter 204 is comprised of the following three (3) different bandpass filter elements: "B"—configured to limit passage of light/radiation therethrough to the 400 to 500 nm wavelength range; "G"—configured to limit passage of light/radiation therethrough to the 500 to 600 nm wavelength range; and "R"—configured to limit passage of light/radiation therethrough to the 600 to 700 nm wavelength range. The bandpass filter element "B" (of the 400 to 500 nm wavelength range) is sometimes referred to herein as a "Blue" filter, the bandpass filter element "G" (of 500 to 600 nm wavelength range) is sometimes referred to herein as "Green" filter, and the bandpass filter element "R", (of 600 to 700 nm wavelength range) is sometimes referred to herein as "Red" filter. The three bandpass filter elements are also collectively referred to as "colors" hereinafter.

It is noted that the wavelength range of each one of the "B", "G" and "R", bandpass filter elements may vary, while the concept of dividing the wavelength range into three (3) different bandpass filter elements, is maintained. Such configuration of the bandpass filter 204 is formed in some embodiments directly on an outer surface of the sensor device 206 e.g., implemented as a Bayer pattern, which is typically constructed as illustrated in FIG. 5C. Similar to the bandpass filter 204, the intermediate (e.g., patterned) polarizer 205 is also located in some embodiments as close as possible to the image plane 206f defined by the optical assembly 203 i.e., as close as possible anterior to the sensor device 206. Therefore, though the intermediate (e.g., patterned) polarizer 205, the bandpass filter 204, and the sensor device 206, are presented in FIG. 5A as separate components, similar to the preceding example figures, they can be embedded into a single light/radiation detector, denoted as the detector assembly 210.

The detector assembly 210 is configured in some embodiments to also include a microlens array, as illustrated in FIG. 5D, wherein the microlens array 211 is located anterior to the intermediate (e.g., patterned) polarizer 205 i.e., between the optical assembly 203 and the intermediate polarizer 205. The detector assembly 210 may be a type of "color sensor", similar to, or implemented by, the IMX250MYR sensor manufactured by Sony Semiconductor Solutions Incorporated.

The light/radiation traversing through the front polarizer 201 reaches the aperture assembly 202, which is located in some embodiments at the aperture plane, which is defined as the Fourier conjugate of the object's focal plane of the optical assembly (e.g., imaging lens) 203, having a predefined linear polarization (e.g., 45°) orientation affected due to the front polarizer 201 e.g., as illustrated in FIG. 5E, where an arrowed line denotes the orientation of polarization of the light/radiation passing through front polarizer 201. With reference to FIG. 5B, the aperture assembly 202 comprises in some embodiments a circular concentric partial aperture 208 is configured to affect a defined polarization (e.g., HP) orientation, and a side partial aperture 209 is configured to affect a different defined polarization (e.g., VP) orientation. Optionally, but in some embodiments preferably, the concentric and the side partial apertures 208,209 are configured such that the orientation of the polarization of the light/radiation portion emerging from the aperture assembly 202 after traversing through the side partial aperture 209 is substantially perpendicular to the orientation of the polarization of the light/radiation portion emerging from aperture assembly 202 after traversing through the concentric partial aperture 208.

Optionally, but in some embodiments preferably, the aperture assembly 202 is also configured such that the amount of energy of the light/radiation portion emerging from the side partial aperture 209 is similar/equal to the amount of energy of the light/radiation portion emerging from the concentric partial aperture 208. The above described attributes can be achieved, for example, as demonstrated in FIG. 5B, by configuring the side partial aperture 209 and the concentric partial aperture 208 such that they have similar/equal surface areas, and by using in these partial apertures two different polarizer elements which orientations of polarizations are perpendicular one with respect to the other i.e., one polarizer element is placed at the side partial aperture 209 and the other polarizer element is placed at the concentric partial aperture 208, while the orientation of polarization of each one of said polarizer elements is 45° relative to the polarization direction of the front polarizer 201. The arrowed lines shown in FIG. 5B represent the orientation of the polarization of the light/radiation passing through the concentric and side partial apertures 208 and 209.

It is noted that the front polarizer 201 and the aperture assembly 202 may be alternatively configured similar, or substantially identical, to the aperture assembly configurations described hereinabove with reference to either FIGS. 1A to 1D or FIGS. 2A to 2J.

Figure 5F:
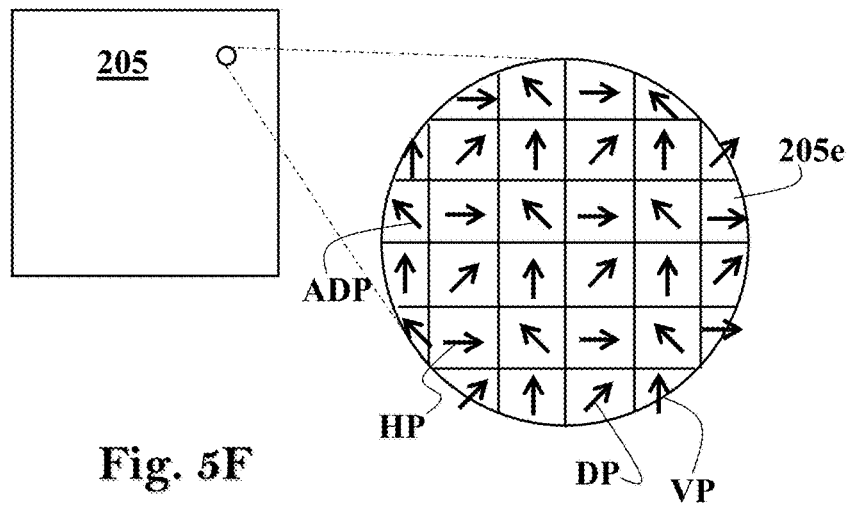

As illustrated in FIG. 5F, the intermediate (e.g., patterned) polarizer 205 can be configured to include an array of polarizer elements (denoted by short arrowed lines) 205e e.g., in the following four different polarization orientations: a 0° horizontal polarization (HP), a 90° vertical polarization (VP), a 45° diagonal polarization (DP) and a 135° (alternately referred to as) −45° anti-diagonal polarization (ADP) (both relative to the horizonal plane). The detector assembly 210 may comprise different configurations of the bandpass filter 204 and patterned polarizer 205. Two such configurations are exemplified hereinbelow with reference to FIGS. 5G and 5H.

Figure 5G:
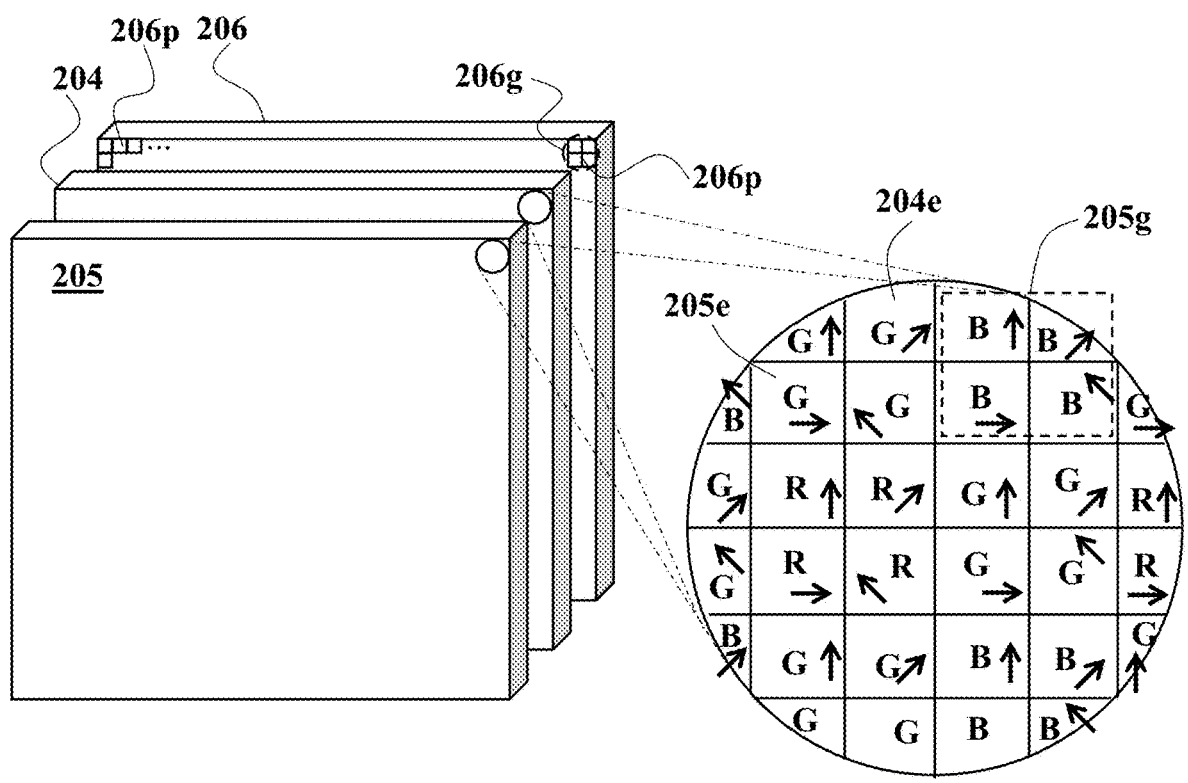

A possible embodiment of the detector assembly 210 is schematically illustrated in FIG. 5G, wherein groups of polarization orientations 205g of the array of polarizer elements 205e of the intermediate (e.g., patterned) polarizer 205 are aligned relative to the bandpass elements 204e of the bandpass filter 204 and the sensor elements (pixels) 206p of the sensor device 206, such that it covers/overlaps a group 206g of at least four (4) pixels 206p thereof associated with one or more bandpass elements of the bandpass filter 204 having the same "color" i.e., the same bandpass filtering wavelength range.

Figure 5H:
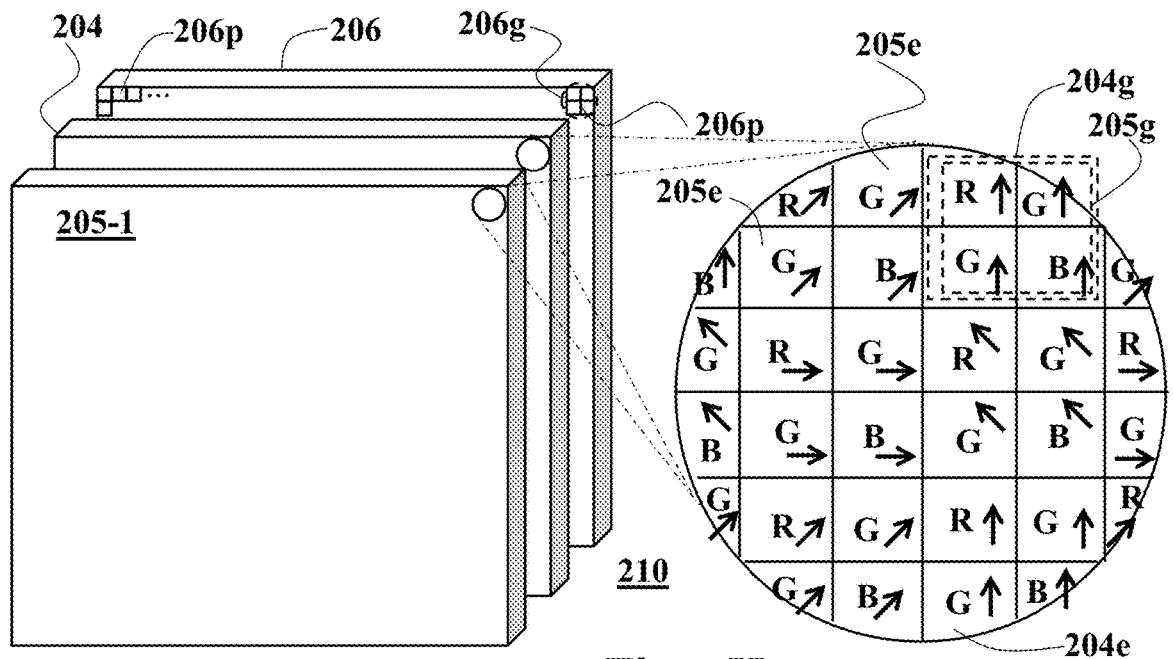

FIG. 5H shows another possible configuration of the detector assembly 210 wherein groups of one or more polarizer elements 205e of the intermediate (e.g., patterned) polarizer 205-1 having the same polarization orientation are aligned relative to/with a group of bandpass elements 204g comprising a combination of the bandpass elements of the bandpass filter 204 and a group 206g of the sensor elements (pixels) 206p of the sensor device 206. In such embodiments, each group of bandpass elements 204g covers/overlaps a group 206g of at least four (4) sensor elements (pixels) 206p of the sensor device 206. As exemplified in FIG. 5H, each group of bandpass elements 204g has one "R" bandpass element, one "B" bandpass element, and two "G" bandpass elements, arranged such that the "G" bandpass elements within the group 204g are each located diagonally with respect to the other bandpass elements. It is however noted that other combinations of the bandpass filter elements are similarly applicable e.g., using in each group of bandpass elements one "G" bandpass element, one "B" bandpass element, and two "R" bandpass elements.

It is noted in this respect that in possible embodiments each group 205g of polarization orientations of the intermediate (e.g., patterned) polarizer 205 is configured to cover/overlap more than four (4) pixels 206p of the sensor device 206 (of the same "color" or different "colors") e.g., while having each group 205g of polarization orientations covering/overlapping the same number of pixels 206p of the sensor device 206. Alternatively, in possible embodiments the intermediate (e.g., patterned) polarizer 205 can be configured such that each group 205g of its polarization orientations covers/overlaps less than four (4) bandpass filter elements of the bandpass filter 205, though it may not contribute to optimal performance of the optical system 200.

It is noted that the intermediate (e.g., patterned) polarizer 205-1 may be configured to include groups 205g of polarizer elements 205e having only two (2) different polarization orientations, while each group 205g of polarization orientations is aligned with a group 206g of four (4) or more adjacently located pixels 206p of the sensor device 206, each of which is associated with a different "R", "G", or "B" "color". The orientation of polarization of the different polarizer elements 205e of the intermediate (e.g., patterned) polarizer 205-1 is however not necessarily as demonstrated in FIGS. 5F and 5G, and different polarization orientations may be similarly applicable, while it is preferable that the different polarizations are substantially different from each other.

With reference to FIGS. 5A to 5H, similar to the description detailed hereinabove with reference to FIGS. 1A to 1E, the energy distribution measured by adjacently located pixels 206p associated with the same R, G or B-color of the bandpass filter 204 and corresponding to different local polarizer elements 205e is indicative of the distance between a point-source of the imaged object 230 at the field of view of the optical system 200, and the system itself. Combined with grey level (energy) measured by the pixels 206p, three dimensional coordinates of the point-source, as well as its R, G or B-color, can be derived. It is noted that in order to determine the distance based on the description and equations (1) and (2) detailed hereinabove, the calculation is based on the energy distribution of measurement data/signals acquired from adjacently located sensor elements (pixels) 206p associated with the same R, G, or B-color elements of the bandpass filter 204, that correspond to different polarization elements of the intermediate polarizer 205-1, rather than adjacent sensor elements (pixels) 206p that are not associated with the same R, G, or B-color elements.

As described hereinabove and expressed in equation (3), the ambiguity range of the distance between an object and the optical system used to provide three dimensional coordinates of said object is dependent, in some embodiments, among other parameters, on the mid-range wavelength of the wavelength range in which the system is operating. Thus, since the system described hereinabove with reference to FIGS. 5A to 5H operates in several wavelength ranges simultaneously (i.e., "Red", "Green" and "Blue"), they each correspond to its own ambiguity range. The different ambiguity ranges can therefor assist in increasing the ambiguity range of the entire system as it is built on three (3) separate ranges, each of which is independently analyzed to determine the distance, but simultaneously analyzed to determine the ambiguity range.

It is noted that the bandpass filter 204 may comprise more (or less) filter elements in each cell/group 204g. It is particularly noted that the bandpass filter 204 may include three (3, e.g., "R", "G", and "B") color filters and an additional narrow band filter either within the wavelength range covered by the partial "color" filters, or outside of said wavelength range, where in such case an external illumination source (not shown) may be required. In such embodiments the three (3, e.g., "R", "G", and "B") color filters of each cell/group 204g the bandpass filter 204 can be used to determine colors of the imaged point-sources, and the $4^{th}$ color filter of each cell/group 204g of bandpass filters can be used to determine the distance of the source-point according to any of the embodiments disclosed herein.

Figure 6A:
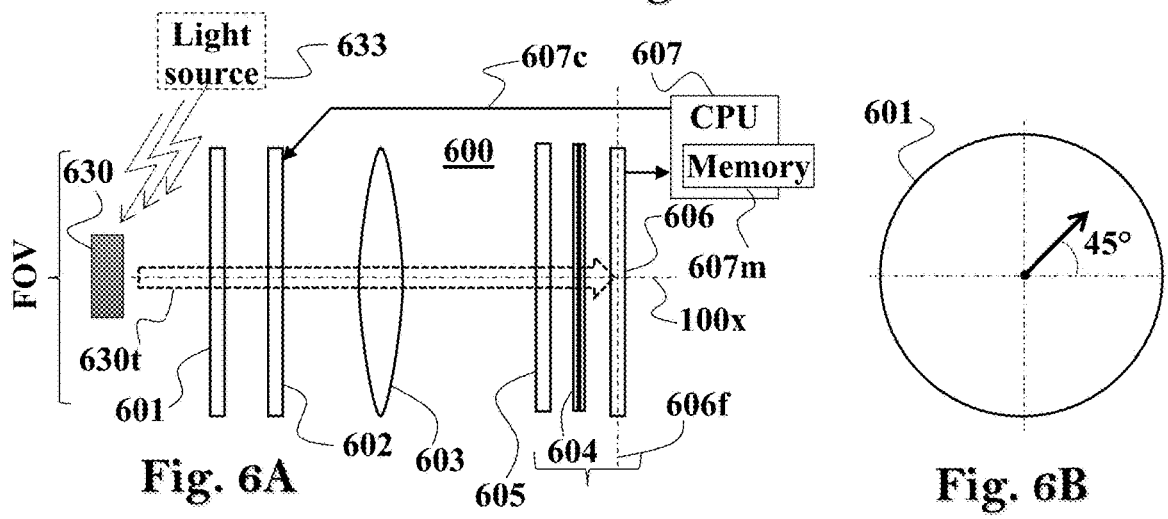

Reference is now made to FIG. 6A which is a simplified pictorial illustration of an optical system 600 in accordance with a possible embodiment, useful for determining three-dimensional coordinates of at least some portion of object(s) 630 in the field of view (FOV) of said optical system 600. The optical system 600 comprises a front polarizer 601, an aperture assembly 602, which is located, optionally but in some embodiments preferably, at the aperture plane of the optical system 600, which is defined as the Fourier conjugate of the object focal plane of the optical assembly 603, and configured to manipulate a wavefront (e.g., light/radiation) emerging from object 630 towards sensor device 606, an optical assembly 603, a bandpass filter 604, an intermediate linear polarizer 605, and a sensor device 606 located at the image plane 606f of the optical assembly 603 with respect to the object 630. The sensor device 606 (e.g., CCD or CMOS imager) is coupled to a processor unit 607 configured and operable to analyze measurement data/signals (also referred to herein as image data/signals) generated by the sensor device 606.

The processor unit 607 (e.g., GPC) comprises one or more processing units (CPU/GPU) and memories 607m configured and operable to store program code and other data usable for operating the optical system 600, and for processing and analyzing the measurement imagery data/signals generated by the sensor device 606. The processor unit 607 may be used to present to user(s) of the system 600 information associated with the acquired measurement data/signals, and/or the model/image thereby constructed (whether three-dimensional or not), through a display device/system (not shown). The optical assembly 603 (e.g., imaging lens) may comprise several optical elements, and it is designed and constructed in some embodiments such that the image thereby formed on the sensor device 606 is in some embodiments diffraction limited throughout the relevant wavelength range for which optical system 600 is being used.

For example, but without limiting, the wavelength range of the optical system 600 can be defined within a narrow-band wavelength range e.g., of up to few nanometers. Alternatively, in possible embodiments the wavelength range of the optical system 600 can be defined within a broadband range e.g., the visible wavelength range, which is typically defined as the 400 nm to 700 nm wavelength range. Properties of the bandpass filter 604 can be determined based on the required wavelength range of optical system 600, and other parameters arising from the physical requirements of the optical system 600 e.g., the coherence length of the light/radiation required for the optical system 600, which is discussed in detail hereinbelow.

Optionally, but in some embodiments preferably, the sensor device 606 is a monochrome sensor configuring the optical system 600 for operation with short wavelength range light/radiation (i.e., wavelength range<30% of the mid-wavelength of the light/radiation emerging from the object). In such embodiments the bandpass filter 604 can be located in various positions along the optical path 630t of the optical system 600. For example, in possible embodiments the bandpass filter 604 is positioned anterior to the optical assembly 603 with respect to the direction of propagation of light/radiation 630t in the system 600, or it can be implemented as part of the coatings of the imaging lens (603) or of other surfaces of the optical assembly 603. In some embodiments, wherein the object 630 imaged by the optical system 600 via the sensor device 606 is illuminated by a narrow band (optional, designated in a dashed-line box) light/radiation source 633, the bandpass filter 604 may be redundant/omitted. It is noted that the bandpass filter 604 may also be configured to include several bandpass filters e.g., as illustrated in FIG. 5C, whereas in such case the bandpass filter 604 should be located in the vicinity of image plane 606f.

Figure 6B:
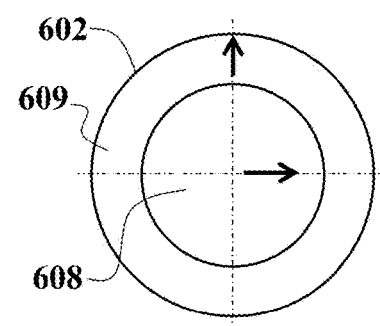

As illustrated in FIG. 6A, the light/radiation 630t traversing through the front polarizer 601 reaches the aperture assembly 602, which is located in some embodiments at the aperture plane of the optical assembly (e.g., of imaging lens) 603, with a predefined linear polarization defined by the front polarizer 601 e.g., 45° according to the embodiment exemplified in FIG. 6B. As exemplified in FIG. 6C, the aperture assembly 602 comprises in some embodiments a central circular partial aperture 608, and a ring/annular partial aperture 609 concentric with the central circular partial aperture 608. The central circular partial aperture 608 and the ring/annular concentric partial aperture 609 are arranged and configured such that the polarization of the light/radiation 630*t* portion emerging from the aperture assembly 602 after traversing through its ring/annular partial aperture 609 is substantially perpendicular to the polarization of the light/radiation portion emerging from the aperture assembly 602 after traversing through its circular partial aperture 608.

Optionally, but in some embodiments preferably, the aperture assembly 602 is configured such that the amount of energy of the light/radiation 630*t* portion emerging from the concentric ring/annular partial aperture 609 is similar/substantially equals to the energy amount of the light/radiation 630*t* portion emerging from the circular partial aperture 608. The above-described attributes can be achieved, for example, as exemplified in FIG. 6C, by configuring the ring/annular partial aperture 609 and the central circular partial aperture 608 with similar/substantially equal surface areas, and such that their polarization directions (e.g., by utilizing a suitable polarizer element in each partial aperture) are substantially perpendicular one with respect to the other.

Figure 6D:
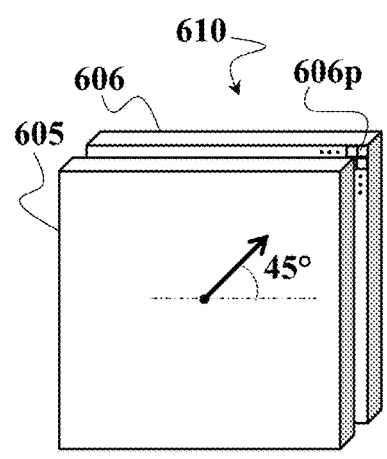
Figure 6C:
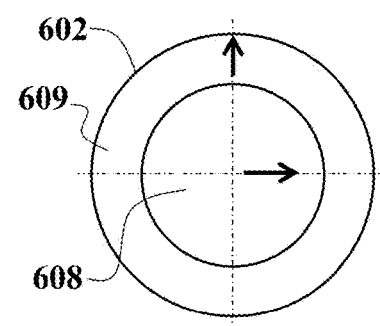

For example, and without limiting, the direction of polarization affected at the concentric ring/annular partial aperture 609 can be substantially perpendicular to the polarization direction affected by the central circular partial aperture 608, while the direction of the polarizations affected by each one of the apertures 608,609 is about 45° with respect to the polarization direction affected by the front polarizer 601 (the arrowed lines shown in FIGS. 6B and 6C represent the orientation of polarized light/radiation emerging from front polarizer 601 and from the aperture assembly 602, respectively). In possible embodiments wherein polarized illumination is applied by the (optional) light/radiation source 633, the polarization directions of the polarizers used at the central circular partial aperture 608 and at the concentric ring/annular partial aperture 609 can be configured to be 45° relative to the direction of polarization of the polarized illumination produced by the (optional) light/radiation source 633 i.e., the front polarizer 601 can be redundant/omitted in such configurations.

As illustrated in FIG. 6D, in some embodiments the intermediate polarizer 605 is a linear polarizer, such as exemplified in FIG. 6D having a polarization orientation of 45° i.e., similar to the polarization orientation of the front polarizer 601. It is noted that the intermediate polarizer 605 may be located at various locations along the optical path (630*t*) of the system 600, while it is located posterior to the aperture assembly 602 and anterior to the sensor device 606. An intermediate retarder, e.g., a rectangular grid/array of retarder elements 111*s* (e.g., λ/4 retardation) and 111*n* (e.g., null-retardation) such as illustrated in FIG. 3C, may also be incorporated in some embodiments into the optical system 600.

Figure 6E:
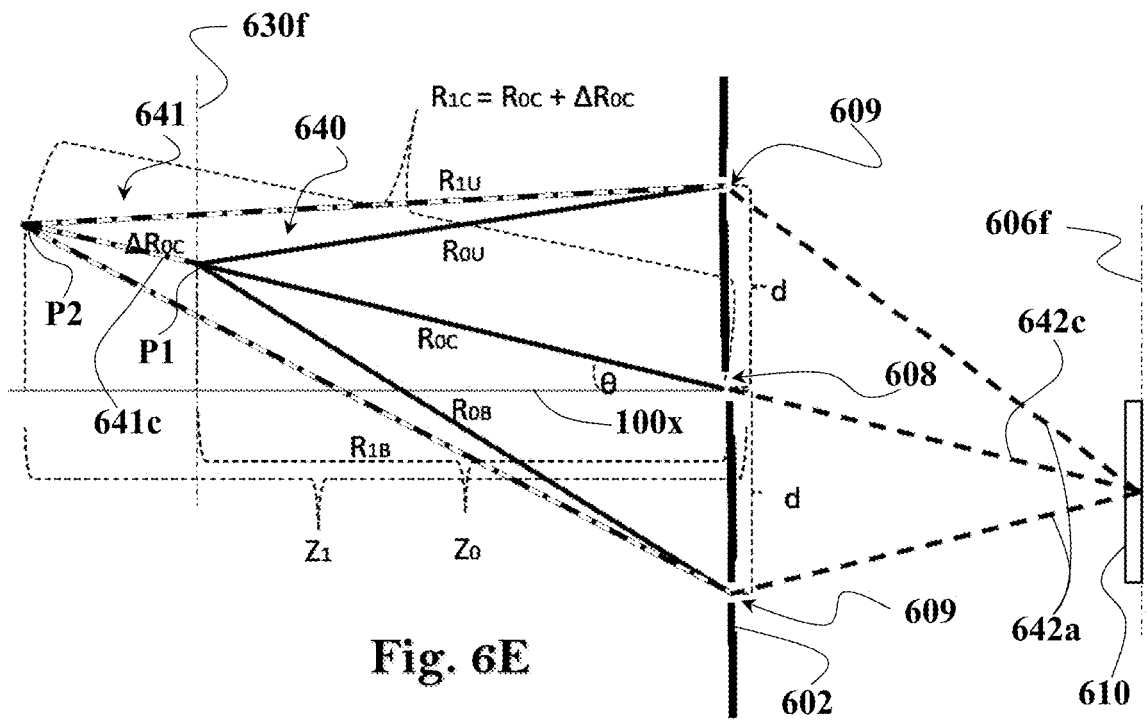

Reference is now made to FIG. 6E, which is similar to FIG. 4C discussed in detail hereinabove. FIG. 6E schematically illustrates wavefronts 640 and 641 respectively emerging from the off-axis point-source P1 located on the focal plane 630*f*, and from the off-axis point-source P2 located away from focal plane 630*f* i.e., further anteriorly away from optical assembly (e.g., imaging lens) 603. For the sake of simplicity, the following adjustments have been made in FIG. 6E: (1) most optical elements of the optical system 600 are not shown, such that only the aperture assembly 602 and the detector assembly 610 are presented explicitly, wherein the detector assembly 610 comprises the sensor device (606), and may comprise also the intermediate linear polarizer (605), the bandpass filter (604) and a microlens array (similar to the microlens array exemplified in FIG. 3A); (2) the concentric ring/annular aperture 609 has been narrowed down to a thin ring at the outer perimeter of the aperture assembly 602; and (3) the central aperture 608 has been narrowed down to a small circle around the center of the aperture assembly 602.

FIG. 6E schematically illustrates the wavefront traversing through optical system 600 as light/radiation rays/beams rather than arched-shaped wavefronts.

In some embodiments, as noted, the aperture assembly 602 is configured to manipulate wavefront emerging from point objects in the FOV of the optical system 600 traversing towards the detector device 610. Such manipulation is manifested by applying a predetermined phase shift between light/radiation beams portions 642*a* traversing through the concentric ring/annular partial aperture 609 and the light/radiation beams portions 642*c* traversing through the central partial aperture 608 e.g., responsive to control signals 607*c* generated by the processor 607. Techniques of applying such phase shift are discussed in detail hereinbelow with reference to FIGS. 7A to 7C.

Optionally, but in some embodiments preferably, three or more different (but two can suffice in some cases) phase shifts β0, β1 and β2, between the two wavefronts/beams portions 642*a* and 642*c* are applied in the time domain (i.e., at different time instances). As a specific and non-limiting example, in possible embodiments, the affected phase shifts are 0 (zero) radians for the phase shift β0, $$\frac{\pi}{3}$$

radians for the phase shift β1, and $$\frac{2\pi}{3}$$

radians for the phase shift β2. Due to the construction of the optical system 600, the energy measured by the sensor device 606 is dependent on the phase shift between the light/radiation beams portion 642*c* and the wavefront/beams portion 642*a*.

For example, in case the phase shift is zero when the wavefront/beams portions converge onto the sensor assembly 610 the polarization orientation of the combined wavefront is substantially the polarization orientation affected by the front polarizer (601) (e.g., 45°, as also discussed with reference to FIGS. 1A to 4C). For example, if the polarization orientation of the front polarizer (601) is 45°, all the energy is transmitted through it, and maximal energy is measured by the sensor device 606 at the relevant pixel 606*p*. If the phase difference between the wavefront/beams portions 642*c*, 642*a*, affected by the aperture assembly 602, is $$\frac{\pi}{2},$$

the combined polarization of the wavefront/beams portions is circular, and the energy measured by the sensor device 606 at the relevant pixel 606*p* is about 50% of the maximal light/radiation energy from each partial aperture. Respectively, different phase shifts lead to a different polarizations at the sensor assembly 606, thus leading to different energy/intensities measured by the sensor device 606. Preferably, but need not necessarily, the affected β0, B1, B2, . . . phase shifts are evenly distributed within the interval [0, π/2] (or [−π/4, π/4]) radians. In the configuration exemplified in FIGS. 6A to 6D, the outcome results in that:

- at each phase shift value (βi, where i≥0 is an indexing integer) the two wavefront/beams portions (642*c*,642*a*) converging from the partial apertures (608,609) result in a different polarization when reaching the intermediate polarizer 605;
- when the two wavefront/beams portions (642*c*, 642*a*) are at a 0 (zero) phase difference a maximal intensity power is obtained/measured at the respective pixel 606*p* at the image plane 606*f* (in this specific example where the polarization orientation of intermediate polarizer 605 is similar to that of the front polarizer 601); and
- when the two wavefront portions (642*a*, 642*c*) are at a π/2 phase difference the resulting polarization at the sensor assembly is −45° (ADP) resulting in a minimum intensity power being obtained/measured at respective pixel 606*p* at the image plane 606*f*.

Similar to the description hereinabove with reference to FIG. 4C, the phase shift between the wavefronts/beams portions 640 and 641 emerging from point-sources P1 and P2 respectively, up until the aperture assembly 602 can be expressed as follows:

$$\varphi = \left(\frac{d}{R_{0C}}\right)^2 \cdot \frac{\Delta R}{2\lambda}$$

(1) (using the same annotation as in the hereinabove description)

It is therefore straightforward to conclude that once a predefined phase shift βi is applied between wavefront/beams portions 642*c* and 642*a* while traversing through the aperture assembly 602, the total phase shift between the wavefronts/beams portions once they emerge from the aperture assembly 602 is: φ+βi.

It is further straight forward to see, based on equation (2) derived hereinabove, that the energy obtained on the respective pixels 606*p* responsive to the wavefront emerging from a point in the FOV of optical system 600 can be determined as follows:

$$Ei(\varphi, \beta i) = \frac{E_0}{2}(1 + \cos(\varphi + \beta i)) \quad (5)$$

where $E_0$ is the combined energies/intensities of the light/radiation reaching the partial apertures of aperture assembly 602, and other annotations are as detailed hereinabove.

Thus, by measuring Ei e.g., light/radiation intensity measured by the sensor elements (pixels) 606*p* as received from a specific point-source in the FOV of optical system 600 (exemplified by point P2) at different points in time corresponding to different predefined phase shift differences βi, the phase shift φ between the wavefronts/beams (642*c* and 642*a*) passing through the aperture assembly 602 can be determined by solving an equation system constructed based on equation (5), and thus ΔR can be also determined based on equation (1), and therefore the distance Z1 to point P2 can be also determined based on the focal length of the optical system 600, and other optical characteristics thereof.

Figure 7A:
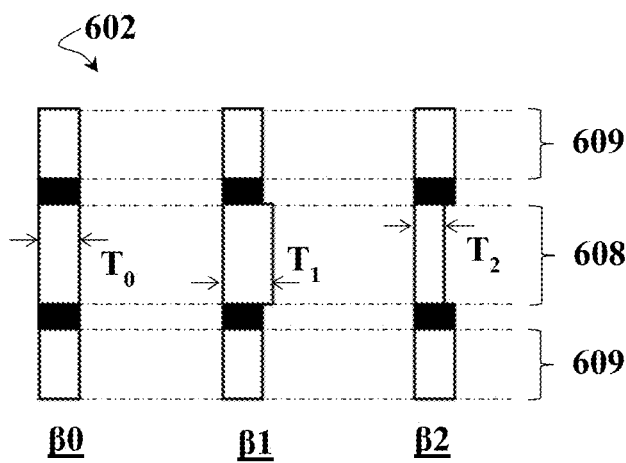

FIG. 7A schematically illustrates an implementation of the aperture assembly 602, wherein the phase between the wavefront portions (642*c*,642*a*) traversing through the central partial aperture 608 and the concentric ring/annular partial aperture 609 is controllably changed to affect the predetermined phase differences β$_1$, β$_2$ and β$_3$ e.g., β$_0$: 0 (zero) radians; β1:

$$\frac{\pi}{3}$$

radians; and β2:

$$\frac{2\pi}{3}$$

radians, by changing the thickness of the central partial aperture 608 (e.g., $T_1$, $T_2$ and $T_3$) and/or of the outer patrial aperture 609 of the aperture assembly 602. The thickness change can be applied e.g., by mechanical pressure on a relatively soft or partially liquid material which may comprise one or both of the partial apertures 608 and 609, or by using several structures having different thicknesses in each partial aperture 608 and/or 609, and alternating between them.

Figure 7B:
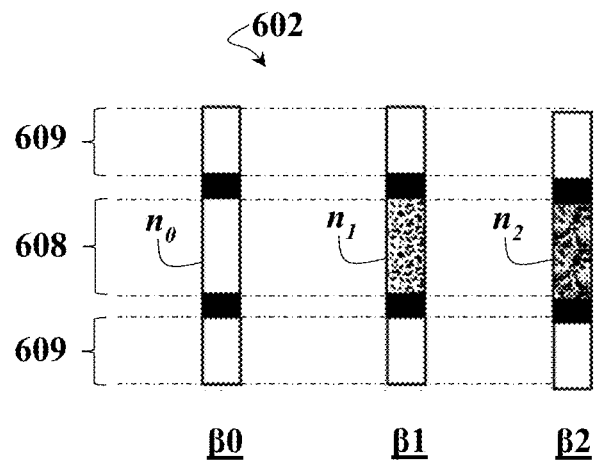

FIG. 7B schematically illustrates an implementation of the aperture assembly 602 wherein the phase difference between the wavefront/beams portions (642*c* and 642*a*) traversing through the central partial aperture 608 and the concentric ring/annular partial aperture 609 is controllably changed to affect the predetermined phase differences β$_0$, β$_1$ and β$_2$ e.g., β$_0$=0 (zero) radians;

$$\beta_1 = \frac{\pi}{3}$$

radians; and $$\beta_2 = \frac{2\pi}{3}$$

radians, by controllably changing the index of refraction ($n_0$, $n_1$ and $n_2$) of the central portion 608 and/or of concentric ring/annular portion 609 of the aperture assembly 602. The refractive index change can be applied, e.g., by using electro-optical crystal material for either one of the partial apertures 608, 609, or for both of them, and applying electrical voltage to the applicable partial aperture(s).

FIG. 7C schematically illustrates an implementation of the aperture assembly 602 wherein the phase between the wavefront/beams portions (642*c* and 642*a*) traversing through the central partial aperture 608 and the concentric ring/annular partial aperture 609 is controllably changed by altering the lens power/curvature $c_0$, $c_1$ and $c_2$ of tunable optics (such as EL-3-10, manufactured by Optotune, Switzerland AG) to affect the predetermined phase differences $\beta_0$, $\beta_1$ and $\beta_2$ e.g., $\beta_0=0$ (zero) radians;

$$\beta_1 = \frac{\pi}{3}$$

radians; and $$\beta_2 = \frac{2\pi}{3}$$

radians, by controllably changing the curvature of the central partial aperture 608 and/or of the outer ring/annular partial aperture 609 of the aperture assembly 602. The curvature $c_i$ can be changed in possible embodiments by using "soft" material optics and applying electrically controlled mechanical pressure.

Optionally, the phase difference between the wavefront/beams portions (642c and 642a) traversing through the central partial aperture 608 and the concentric ring/annular partial aperture 609 is controllably changed by configuring the aperture assembly 602 to combine two or more of the implementations schematically illustrated in FIGS. 7A to 7C e.g., by altering the thickness $T_0$, $T_1$ and $T_3$, of the central partial aperture 608 and/or of the concentric outer ring/annular partial aperture 609, and/or the index of refraction of the material $n_0$, $n_1$ and $n_2$, of the central partial aperture 608 and/or of the concentric outer ring/annular partial aperture 609 of the aperture assembly 602, and/or by altering the lens power/curvature $c_0$, $c_1$ and $c_2$ of the central partial aperture 608 and/or of the concentric outer ring/annular partial aperture 609 of the aperture assembly 602, e.g., to affect the phase differences, e.g., $\beta_0=0$ (zero) radians;

$$\beta_1 = \frac{\pi}{3}$$

radians; and $$\beta_2 = \frac{2\pi}{3}$$

radians.

It is noted that while the phase changes/differences applied between the central and the concentric ring partial apertures, 608 and 609 respectively, can be controlled as illustrated in FIGS. 7A-7C, the structure and polarization orientation of the partial apertures can be implemented also using any of the embodiments shown in FIGS. 2A to 2J.

Reference is now made to FIG. 8A which is a simplified pictorial illustration of an optical system 800 in accordance with a possible embodiment useful for determining three-dimensional coordinates of at least some portion of object(s) 830 in the field of view (FOV) of said optical system 800. The optical system 800 comprises a front polarizer 801, an aperture assembly 802 which is located, optionally but in some embodiments preferably, at the aperture plane of the optical system 800, which is defined as the Fourier conjugate of the object's focal plane of the optical assembly 803, an optical assembly 803, a bandpass filter 804, a controllable variable polarizer 805, and a sensor device 806 located at the image plane 806f of the optical assembly 803 with respect to the object 830. The sensor device 806 (e.g., CCD or CMOS imager) is coupled to a processor unit 807 configured and operable to analyze measurement data/signals (also referred to herein as image data/signals) acquired by the sensor device 806.

In some embodiments, wherein the object 830 imaged by the detector assembly 810 of the optical system 800 is illuminated by a narrow band (optional, designated in a dashed-line box) light/radiation source 833, the bandpass filter 804 may be redundant/omitted.

The processor unit (e.g., GPC) 807 comprises one or more processing units (CPU/GPU) and memories 807m configured and operable to store program code and other data usable for operating the optical system 800, and for processing and analyzing the measurement data/signals generated by the sensor device 806. The processor unit 807 may be used to present to user(s) of the system information associated with the acquired measurement data/signals, and/or the model/image thereby constructed (whether three-dimensional or not), through a display device/system (not shown). The optical assembly 803 (e.g., imaging lens) may comprise several optical elements, and it is designed and constructed in some embodiments such that the image thereby formed on the sensor device 806 is in some embodiments diffraction limited throughout the relevant wavelength range for which the optical system 800 is being used.

Other than the controllably variable polarizer 805, which replaces the intermediate (e.g., patterned) polarizer (105), the optical system 800 is similar in many aspects to the optical system 100 described hereinabove with reference to FIGS. 1A to 5H and can be implemented in the same way, including various configurations of the aperture assembly 802, which can be implemented as exemplified in FIGS. 2A to 2J. The bandpass filter 804 can be a narrowband wavelength range filter, or it may include different "colors" (and located at the vicinity of the focal plane 806f). As exemplified in FIG. 8B, the front polarizer 801 is configured for passage of light therethrough at a predefined polarization orientation (e.g., 45°), while the partial apertures 808,809 of the aperture assembly 802 (as illustrated in FIG. 8C) are configured for passage of light therethrough at polarization orientations that are typically perpendicular one with respect to the other.

In this example, the aperture assembly 802 comprises the central partial aperture 808 limiting the passage of light/radiation therethrough to horizontally polarized light/radiation components, and the concentric ring/annular partial aperture 809 limiting the passage light/radiation therethrough to vertically polarized light/radiation components. Both partial apertures (808,809) are also configured to allow light/radiation therethrough such that the portion of light/radiation energy traversing through the central partial aperture 808 is typically similar to the portion of light/radiation energy traversing through the concentric ring/annular partial aperture 809.

The controllable variable polarizer 805 can be positioned in various locations along the optical path (830t), as long as it is located posterior to aperture assembly 802 and anterior to sensor device 806. As illustrated in FIG. 8D, the variable polarizer 805 is configured such that light/radiation traversing through it emerges at a polarization orientation $\theta_i$ (hereafter referred to as the polarization orientation of controllable variable polarizer 805). The polarization orientation $\theta_i$ of the controllable variable polarizer 805 can be controlled and changed in different points in time e.g., by control signals 807c generated by the control processor unit 807, thus, at any specific time ($t_i$) the polarization orientation is denoted as $\theta_i$. The polarization orientation $\theta_i$ of the controllable variable polarizer 805 can be controlled electrically (e.g., using liquid crystal), mechanically (e.g., using a physically rotating variable polarizer 805), or in any suitable alternative method.

As exemplified hereinabove with reference to FIG. 4C using equation (2), the energy measured by a sensor element (pixel) 806p of the sensor deice 806 corresponds to the phase shift between the wavefronts/beams emerging from a point-source in the FOV of the optical system 800 reaching the concentric ring/annular aperture 809 vs. the central aperture 808 (said phase shift is denoted as $\varphi$), and the polarization orientation of the controllable variable polarizer 805, $\theta_i$ [replacing the annotation of $\alpha$ in equation (2)]. By applying the variable polarization orientation $\theta_i$ of controllable variable polarizer 805 at different points in time ($t_i$), the energy measured in each such point in time can be expressed as follows:

$$E(\varphi, \theta i) = \frac{E_0}{2}(1 + \sin 2\theta i \cdot \cos \varphi) \quad (6)$$

where the annotations in equation (6), (other than $\theta i$ which replaces $\alpha$) are similar to those described with reference to equation (2).

By measuring the energy (i.e., intensity) of the light/radiation reaching the sensor elements (pixel) 806p of the sensor device 806 at different points in time ($t_i$), corresponding to at least two (2) different polarization orientations $\theta i$ affected by the controllable variable polarizer 805, an equation system can be constructed based on equation (6), from which the phase shift $\varphi$ can be derived and hence the distance from (1) the optical system 800 to (2) the point-source in the field of view of optical system 800 from which said light/radiation has emerged.

It is noted that, optionally, but in some embodiments preferably, the polarization orientation $\theta_i$ may not be the spatially the same throughout the controllable variable polarizer 805, though in such case the controllable variable polarizer 805 is required to be located at the vicinity of sensor device 806 i.e., in the vicinity of focal plane 806f. It is further noted that throughout the present disclosure, in addition to determining the distance of a point in the FOV of an optical system according to any of the embodiments disclosed herein, the local energy which has been denoted as $E_0$ in equations (2), (5), and (6) is also determined, providing a "grey scale" level for each pixel, and can be presented to the user in means described hereinabove as part of the implementation of processor 107/607/807.

Figure 9A:
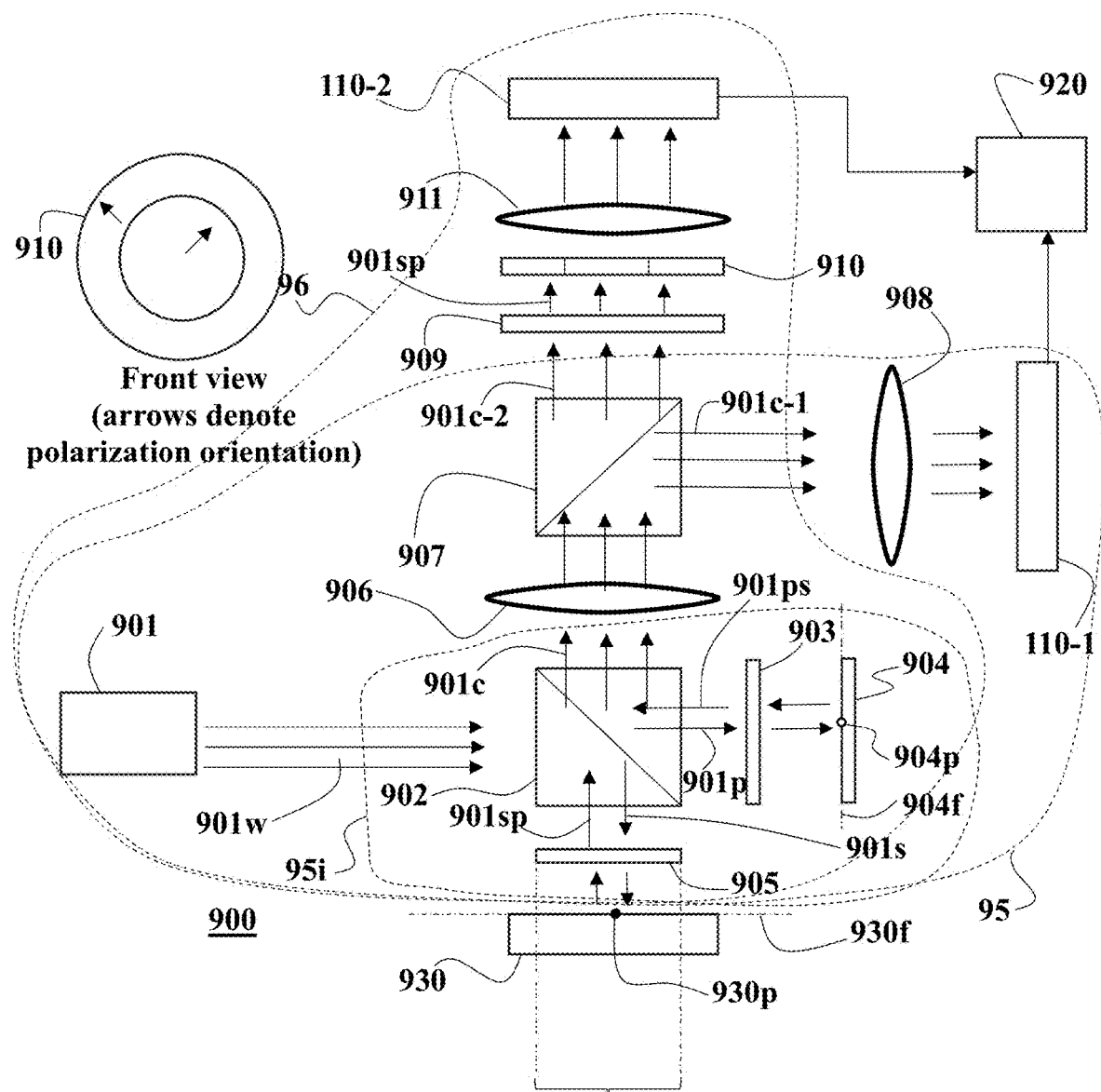
Figure 9B:
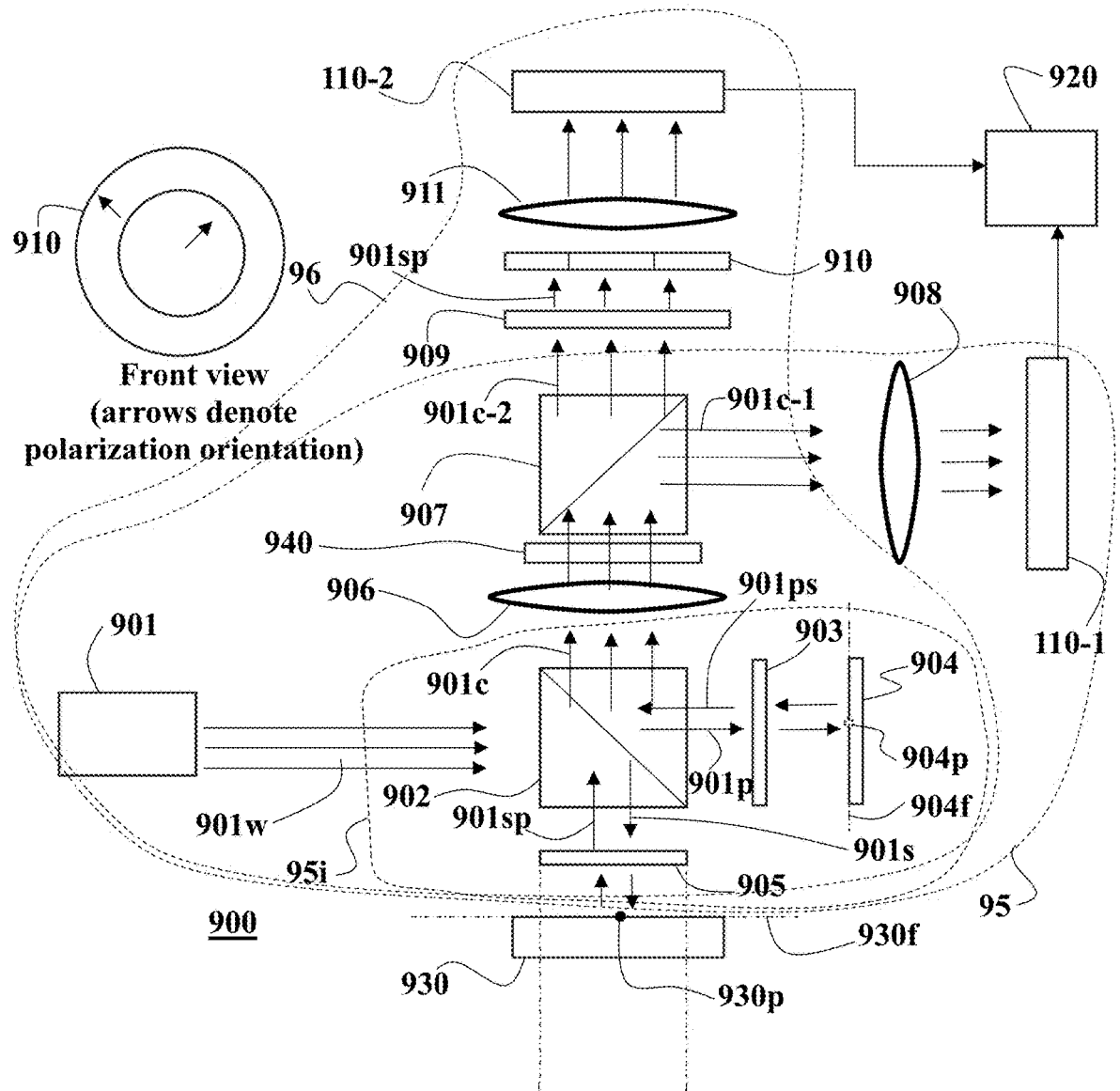

Reference is now made to FIGS. 9A and 9B, which are simplified pictorial illustrations of an optical system 900 constructed in accordance with a possible embodiment to use an interferometric setup 95i for determining three-dimensional coordinates of at least some portion of object(s) 930 in the field of view (FOV) of said optical system 900. The optical system 900 comprises a (e.g., coherent/laser) light source 901, wherefrom wavefront of light/radiation, denoted as 901w, is projected towards a polarizing beam splitter (PBS) 902 of the interferometric setup 95i (also referred to herein as polarization interferometer). It is noted that the wavefronts, such as wavefront 901w, are illustrated in FIGS. 9A and 9B as light/radiation beams (possible distortions of the parallel wavefront due to optical elements are not considered).

The wavefront 901w from the light source 901 can be configured to comprise similar portions of vertically and horizontally polarized light/radiation, where vertical and horizontal polarization orientations are in reference to the polarization orientation of the PBS 902, such that equal light/radiation energy is transmitted and reflected by the PBS 902. Equal energy of p-polarized and s-polarized light/radiation of the wavefront 901w manipulated by the PBS 902 can be achieved, for example, by affecting linear diagonal (45°) polarization, or circular polarization of the wavefront 901w generated by the light source 901.

As noted, the wavefront 901w is divided by the PBS 902 into two separate wavefront components, such that p-polarized reference wavefront 901p traverses through the PBS 902, whereas the s-polarized wavefront 901s is deflected by the PBS 902 at approximately 90° towards the object 930. The p-polarized reference wavefronts 901p from the PBS 902 traverses through a quarter waveplate 903 of the interferometric setup 95i, and thereafter reflected backwardly by a mirror 904, which serves as a reference surface of the interferometric setup 95i, and traverses again through quarter waveplate 903. The dual passage (back and forth) of the p-polarized wavefront 901p through the quarter waveplate 903, rotates its polarization such that it turns into an s-polarized wavefront, denoted as 901ps.

The wavefront 901s deflected by the PBS 902 traverses through a quarter waveplate 905 of the interferometric setup 95i, wherefrom it illuminates the object 930, and reflected (the reflection may be specular, Lambertian, or other) back towards the PBS 902 after traversing again through the quarter waveplate 905. The dual passage (back and forth) of the wavefront 901s through the quarter waveplate 905, rotates its polarization such that it turns into p-polarized wavefront, denoted as 901sp. Upon reaching the PBS 902, the wavefront 901ps is deflected towards an objective lens 906, while the wavefront 901sp traverses through the PBS 902 towards the same objective lens 906. Following the PBS 902 both wavefronts 901sp, 901ps are combined into a wavefront 901c, which is divided by beam splitter 907 configured such that it divides the combined wavefront 901c into two wavefronts, denoted as 901c-1 and 901c-2, having typically similar energies.

The following explanation refers to the wavefront 901c-1, which traverses from beam splitter 907 towards optical assembly 908. Optical assembly 908 is configured, together with the objective lens 906, and including the various optical components along its path, for imaging the object 930 onto a detector assembly 110-1 having the same configuration as of the detector assembly 110 described hereinabove in reference to FIGS. 1A to 1D and FIGS. 3A to 3E. The detector assembly 110-1 is coupled (e.g., by wires or wirelessly) to processor unit (e.g., GPC) 920, constructed to receive and process imagery data/signal from the detector assembly 110-1 (and also from a detector assembly 110-2 referenced hereinbelow).

The object 930 is typically located at the object's focal plane 930f of the optical subsystem 95, which comprises the PBS 902, the quarter waveplate 905, the objective lens 906, the beam splitter 907, and the optical assembly 908. The optical subsystem 95 is arranged such that the image of the object 930 is formed on and acquired by the sensor device (106, not shown) embedded in the detector assembly 110-1. The mirror 904 is located at, or in the vicinity of, the focal plane 904f of the reference wavefront 901p of the optical sub system 95, while the optical path extends through the waveplate 903, rather than waveplate 905. The object's focal plane 930*f* and the focal plane 904*f* of the reference wavefront 901*p* are preferably located at equal distances from the center of the PBS 902.

The source-point 930*p* is located on the surface of the object 930. In case the source-point 930*p* is not located at the object focal plane 930*f* (i.e., located closer or further away from the focal plane 930*f*) a phase shift is formed between the wavefront 901*sp* emerging from point 930*p* and the wavefront 901*ps* emerging from the respective reflection-point 904*p* on the mirror 904. It is noted that since the reflection-point 904*p*, as well as the mirror 904, may not be exactly at the focal plane 904*f*, it is possible that a constant, locally dependent, phase shift is introduced between the wavefront 901*sp* and the wavefront 901*ps*, which can be calibrated for.

Thus, the polarization orientation of the combined wavefront portion 901*c*-1 is a function of the height/distance difference between the source-point 930*p* on the object 130 and the respective reflection-point 904*p* on the mirror 904, with respect to their focal planes 930*f*,904*f*. The polarization orientation of the wavefront 901*c*-1 can range from diagonal 45° polarization (such as that of the incident wavefront 901*w*) in case there is zero phase shift (e.g., both the source-point 930*p* and the reflection-point 904*p* are located at their respective focal planes 930*f* and 904*f*), circular polarization in case of a 90° phase shift, anti-diagonal polarization (−45°) in case of a 180° phase shift etc.

Thus, the polarization intensity measured by adjacently located pixels (106*e*) of the sensor (106) embedded in the detector assembly 110-1, with the knowledge of the corresponding polarization orientations of the polarization elements (105*e*) of the intermediate polarizer (105) embedded in the detector assembly 110-1, can provide information regarding the local polarization of the combined wavefront 901*c*-1. Hence, equation (2) hereinabove can be used to determine (up to the ambiguity of phase measurement), the phase shift causing such local polarization of the combined wavefront 901*c*-1. The height difference between the source-point 930*p* and the reflection-point 904*p*, and thus, assuming reflection point 904*p* is located at its respective focal plane 904*f*, the distance between the source-point 930*p* and the focal plane 930*f*, can be determined by the equation:

$$\Delta h = \frac{\phi}{2\pi} \cdot \lambda \quad (7)$$

where Δh is the distance between source-point 930*p* and the focal plane 930*f*, φ is the polarization phase shift determined using equation (2), which value may be between zero (0) and π, and λ is the central wavelength of the wavefront 901*w* emitted from the light source 901. As noted, this distance determination (Δh) is ambiguous due to the ambiguous determination of the phase shift φ, such that Δh can be determined up to full multiplications of λ/2 quanta, i.e., the actual distance between the source-point 930*p* and the focal plane 930*f* may be Δh+k·λ/2, where k is a whole number.

It is noted that the optical subsystem 95 is configured to measure the local polarization phase shift of the wavefront 901*c*-1 (relative to its original 45° polarization orientation) for every point located on the surface of object 930 within the field of view of optical subsystem 95, and thus the distance between the source-point 930*p* and the object's focal plane 930*f* is constructed as an interferometric optical system having a reference wavefront 901*p* and a target wavefront 901*s*. As such, said interferometric subsystem 95 can be constructed in various other configurations of interferometers known to those skilled in the art.

As noted, the processor unit 920 is configured to process the imagery data/signals received from the detector assembly 110-1 (and also from the detector assembly 110-2), and determine therefrom the three-dimensional coordinates of the source-point 930*p*, as well as any other point on the surface of imaged object 930. Such coordinates can then be presented to the user (e.g., by display means—not shown), or forwarded to other means of automatic processing for further analysis or operation.

The following discussion refers to a second wavefront 901*c*-2, emerging from the beam splitter 907 towards a polarizer 909 of the subsystem 96. The polarizer 909 is configured to allow passage therethrough of only p-polarized light/radiation component introduced by the wavefront 901*sp* corresponding to the light/radiation reflected from the object 930, and blocking (by either absorption or reflection) of the s-polarized light/radiation of the wavefront 901*ps* resulting from the light/radiation reflected from the mirror 904 following dual passage through the quarter waveplate 903.

The path and attributes of the wavefront 901*sp* emerging from the polarizer 909 is comparable to/same as that of the wavefront 131*f* discussed hereinabove in reference to FIGS. 4A to 4C, where the aperture device 910 is in the form of any of the aperture devices (102, or other configurations denoted hereinabove as 101-1, 102-2, etc.) disclosed herein, and located in the aperture plane of the optical subsystem 96, defined as the Fourier conjugate of the object's focal plane of the optical subassembly 96. The function of the polarizer 909 is comparable/similar to the function of the front polarizer (101) of any of the embodiments disclosed herein. The function of the optical subsystem 96 comprising the polarizing beam splitter 902, the quarter waveplate 905, the objective lens 906, the beam splitter 907, and the optical assembly 911, is comparable/similar to the function of the optical assembly 103 of any of the embodiments disclosed herein. The detector assembly 110-2 is constructed similarly/same to the detector assembly 110 described hereinabove in reference to FIGS. 1A to 1D and 3A to 3E. Hence, by applying equations (1) through (3) the distance of various source-points on the imaged object 930, such as the source-point 930*p* on the surface of object 930, from the focal plane 930*f*, can be similarly determined.

The determination of the distance of the source-point(s) 930*p* from the focal plane 930*f* by the equations (1)-(3) utilizing the imagery data/signals generated by the detector assembly 110-2 of the subsystem 96, and its' determination by equation (7) utilizing the imagery data/signal generated by the detector assembly 110-1 of the subsystem 95, can be combined to augment the resolution and the dynamic range of the measured distance of the source-point(s).

As noted in reference to equations (3) and (7), there is an ambiguity in the determination of the distance of the source-point(s) 930*p* from the focal plane 930*f*. The non-ambiguous range of the distance determination as defined by equation (3) is:

$$\Delta R\,(am) \approx \frac{\lambda}{d^2} \cdot R_{0c}^2$$

which is typically much larger than the wavelength Aλ of the light/radiation reflected from the object, while the non-ambiguous range defined by equation (7) is $\lambda/2$. On the other hand, the resolution within the non-ambiguous range of each measurement is determined by physical and engineering limitations, such as the shot noise of the sensor assembly comprising the detector assemblies 110-1 and 110-2. For the purpose of discussion, and to exemplify a possible configuration of the optical assembly 900, the resolution of each optical subsystem 95,96 configured for measuring the wavefront 901*c*-1 and the wavefront 901*c*-2, respectively, is assumed to be $\frac{1}{100}$ of the non-ambiguous range.

The optical subsystem 96 used for detecting the wavefront 901*c*-2 can be configured in possible embodiments such that its non-ambiguous range is fifty (50) times the wavelength (i.e., 50·$\lambda$) of the light/radiation 901*w* generated by the light source 901, thus having a resolution of half wavelength ($\lambda/2$). Thus, the determination of the distance of the source-point(s) 930*p* from the focal plane 930*f* can be determined with a resolution determined by the optical subsystem 95 used for detecting the wavefront 901*c*-1, and thereby reach a $\lambda/200$ resolution, while the dynamic range is determined by the optical subsystem 96 used for detecting the wavefront 901*c*-2 to be 50·$\lambda$. This leads to the possibility of reaching a ratio of resolution to dynamic range of 1:10,000 (in the suggested example) of the optical system 900.

As described hereinabove in reference to FIGS. 3A-3B a phase retarder (e.g., quarter wave plate) may be placed along the optical path, anterior to the sensor assembly. FIG. 9B illustrates the optical system 900 as described hereinabove in reference to FIG. 9A, retarder 940, introduced anterior to beam splitter 907, thus affecting both optical subsystem 96 and optical subsystem 95. By affecting the polarization orientation of wavefront 901*c*-1 and wavefront 901*c*-2 by the retarder 940, the measurement results of detector assembly 110-1 and of the detector assembly 110-2 are affected, such that accuracy of the determination of polarization orientation of said wavefronts can be improved, and thus also the determination of the distances of points on the surface of object 930 can also be improved.

It is noted that in possible embodiments the mirror 904 may be replaced with an alternative reference surface having reflective or semi-reflective properties e.g., allowing interference between the two respective wavefronts 901*sp* and 901*ps* in a fashion similar to other known interferometer configurations (e.g., Fizeau).

Figure 9C:
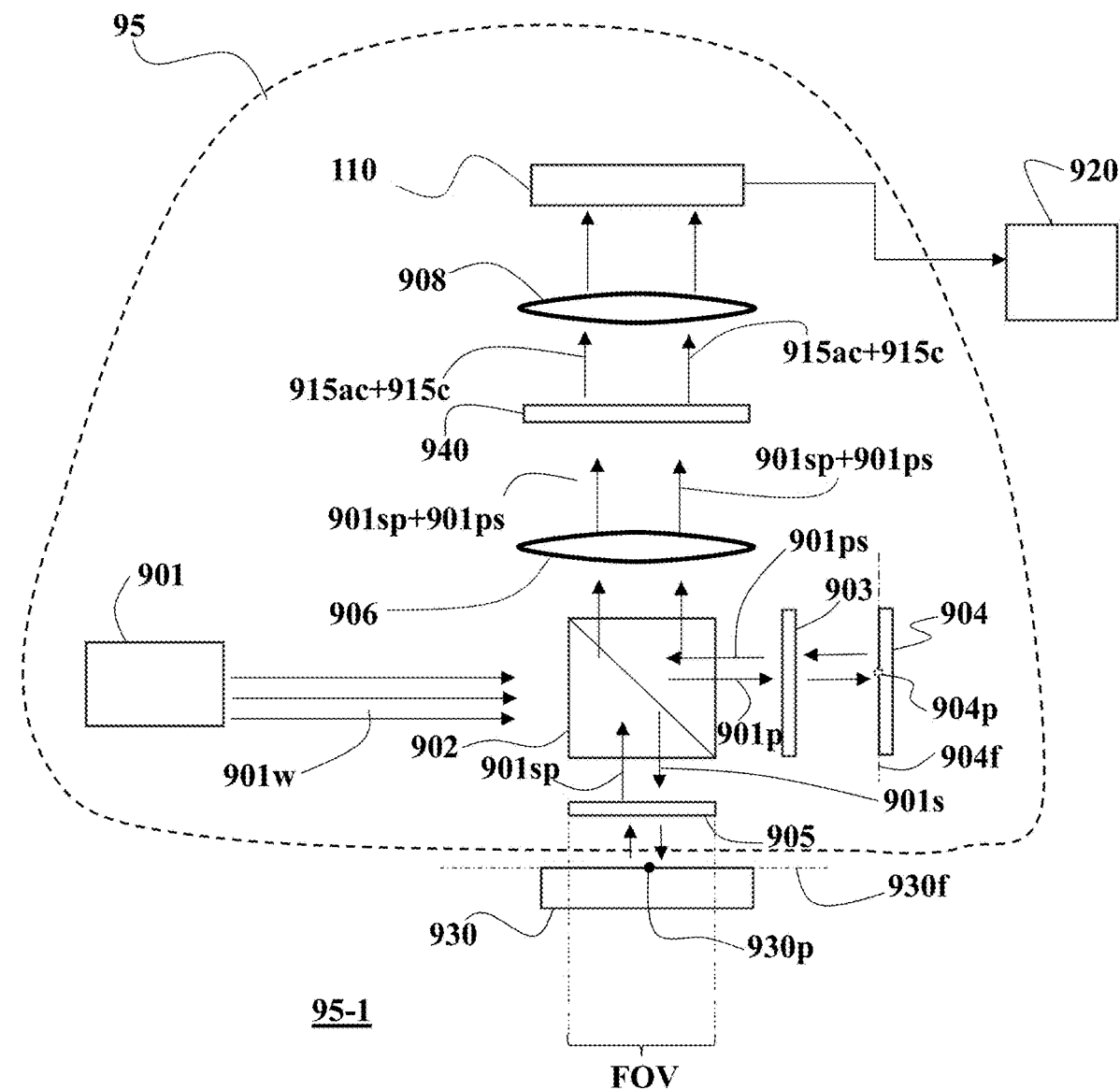

While FIG. 9B illustrates a retarder element 940 for affecting both the subsystem 96 (which is described in detail hereinabove in reference to FIGS. 1A-1D and FIGS. 4A-4D), as well as the subsystem 95 which serves as a polarization interferometer, FIG. 9C illustrates an imaging system 95-1 having the retarder element 940 embedded in a configuration which is constructed of subsystem 95 only with the embedded retarder element 940. In the imaging system 95-1 the retarder element 940 affects the polarization of wavefront 901*ps* as well as wavefront 901*sp*. By constructing/configuring the retarder element 940 to be e.g., a quarter wave plate, the polarization of wavefront 901*ps* may turn into a clockwise circular polarization denoted as 915*c*, while the polarization of wavefront 901*sp* may turn into an anticlockwise circular polarization, denoted as 915*ac*.

It is noted that following the transmission of the (partial) wavefront 901*sp* through PBS 902 towards detector assembly 110, and the reflection of the (partial) wavefront 901*ps* by said PBS 902 towards detector assembly 110, the two (partial) wavefronts 901*sp*, 901*ps* are combined into a single wavefront 901*sp*+901*ps*, which is comprised of said two differently polarized (partial) wavefronts. Similarly, the (partial) wavefront 915*ac* and (partial) wavefront 915*c* responsively obtained from the retarder element 940 also form a unified wavefront 915*ac*+915*c*. In this configuration, the combined wavefront 915*ac*+915*c* forms a linear polarization with an orientation which is determined by the phase shift between the two (partial) wavefronts 915*ac* and 915*c* from the retarder element 940. Said phase shift can be easily determined by the power measurements of the various pixels 106*p* which correlate/correspond to the different polarization elements of the intermediate polarizer 105.

Figure 10A:
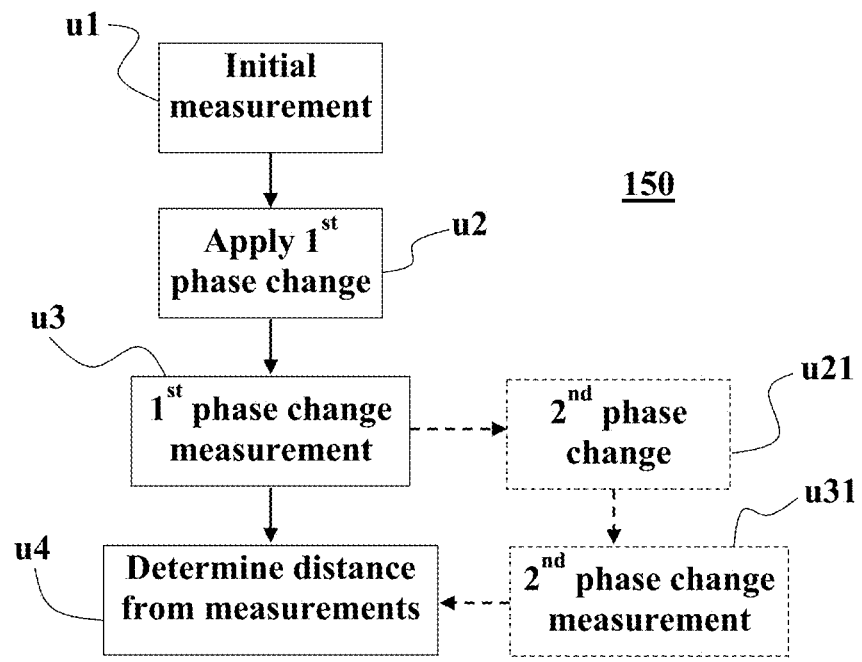
FIGS. 10A to 10D are flowcharts of a distance measurement procedures according to some possible embodiments, wherein FIG. 10A exemplifies an iterative phase varying distance measurement procedure, FIG. 10B exemplifies an iterative polarization varying distance measurement procedure, FIG. 10C exemplifies a distance measurement procedure based on identified imaging shift of intertwined images, and FIG. 10D demonstrates a procedure for augmenting resolution and/or dynamic range of the distance measure determined by any of the procedures exemplified in FIGS.

FIG. 10A is a flowchart illustrating a distance measurement procedure 150 according to some possible embodiments. In this specific and non-limiting example an initial measurement (u1) is carried out at an initial state of the aperture assembly (102 e.g., $\beta_0$ in FIGS. 7A to 7C), in which its apertures are configured to pass the light/radiation from the object without applying any phase changes thereto, followed by an intensity measurement of the light/radiation from the aperture assembly by the detector assembly (110). Next (u2), a first predefined phase difference is applied to the light/radiation from the object passed through the two or more partial apertures of the aperture assembly (102 e.g., $\beta_1$), and a corresponding intensity measurement (u3) is carried out by the detector assembly (110). Optionally, but in some embodiments preferably, one or more additional phase differences (u21) are applied to the light/radiation from the object passed through the two or more apertures of the aperture assembly (e.g., $\beta_2$, . . . ), and corresponding intensity measurements (u31) are carried out by the detector assembly (110).

Depending on the application and configuration of the optical system, additional phase changes can be applied as necessary, and corresponding intensity measurements are made. After measuring the intensity of the light/radiation received by the sensor device for two or more (and in some embodiments three or more) different phase differences applied to the light/radiation from the object passed through the two or more partial apertures of the aperture assembly (102), the distance of at least one point on the object is determined (u4) e.g., by solving an equation system constructed based on equation (5) to determine the phase shift $\varphi$ between the light/radiation from the two or more apertures of the aperture assembly (102), and thereafter using equation (1) to determine the distance ($\Delta R$) of the source-point from the focal plane of the system.

Figure 10B:
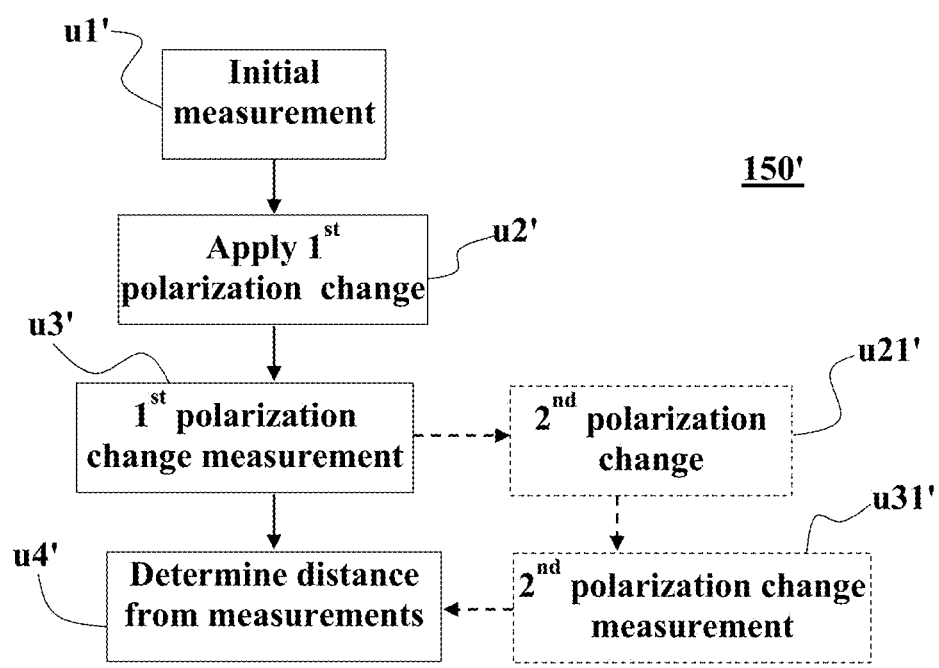

FIG. 10B illustrates a process 150', similar to the process 150 described hereinabove with reference to FIG. 10A, that can be carried out using the embodiments disclosed herein utilizing controlled variable polarization orientation, where rather than application of phase change between the different partial apertures of the aperture assembly, different polarization orientations ($\theta$i) are applied to the variable controlled polarizer (805) and the corresponding intensity measurement are taken, as described in details hereinabove with reference to FIGS. 8A-8D. The steps u1', u2', u3', u4', u21' and u31', of the process 150' are mutatis mutandis similar to the corresponding steps u1, u2, u3, u4, u21 and u31, of the process 150, and thus will not be described herein in details, for the same of brevity.

Figure 10C:
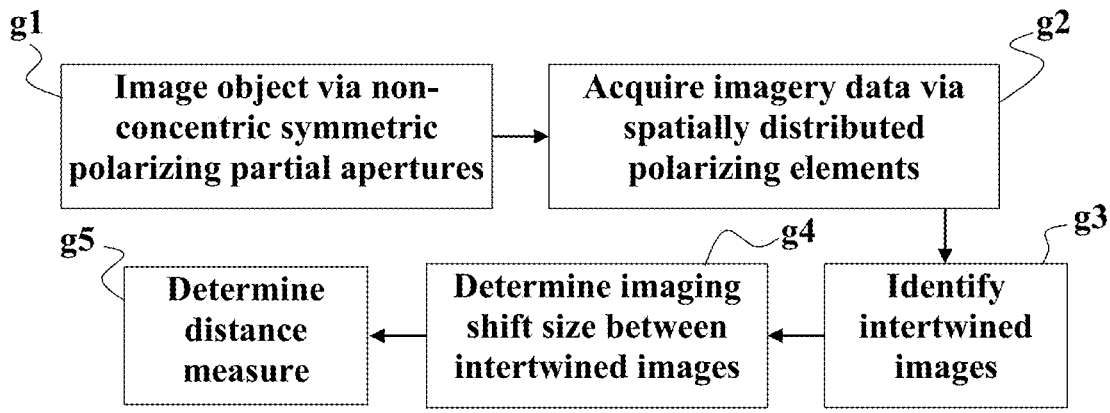

FIG. 10C exemplifies a distance measure procedure 151 based on identified imaging shift of intertwined images, as illustrated in FIG. 4E. This imaging procedure 151 can start in imaging (g1) the object via a non-concentric symmetric polarizing partial apertures according to any of the embodiments disclosed herein (e.g., 102-5 of FIG. 2E), and then acquiring imagery data/signals (g2) of the object via spatially distributed polarizing elements (e.g., polarized array 105 of FIG. 1D). The acquired imagery data/signals can be then processed to identify therein (g3) intertwined images of the imaged object for determination (g4) of an imaging shift size thereof. A distance measure of the imaged object can be then determined (g5) based on the determined imaging shift size of the identified intertwined images of the imaged object.

Figure 10D:
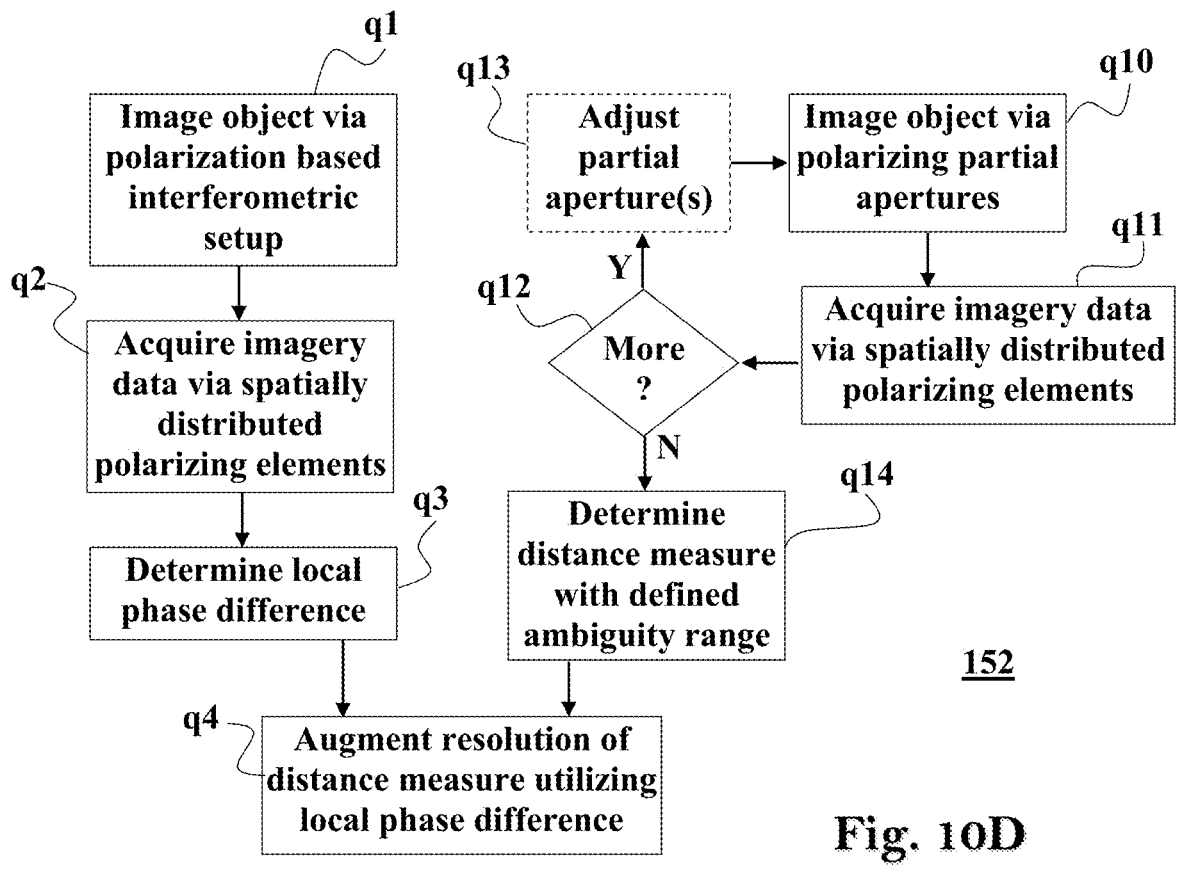

FIG. 10D demonstrates a procedure 152 for augmenting resolution and/or dynamic range of a distance measure determined by any of the embodiments disclosed (e.g., as demonstrated in FIGS. 1A, 4A-4E, 5A, 6A, 8A, or subsystem 96 of FIG. 9A, also referred to herein as non-interferometric imaging setups) herein and a local phase shift determined by a polarization based interferometric imaging setup (e.g., subsystem 95 of FIG. 9A). This imaging procedure 152 can start in one or both of the object imaging steps (g1 and q1) using the non-interferometric imaging setups and polarization based interferometric imaging setup, simultaneously or separately/consecutively.

In the non-interferometric setup, imagery data/signals of the imaged object can be then acquired (q11) via polarizing partial apertures of the aperture assembly according to any of the embodiments disclosed herein (e.g., of FIG. 2A-2J). If more imagery data/signals is required (q12) the imaging and data/signals acquisitions steps (q10 and q11) are repeated any needed number of times, optionally after adjustments (q13 e.g., of phase shift and/or polarization direction, as exemplified in FIGS. 7A-7C) of the polarizing partial apertures. A distance measure having a predefined ambiguity range (e.g., $\lambda/2$) can be then determined (q14) based on the acquired imager data/signals utilizing any of the techniques disclosed herein.

In the polarizing based interferometric setup, imagery data/signals of the imaged object is acquired (q2) via polarizing partial apertures of the aperture assembly according to any of the embodiments disclosed herein (e.g., of FIG. 2A-2J), and a local phase difference is then determined (i.e., between 0 to $\pi$) based on the acquired imagery data/signals. The determined local phase difference can be then used (q4) to augment the resolution and/or dynamic range of the distance measure having the predefined ambiguity range (e.g., within a predefine fraction of half of the wavelength $\lambda/2$ of the light/radiation from the imaged object).

Relative terms such as "lower," "upper," "horizontal," "vertical," "above," "below," "up," "down," "top" and "bottom", as well as derivatives thereof (e.g., "horizontally," "downwardly," "upwardly," etc.), and similar adjectives in relation to orientation of the described elements/components refer to the manner in which the illustrations are positioned on the paper, not as any limitation to the orientations in which these elements/components can be used in actual applications.

It should be understood that throughout this disclosure, where a process or method is shown or described, the steps/acts of the method may be performed in any order and/or simultaneously, and/or with other steps/acts not-illustrated/described herein, unless it is clear from the context that one step depends on another being performed first. In possible embodiments not all of the illustrated/described steps/acts are required to carry out the method.

As described hereinabove and shown in the associated figures the present application provides designs and techniques for determining distance of an imaged object(s), as well as grey scale and/or color intensity, of at least some portion of the object(s) located in a field of view of an optical system. Derivation of the distance is performed in possible embodiments by measuring the energy distribution of polarized light e.g., using a polarizer array, as well as an aperture assembly configured to divide a wavefront emerging from the imaged object(s) into at least two partial wavefronts with similar/equal energy and different polarization orientations.

As noted hereinabove, it possible to evaluate the relevant parameters of the object(s) in the FOV of the optical system (e.g., distance, color intensity) while the partial apertures do not result in similar/equal energy portions, and/or while the polarization orientation between the light/radiation portions passing through the different partial apertures are not perpendicular one with respect to the other. Such configuration, though not optimal, are possible and the equations expressing such configuration are more complex and not detailed in the current disclosure for the sake brevity.

The determination of the distance can be done by derivation of the phase difference between at least two partial wavefronts, which is indicative of the required distance. This technique is usable for 3D imaging, and related methods. While particular embodiments of the application have been described, it will be understood, however, that the disclosure hereof is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the claims.

The invention claimed is:

1. An imaging device comprising:
   a detector assembly having sensor elements configured to measure intensity of light/radiation thereby received and generate measurement data/signals indicative thereof;
   an aperture assembly having at least two partial apertures configured to divide light/radiation received from an object into at least two components having different polarization orientations;
   a polarizer arrangement located between said detector assembly and said aperture assembly, said polarizer arrangement configured to affect at least two different polarization orientations to light passing therethrough onto at least two sensor elements of said detector assembly; and
   a processor unit configured to process the measurement data/signals from said at least two sensor elements, and determine based thereon a distance of said object from said imaging device.

2. The device of claim 1 comprising an optical assembly configured to direct light/radiation from the aperture assembly to the detector assembly.

3. The device of claim 1 wherein the polarizer arrangement is embedded in the detector assembly.

4. The device of claim 1 wherein the aperture assembly is configured to apply a predefined phase difference between the at least two components of the light/radiation, and wherein the processor is configured to determine the distance of the object based on said predefined phase difference and the measurement data/signals.

5. The device of claim 1 comprising at least one of a phase retarder and a polarizing element in at least one of the partial apertures of the aperture assembly for affecting the different polarization orientations to the at least two light/radiation components passed therethrough.

6. The device of claim 1 comprising a variable phase retarder in at least one of the partial apertures of the aperture assembly, and wherein the processor is configured to control said variable phase retarder to apply at least two predefined different phase shifts to the light/radiation passed therethrough at respective at least two different time instances, and determine the distance of the object at least partially based on the measurement data/signals acquired by said detector assembly for said respective at least two different time instances.

7. The device of claim 1 comprising:
at least one polarizer configured to apply a predefined polarization orientation to the light/radiation received by the aperture assembly; and/or
a light/radiation source configured to illuminate the object with light/radiation having a defined polarization orientation and/or band of wavelengths.

8. The device of claim 1 comprising one or more bandpass filters each configured to limit passage of light/radiation therethrough towards the sensor elements of the detector assembly to a different range of wavelengths.

9. The device of claim 8 wherein the one or more bandpass filters form a defined spatial distribution of bandpass filter elements.

10. The device of claim 8 wherein the one or more bandpass filters are embedded in the detector assembly.

11. The device of claim 8 wherein the one or more bandpass filter elements form a spatial distribution of at least one bandpass element of a predefined wavelength range and at least one passthrough non-filtering element allowing complete passage of the light/radiation therethrough.

12. The device of claim 1 wherein the polarizer arrangement comprises a plurality of polarizer elements configured to form a defined spatial distribution of polarizer elements arranged such that the polarization orientation of at least some of said polarizer elements is different from polarization orientations of polarizer elements adjacently located thereto.

13. The device of claim 12 comprising one or more bandpass filters configured to direct light/radiation of certain wavelength ranges onto respective polarizer elements of the polarizer arrangement having certain polarization orientations,
wherein said one or more bandpass filters embedded in the detector assembly, and/or configured to form either:
a defined spatial distribution of bandpass filter elements; or
a spatial distribution of at least one bandpass element of a predefined wavelength range and at least one passthrough non-filtering element allowing complete passage of the light/radiation therethrough.

14. The device of claim 13 comprising a variable polarizer in the polarizer arrangement and wherein the control unit is configured to set a polarization direction of said variable polarizer.

15. The device of claim 12 comprising one or more bandpass filters,
wherein the polarizer elements are configured to direct light/radiation of certain polarization orientations onto respective one or more bandpass filters having certain wavelength ranges,
and wherein said one or more bandpass filters embedded in the detector assembly, and/or configured to form either:
a defined spatial distribution of bandpass filter elements; or
a spatial distribution of at least one bandpass element of a predefined wavelength range and at least one passthrough non-filtering element allowing complete passage of the light/radiation therethrough.

16. The device of claim 1 comprising:
a microlens array, and/or
a retarder element, located anterior to the sensor elements of the detector assembly.

17. The device of claim 1 comprising an array of retardation elements in the detector assembly, said array of retardation elements having a defined arrangement of different retardation elements spatially alternatingly distributed therein.

18. The device of claim 17 wherein the array of retardation elements are configured to form a rectangular alternating grid of the retardation elements to thereby pass polarized light/radiation onto some of the polarizer elements of the array of polarizer elements having certain one or more polarization orientations.

19. The device of claim 1 wherein the processor is configured to further determine one or more colors and/or grey-scale levels from the measurement data for each sensor element of the sensor device.

20. The device of claim 1 wherein a combined rotation of some of the polarization elements are used to manipulate the energy distribution measured by the detector assembly, to thereby improve sensitivity.

21. The device of claim 1 further comprising:
a polarization interferometer configured for imaging the object,
a further detector assembly having sensor elements configured to measure intensity of light/radiation thereby received and generate interferometric measurement data/signals indicative thereof, and
a further polarizer arrangement configured to affect at least two different polarization orientations to light from said polarization interferometer onto at least two sensor elements of said further detector assembly,
and wherein the processor unit is configured to process said interferometric measurement data/signals and determine based thereon a local phase difference, and augment resolution and/or dynamic range of the determined distance.

22. The device of claim 21 wherein the aperture assembly is optically coupled to the polarization interferometer.

23. The device of claim 21 wherein the polarization interferometer comprises:
a light source:
a reference surface;
a polarizing beam splitter configured to receive light from said light source, transmit a portion of the received light with a first polarization orientation in a first direction towards said reference surface, reflect another portion of the received light with a second polarization orientation in a second direction towards the object, and direct combined light reflected from said object and from said reference surface in a third direction;
a first phase retarder for shifting phase of the light reflected towards the object and of light reflected back from said object towards said polarizing beam splitter;
a second phase retarder for shifting phase of the light transmitted towards the reference surface and of light reflected back from said reference surface towards said polarizing beam splitter; and
an optical coupler configured direct a portion of the combined light towards the fort detector assembly of the polarization interferometer and another portion of said combined light towards the aperture assembly.

24. The device of claim 23 comprising at least one of the following:
- a retarder element configured to affect the polarization orientation of light/radiation from the polarizing beam splitter of the polarization interferometer;
- a phase retarder and/or a polarizing element in at least one of the partial apertures of the aperture assembly for affecting the different polarization orientations to the at least two light/radiation components passed therethrough;
- a variable phase retarder in at least one of the partial apertures of the aperture assembly, and wherein the processor is configured to control said variable phase retarder to apply at least two predefined different phase shifts to the light/radiation passed therethrough at respective at least two different time instances, and determine the distance of the object at least partially based on the measurement data/signals acquired by the detector assembly for said respective at least two different time instances;
- at least one polarizer configured to apply a predefined polarization orientation to the light/radiation received by the aperture assembly;
- a light/radiation source configured to illuminate the object with light/radiation having a defined polarization orientation and/or band of wavelengths;
- one or more bandpass filters configured to form a defined spatial distribution of bandpass filter elements, and/or form a spatial distribution of at least one bandpass element of a predefined wavelength range and at least one passthrough non-filtering element allowing complete passage of the light/radiation therethrough, and/or to be embedded in the detector assembly and/or the further detector assembly;
- a microlens array located anterior to the sensor elements of the detector assembly,
- a retarder element located anterior to the aperture assembly; and/or
- a retarder element affecting the polarization of light reflected from both the object as the polarization of light originating from the reference surface.

25. The device of claim 23 having at least one of the following configurations:
- the polarizer arrangement embedded in the detector assembly and/or the further detector assembly;
- the aperture assembly is configured to apply a predefined phase difference between the at least two components of the light/radiation, and wherein the processor is configured to determine the distance of the object based on said predefined phase difference and the measurement data/signals;
- the further polarizer arrangement comprises a plurality of polarizer elements configured to form a defined spatial distribution of polarizer elements arranged such that the polarization orientation of at least some of said polarizer elements is different from polarization orientations of polarizer elements adjacently located thereto;
- the device comprising one or more bandpass filters configured to direct light/radiation of certain wavelength ranges onto respective polarizer elements of the further polarizer arrangement having certain polarization orientations, wherein said one or more bandpass filters embedded in the detector assembly and/or the detector assembly, and/or configured to form either a defined spatial distribution of bandpass filter elements or a spatial distribution of at least one bandpass element of a predefined wavelength range and at least one passthrough non-filtering element allowing complete passage of the light/radiation therethrough;
- the device comprising one or more bandpass filters, wherein the polarizer elements are configured to direct light/radiation of certain polarization orientations onto respective one or more bandpass filters having certain wavelength ranges, and wherein said one or more bandpass filters embedded in the detector assembly and/or the further detector assembly, and/or configured to form either a defined spatial distribution of bandpass filter elements or a spatial distribution of at least one bandpass element of a predefined wavelength range and at least one passthrough non-filtering element allowing complete passage of the light/radiation therethrough;
- the device comprising a variable polarizer in the further polarizer arrangement and wherein the control unit is configured to set a polarization direction of said variable polarizer; and/or
- a combined rotation of some of the polarization elements are used to manipulate the energy distribution measured by the detector assembly and/or the further dete assembly to thereby improve sensitivity.

26. An imaging method comprising:
- dividing light from an object into at least two portions having different polarization orientations;
- spatially affecting at least two different polarization orientations to said at least two light portions;
- measuring intensity of the spatially polarized light and generating measurement data/signals indicative thereof; and
- processing the measurement data/signals and determining based thereon a distance of said object.

27. The method of claim 26 comprising one or more of the following:
- affecting a predefined polarization orientation to the light from the object;
- radiating the object with light/radiation having a defined polarization orientation;
- illuminating the object with light having a defined band of wavelengths;
- filtering the light of the at least two different polarization orientations by one or more bandpass filters having different wavelength ranges;
- forming a defined spatial distribution of the filtering of the light by the one or more bandpass filters and associating one or more of said bandpass filters with polarization orientations of the defined distribution of polarization orientations;
- affecting a phase shift to the at least two light portions so as to affect a desired polarization thereto;
- applying a defined spatial distribution of different phase shifts to the at least two light portions;
- determining one or more colors and/or grey-scale levels from the measurement data;
- a calibration step including affecting a relative rotation of polarization orientation to one or more components of the light/radiation from the object;
- performing a combined rotation of polarization orientations to components of the light/radiation from the object to cause an energy distribution in the measurement data; and/or
- imaging the object through a polarization interferometer to affect a phase difference to light from the object according to a distance thereof from said polarization interferometer, affecting at least two different polarization orientations to a light component from said polarization interferometer onto sensor elements and acquiring imagery data therefrom, processing said imagery data to determine said phase difference, and augmenting at least one of resolution and dynamic range of the determined distance based on said phase difference.

28. The method of claim 26 wherein the spatially affecting of the at least two different polarization orientations to the at least two light/radiation portions comprises forming a defined distribution of polarization orientations.

29. The method of claim 28 comprising associating polarization orientations of the defined distribution of polarization orientations with bandpass filters of the one or more bandpass filters.

\* \* \* \* \*